US012569797B2

(12) United States Patent
Adams et al.

(10) Patent No.: US 12,569,797 B2
(45) Date of Patent: Mar. 10, 2026

(54) FORMED FILTER MEDIA

(71) Applicant: Cummins Filtration Inc., Nashville, TN (US)

(72) Inventors: Mark P. Adams, Madison, WI (US); Daniel Potratz, Stoughton, WI (US); Ming Ouyang, St. Paul, MN (US); Robert A. Bannister, Ames, IA (US); Scott W. Schwartz, Cottage Grove, WI (US); Jeremiah Cupery, Madison, WI (US); Christopher E. Holm, Madison, WI (US); Miao Li, McFarland, WI (US); Billy Bates, Cookeville, TN (US); Dane Philip Miller, Madison, WI (US); Jerald J. Moy, Oregon, WI (US); Ken Tofsland, Stoughton, WI (US); Mark A. Terres, Shakopee, MN (US); Gregory K. Loken, Stoughton, WI (US); Matthew Louison, McFarland, WI (US); Barry Mark Verdegan, Stoughton, WI (US)

(73) Assignee: Cummins Filtration Inc., Nashville, TN (US)

( * ) Notice: Subject to any disclaimer, the term of this patent is extended or adjusted under 35 U.S.C. 154(b) by 912 days.

(21) Appl. No.: 17/783,472

(22) PCT Filed: Dec. 9, 2019

(86) PCT No.: PCT/US2019/065259
§ 371 (c)(1),
(2) Date: Jun. 8, 2022

(87) PCT Pub. No.: WO2021/118524
PCT Pub. Date: Jun. 17, 2021

(65) Prior Publication Data
US 2023/0018748 A1 Jan. 19, 2023

(51) Int. Cl.
*B01D 46/52* (2006.01)
*B01D 25/24* (2006.01)
(Continued)

(52) U.S. Cl.
CPC ........... *B01D 46/522* (2013.01); *B01D 25/24* (2013.01); *B01D 25/26* (2013.01); *B01D 46/121* (2022.01);
(Continued)

(58) Field of Classification Search
None
See application file for complete search history.

(56) References Cited

U.S. PATENT DOCUMENTS 1,729,135 A 9/1929 Slauson
2,599,604 A 6/1952 Bauer et al.
(Continued)

FOREIGN PATENT DOCUMENTS

CN 2126622 Y 1/1993
CN 101060914 A 10/2007
(Continued)

OTHER PUBLICATIONS

International Search Report and Written Opinion on PCT PCT/US2022/030048 dtd Oct. 6, 2022 (11 pages).
(Continued)

*Primary Examiner* — Brit E. Anbacht
(74) *Attorney, Agent, or Firm* — Foley & Lardner LLP

(57) ABSTRACT

Embodiments described herein relate generally to filter assemblies that include filter elements with cross-channel flow having flat and/or folded arrangements for optimized functionality and performance. The filter assemblies may be formed (e.g., shaped, constructed, etc.) using a variety of shapes, angles, configurations, and materials to improve the filtration and cross-channel flow of fluid through the filter
(Continued)

media. The filter media may implement a wide variety of patterns (e.g., repeating, origami, rounded, etc.), shapes (e.g., tetrahedral, rhombus, square), and construction (e.g., pleated, integrated, interdigitated, etc.).

15 Claims, 55 Drawing Sheets

(51) Int. Cl.
    *B01D 25/26*     (2006.01)
    *B01D 46/121*     (2022.01)
(52) U.S. Cl.
    CPC ...... *B01D 46/525* (2013.01); *B01D 2201/125* (2013.01); *B01D 2271/022* (2013.01)

(56) References Cited

U.S. PATENT DOCUMENTS

| | | | |
|---|---|---|---|
| 2,980,208 A * | 4/1961 | Neumann | B01D 46/02 |
| | | | 210/493.5 |
| 3,020,977 A | 2/1962 | Huppke et al. | |
| 3,173,867 A | 3/1965 | Michaels | |
| 3,183,286 A * | 5/1965 | Harms | B01D 46/0001 |
| | | | 55/497 |
| 3,280,985 A * | 10/1966 | Czerwonka | B01D 46/523 |
| | | | 55/497 |
| 3,293,833 A | 12/1966 | Barany | |
| 3,410,062 A | 11/1968 | Hart | |
| 3,521,429 A | 7/1970 | Leffler | |
| 3,722,696 A | 3/1973 | Dwyer et al. | |
| 3,853,529 A | 12/1974 | Farr et al. | |
| 3,921,432 A | 11/1975 | Rivers | |
| 4,144,043 A | 3/1979 | Johnston | |
| 4,177,050 A | 12/1979 | Culbert et al. | |
| 4,235,611 A | 11/1980 | Brownell | |
| 4,268,290 A | 5/1981 | Barrington | |
| 4,343,631 A | 8/1982 | Ciliberti | |
| 4,410,427 A | 10/1983 | Wydeven | |
| 4,498,915 A | 2/1985 | Witchell | |
| 4,528,008 A | 7/1985 | Takagi et al. | |
| 4,589,983 A | 5/1986 | Wydevan | |
| 4,839,037 A | 6/1989 | Bertelsen et al. | |
| 4,878,930 A * | 11/1989 | Manniso | B01D 46/71 |
| | | | 210/321.82 |
| 4,925,561 A | 5/1990 | Ishii et al. | |
| 4,938,869 A | 7/1990 | Bayerlein et al. | |
| 5,114,582 A | 5/1992 | Sandstrom et al. | |
| 5,167,740 A | 12/1992 | Michaelis et al. | |
| 5,215,661 A | 6/1993 | Tanabe | |
| 5,316,677 A | 5/1994 | Harms, II | |
| 5,320,657 A | 6/1994 | Adams | |
| 5,397,632 A | 3/1995 | Murphy et al. | |
| 5,456,069 A | 10/1995 | Haerle | |
| 5,557,808 A | 9/1996 | Kawai | |
| 5,558,689 A | 9/1996 | Yanagihara et al. | |
| 5,679,251 A | 10/1997 | Swanson et al. | |
| 5,736,044 A | 4/1998 | Proulx et al. | |
| 5,772,883 A | 6/1998 | Rothman et al. | |
| 5,814,117 A | 9/1998 | Mochida | |
| 5,820,646 A | 10/1998 | Gillingham et al. | |
| 5,895,574 A | 4/1999 | Friedmann et al. | |
| 5,980,759 A | 11/1999 | Proulx et al. | |
| 6,000,685 A | 12/1999 | Groten et al. | |
| 6,068,771 A | 5/2000 | Mcdermott et al. | |
| 6,153,098 A | 11/2000 | Bayerlein et al. | |
| 6,165,242 A | 12/2000 | Choi | |
| 6,238,561 B1 | 5/2001 | Liu et al. | |
| 6,273,938 B1 | 8/2001 | Fanselow et al. | |
| 6,375,700 B1 * | 4/2002 | Jaroszczyk | B01D 46/10 |
| | | | 55/498 |
| 6,391,076 B1 | 5/2002 | Jaroszczyk et al. | |
| 6,391,200 B2 | 5/2002 | Pulek et al. | |
| 6,444,006 B1 | 9/2002 | Haberkamp et al. | |
| 6,478,959 B1 * | 11/2002 | Morgan | B01D 29/111 |
| | | | 210/485 |
| 6,544,310 B2 | 4/2003 | Badeau et al. | |
| 6,582,490 B2 | 6/2003 | Miller et al. | |
| 6,598,749 B2 | 7/2003 | Paul et al. | |
| 6,656,243 B2 | 12/2003 | Hodge | |
| 6,746,500 B1 | 6/2004 | Park et al. | |
| 6,887,343 B2 | 5/2005 | Schukar et al. | |
| 6,932,850 B1 | 8/2005 | Welch et al. | |
| 6,953,124 B2 | 10/2005 | Winter et al. | |
| 6,986,804 B2 | 1/2006 | Dominiak et al. | |
| 7,163,625 B1 | 1/2007 | Williamson et al. | |
| 7,311,747 B2 | 12/2007 | Adamek et al. | |
| 7,314,558 B1 | 1/2008 | Jaroszczyk et al. | |
| 7,323,105 B1 | 1/2008 | Janikowski et al. | |
| 7,323,106 B1 | 1/2008 | Jaroszczyk et al. | |
| 7,371,321 B1 | 5/2008 | Nesland, Sr. | |
| 7,425,227 B1 | 9/2008 | Hutchison et al. | |
| 7,481,863 B2 | 1/2009 | Oelpke et al. | |
| 7,488,365 B2 | 2/2009 | Golden et al. | |
| 7,497,886 B2 | 3/2009 | Walker | |
| 7,534,279 B2 | 5/2009 | Oh et al. | |
| 7,552,506 B2 | 6/2009 | Lee et al. | |
| 7,588,619 B2 | 9/2009 | Chilton et al. | |
| 7,625,418 B1 | 12/2009 | Choi | |
| 7,648,546 B2 | 1/2010 | Haberkamp et al. | |
| 7,736,408 B2 | 6/2010 | Bock et al. | |
| 7,779,507 B2 | 8/2010 | Jung et al. | |
| 7,797,790 B2 | 9/2010 | Park et al. | |
| 7,815,703 B2 | 10/2010 | Park | |
| 7,879,125 B2 | 2/2011 | Haberkamp et al. | |
| 7,883,572 B2 | 2/2011 | Neudeck | |
| 7,922,006 B2 | 4/2011 | Fall et al. | |
| 7,931,723 B2 | 4/2011 | Cuvelier | |
| 8,075,720 B2 | 12/2011 | Fall et al. | |
| 8,276,605 B2 | 10/2012 | Heathcote et al. | |
| 8,397,920 B2 | 3/2013 | Moy et al. | |
| 8,460,442 B2 | 6/2013 | Wagner et al. | |
| 8,491,689 B2 | 7/2013 | Duffy et al. | |
| 8,506,668 B2 * | 8/2013 | Swanson | B01D 46/2411 |
| | | | 55/498 |
| 8,545,658 B2 | 10/2013 | Spearin et al. | |
| 8,615,844 B2 | 12/2013 | Van Raalte et al. | |
| 8,673,148 B2 | 3/2014 | Straeffer et al. | |
| 8,728,188 B2 | 5/2014 | Kim et al. | |
| 8,852,310 B2 | 10/2014 | Holzmann et al. | |
| 8,888,885 B2 | 11/2014 | Barreteau et al. | |
| 9,038,235 B2 | 5/2015 | Van Der Kooi et al. | |
| 9,050,564 B2 | 6/2015 | Meyer-Blumenroth et al. | |
| 9,061,234 B2 | 6/2015 | Lundquist | |
| 9,180,396 B2 | 11/2015 | Maruyama | |
| 9,370,742 B2 | 6/2016 | Edwards et al. | |
| 9,457,307 B2 | 10/2016 | Kaufmann et al. | |
| 9,504,950 B2 | 11/2016 | Holzmann et al. | |
| 9,630,132 B2 | 4/2017 | Spengler et al. | |
| 9,808,753 B2 | 11/2017 | Lise et al. | |
| 9,827,527 B2 | 11/2017 | Merritt et al. | |
| 9,937,455 B2 | 4/2018 | Boehrs et al. | |
| 10,137,416 B2 | 11/2018 | Jons et al. | |
| 10,226,742 B2 | 3/2019 | Fischer-Fruhholz et al. | |
| 10,786,774 B2 | 9/2020 | Rocklitz et al. | |
| 11,439,943 B2 | 9/2022 | Page et al. | |
| 2002/0090324 A1 * | 7/2002 | Badeau | F01N 3/035 |
| | | | 422/177 |
| 2003/0006186 A1 | 1/2003 | Pulek et al. | |
| 2003/0101701 A1 * | 6/2003 | Henrichsen | B01D 46/2418 |
| | | | 264/29.2 |
| 2003/0190269 A1 * | 10/2003 | Liu | F01N 3/0218 |
| | | | 422/168 |
| 2004/0226876 A1 | 11/2004 | Herron | |
| 2005/0072131 A1 | 4/2005 | Tate et al. | |
| 2006/0091084 A1 | 5/2006 | Merritt et al. | |
| 2006/0123754 A1 * | 6/2006 | Oelpke | B01D 46/88 |
| | | | 55/498 |
| 2006/0151383 A1 * | 7/2006 | Choi | B01D 46/0001 |
| | | | 210/493.1 |
| 2006/0272305 A1 * | 12/2006 | Morgan | B01D 25/26 |
| | | | 55/521 |

(56) References Cited

U.S. PATENT DOCUMENTS

| 2007/0011996 A1 | 1/2007 | Tsuchiya et al. |
| 2007/0056691 A1 | 3/2007 | Lin |
| 2007/0102101 A1 | 5/2007 | Spearin et al. |
| 2007/0130895 A1 | 6/2007 | Boeck et al. |
| 2007/0186528 A1 | 8/2007 | Wydeven et al. |
| 2007/0209343 A1 | 9/2007 | Cuvelier |
| 2007/0262016 A1 | 11/2007 | Fall et al. |
| 2007/0294856 A1 | 12/2007 | Park |
| 2008/0000827 A1 | 1/2008 | Bruss |
| 2008/0010957 A1 | 1/2008 | Yun et al. |
| 2008/0011672 A1* | 1/2008 | Schwartz ............. B01D 46/121 |
| | | 55/467 |
| 2008/0011673 A1 | 1/2008 | Janikowski et al. |
| 2008/0104795 A1 | 5/2008 | Lang |
| 2008/0120952 A1 | 5/2008 | Chilton et al. |
| 2008/0274020 A1 | 11/2008 | Matsuoka |
| 2008/0282890 A1 | 11/2008 | Rocklitz et al. |
| 2009/0032469 A1 | 2/2009 | Panzani et al. |
| 2009/0056753 A1 | 3/2009 | Heathcote et al. |
| 2009/0102094 A1 | 4/2009 | Golden et al. |
| 2009/0133212 A1 | 5/2009 | Morishita et al. |
| 2009/0178232 A1 | 7/2009 | Hyun et al. |
| 2009/0183338 A1 | 7/2009 | Van Raalte et al. |
| 2009/0217820 A1 | 9/2009 | Neudeck |
| 2009/0293224 A1 | 12/2009 | Hyun et al. |
| 2010/0018173 A1 | 1/2010 | Park et al. |
| 2010/0206173 A1 | 8/2010 | Oh |
| 2010/0269463 A1 | 10/2010 | Duffy et al. |
| 2010/0307134 A1 | 12/2010 | Sangiovani |
| 2010/0326396 A1 | 12/2010 | Patel et al. |
| 2011/0152054 A1 | 6/2011 | Fall et al. |
| 2011/0186504 A1 | 8/2011 | Rocklitz |
| 2011/0197556 A1 | 8/2011 | Brown et al. |
| 2011/0252759 A1 | 10/2011 | Nicholas |
| 2011/0265436 A1* | 11/2011 | Platt ................... B01D 27/005 |
| | | 55/497 |
| 2012/0047858 A1 | 3/2012 | Kim et al. |
| 2012/0055127 A1 | 3/2012 | Holzmann et al. |
| 2012/0110962 A1* | 5/2012 | Dewit ............... B01D 46/0005 |
| | | 55/357 |
| 2012/0118814 A1* | 5/2012 | Moy .................... B01D 25/001 |
| | | 210/493.1 |
| 2012/0180664 A1 | 7/2012 | Lundquist |
| 2012/0211408 A1 | 8/2012 | Hopkins |
| 2012/0211411 A1 | 8/2012 | Hopkins |
| 2012/0233807 A1 | 9/2012 | Van Der Kooi et al. |
| 2012/0261333 A1 | 10/2012 | Moran et al. |
| 2013/0062276 A1 | 3/2013 | Barreteau et al. |
| 2013/0189081 A1 | 7/2013 | Bryant et al. |
| 2013/0306547 A1 | 11/2013 | Norris |
| 2014/0014597 A1 | 1/2014 | Knight et al. |
| 2014/0130467 A1 | 5/2014 | Herman et al. |
| 2014/0137524 A1 | 5/2014 | Jarrier |
| 2014/0165839 A1 | 6/2014 | Crabtree |
| 2014/0209528 A1 | 7/2014 | Eleftherakis et al. |
| 2014/0209529 A1 | 7/2014 | Eleftherakis et al. |
| 2014/0235419 A1 | 8/2014 | Lise et al. |
| 2014/0260132 A1 | 9/2014 | Maruyama |
| 2014/0260138 A1 | 9/2014 | Edwards et al. |
| 2014/0260139 A1* | 9/2014 | Merritt ............... B01D 46/0005 |
| | | 55/497 |
| 2014/0331627 A1 | 11/2014 | Majer et al. |
| 2015/0013290 A1 | 1/2015 | Holzmann et al. |
| 2015/0047304 A1 | 2/2015 | Son |
| 2015/0059301 A1 | 3/2015 | Kaufmann et al. |
| 2015/0101486 A1 | 4/2015 | Castro et al. |
| 2015/0165348 A1 | 6/2015 | Lo |
| 2015/0165352 A1 | 6/2015 | Lang |
| 2015/0165362 A1 | 6/2015 | Canfield et al. |
| 2015/0211452 A1 | 7/2015 | Brown |
| 2015/0251111 A1 | 9/2015 | Savstrom et al. |
| 2015/0305583 A1 | 10/2015 | Jonsson |
| 2015/0315544 A1 | 11/2015 | Hamman |
| 2016/0016100 A1 | 1/2016 | Mouanda et al. |

| 2016/0030888 A1* | 2/2016 | Diemer ............. B01D 63/0822 |
| | | 210/433.1 |
| 2016/0067647 A1 | 3/2016 | Tate et al. |
| 2016/0193714 A1 | 7/2016 | Machama et al. |
| 2016/0214053 A1 | 7/2016 | Schwartz |
| 2016/0219954 A1 | 8/2016 | Nakamura |
| 2016/0265436 A1 | 9/2016 | Bryant et al. |
| 2016/0296773 A1 | 10/2016 | Lin |
| 2017/0024657 A1 | 1/2017 | Sahu et al. |
| 2017/0028339 A1 | 2/2017 | Savstrom |
| 2017/0028341 A1 | 2/2017 | Rocklitz et al. |
| 2017/0056793 A1 | 3/2017 | Klein et al. |
| 2017/0056807 A1 | 3/2017 | Klein et al. |
| 2017/0065924 A1 | 3/2017 | Holzmann et al. |
| 2017/0157550 A1 | 6/2017 | Merritt et al. |
| 2017/0197165 A1 | 7/2017 | Schwartz et al. |
| 2017/0203247 A1 | 7/2017 | Lee |
| 2017/0216757 A1 | 8/2017 | Ouyang et al. |
| 2017/0234221 A9 | 8/2017 | Bryant et al. |
| 2017/0246571 A1 | 8/2017 | Adamek et al. |
| 2017/0259216 A1 | 9/2017 | Madhavaram et al. |
| 2017/0266617 A1 | 9/2017 | Difrancesco et al. |
| 2018/0104651 A1 | 4/2018 | Guo et al. |
| 2018/0117518 A1* | 5/2018 | Johnson ............. B01D 46/2411 |
| 2018/0161717 A1* | 6/2018 | Adamek ............. B01D 46/526 |
| 2019/0009204 A1 | 1/2019 | Schwartz |
| 2019/0046915 A1 | 2/2019 | Gieseke et al. |
| 2019/0329170 A1* | 10/2019 | Page ...................... B01D 46/10 |
| 2020/0078721 A1 | 3/2020 | Ouyang et al. |
| 2020/0198681 A1 | 6/2020 | Jian |
| 2021/0046413 A1* | 2/2021 | Ouyang .......... F02M 35/02441 |
| 2021/0129063 A1* | 5/2021 | Knapke ................. B01D 53/58 |
| 2021/0162332 A1* | 6/2021 | Loehl ................ B01D 46/0005 |
| 2022/0118386 A1* | 4/2022 | Verdegan .............. B01D 29/07 |
| 2022/0355235 A1* | 11/2022 | Detra .................. B01D 46/525 |
| 2023/0018748 A1* | 1/2023 | Adams .............. B01D 46/0036 |

FOREIGN PATENT DOCUMENTS

| CN | 101534923 A | 9/2009 | |
| CN | 101626820 A | 1/2010 | |
| CN | 102159296 A | 8/2011 | |
| CN | 102781546 A | 11/2012 | |
| CN | 103796726 A | 5/2014 | |
| CN | 106861311 A | 6/2017 | |
| CN | 107073376 A | 8/2017 | |
| CN | 108601996 A | 9/2018 | |
| CN | 109641169 A | 4/2019 | |
| CN | 113856367 A * | 12/2021 | .......... B01D 46/526 |
| DE | 83 23 892 | 12/1985 | |
| DE | 10 309 661 A1 | 9/2004 | |
| DE | 10 2015 007 659 A1 | 12/2015 | |
| EP | 0 671 15 A1 | 12/1982 | |
| EP | 0 842 689 | 5/1998 | |
| EP | 1 118 369 A1 | 7/2001 | |
| EP | 1 254 689 A1 | 11/2002 | |
| ES | 2868898 T3 * | 10/2021 | .......... B01D 46/522 |
| GB | 0 753 510 | 7/1956 | |
| GB | 2 131 717 | 6/1987 | |
| IT | MI20111046 A1 * | 12/2012 | ........ B01D 46/0001 |
| JP | 2009057859 A * | 3/2009 | .......... B01D 46/526 |
| JP | 5333550 B2 | 11/2013 | |
| KR | 20040056938 A | 7/2004 | |
| KR | 20210133669 A * | 11/2021 | ............ B01D 46/58 |
| WO | WO-2010011628 A2 * | 1/2010 | ......... B01D 46/0005 |
| WO | WO-2010014579 A1 * | 2/2010 | ............ B01D 46/58 |
| WO | WO-2012/067729 A1 | 5/2012 | |
| WO | WO-2013/133865 A1 | 9/2013 | |
| WO | WO-2016/014549 A1 | 1/2016 | |
| WO | WO-2016/019307 A1 | 2/2016 | |
| WO | WO-2016/040332 A1 | 3/2016 | |
| WO | WO-2016/077377 | 5/2016 | |
| WO | WO-2017/031168 A1 | 2/2017 | |
| WO | WO-2017/066169 A1 | 4/2017 | |
| WO | WO-2018/191147 A1 | 10/2018 | |
| WO | WO-2018/191865 A1 | 10/2018 | |
| WO | WO-2019/032773 | 2/2019 | |
| WO | WO-2019/040324 A1 | 2/2019 | |
| WO | WO-2019/060904 A1 | 3/2019 | |

(56)                References Cited

FOREIGN PATENT DOCUMENTS

WO      WO-2019199676 A1 * 10/2019    .......... B01D 46/526
WO      WO-2020/174251        9/2020
WO      WO-2020/198681       10/2020
WO      WO-2020/263275       12/2020
WO      WO-2021133589 A1 *   7/2021    .......... B01D 46/526

OTHER PUBLICATIONS

First Office Action issued for Chinese Patent Application No. 2020890089705.9 issued Apr. 27, 2023, 7 pages.
Office Action issued for European Patent Application No. 19 800 228.9 issued Feb. 10, 2023, 5 pages.
International Search Report and Written Opinion issued for PCT Application No. PCT/US2020/065057 issued Mar. 19, 2021, 15 pages.
Matteson, Michael J. and Orr, Clyde, editors, "Filtration Principles and Practices, Second Edition, Revised and Expanded," Marcel Dekker, Inc. New York and Basel, 1987, p. 548.
Non-Final Office Action issued for U.S. Appl. No. 17/044,529 issued Sep. 21, 2023, 61 pages.
Non-Final Office Action issued for U.S. Appl. No. 17/862,050 issued Aug. 2, 2023, 37 pages.
EP Extended Search Report on EP19800228.9 dtd Dec. 2, 2021 (11 pages).
First Examination Report for Indian Patent App. No. 201947020330 dated Nov. 27, 2020, 6 pages.
First Examination Report for Indian Patent App. No. 809/KOLNP/2012 dated Oct. 8, 2018, 6 pages.
First Examination Report issued for Indian Patent Application No. 202047047851, issued Mar. 10, 2021, 6 pages.
First Office Action for Chinese Patent App. No. 201410767340.7 dated Nov. 26, 2015, 14 pages (with translation).
First Office Action issued for Chinese Patent Application No. 2017800765908, issued Jan. 20, 2021, 13 pages.
First Office Action issued for Chinese Patent Application No. CN 201780064747.5 issued Dec. 1, 2020, 10 pages.
First Office Action issued for Chinese Patent Application No. CN201980029872.1 issued Oct. 11, 2021.
Second Office Action issued for German Patent Application No. DE 112011103785.6 issued Nov. 10, 2021.
Office Action issued for European Patent Application No. EP 17862733.7 issued Nov. 18, 2021, 5 pages.
Office Action issued for European Patent Application No. EP 17862733.7 issued Jun. 24, 2021, 5 pages.
Foreign Search Report on EP 17862733.7 dtd Jul. 21, 2020.
International Search Report & Written Opinion for PCT/US2011/054924 dated Jan. 23, 2012, 9 pages.
International Search Report and Written Opinion for PCT/US2017/056744, dated Feb. 13, 2018, 11 pages.
International Search Report and Written Opinion for PCT/US2017/065726, dated Feb. 16, 2018, 11 pages.
International Search Report and Written Opinion for PCT/US2019/031132, dated Jul. 17, 2019, 12 pages.
International Search Report and Written Opinion for PCT/US2019/065259 dated Feb. 11, 2020, 15 pages.
Non-Final Office Action on U.S. Appl. No. 16/343,076 dtd Dec. 20, 2021.
Office Action issued for German Patent Application No. DE 112011103785.6 issued Mar. 5, 2021, 19 pages.
Partial Supplementary European Search Report for European Patent App. No. 17862733.7 dated Apr. 17, 2020, 11 pages.
Second Office Action issued for Chinese Patent Application No. CN 201780064747.5, issued Jul. 23, 2021, 10 pages.
US Office Action on U.S. Appl. No. 16/468,460 dtd Jul. 9, 2021.
Office Action issued for U.S. Appl. No. 17/849,177 issued Jan. 16, 2025, 28 pages.
Partial Supplementary European Search Report issued for European Patent Application No. 22811880.8 issued Mar. 6, 2025, 14 pages.
Chinese Office Action issued for Chinese Patent Application No. 201980103361.X issued Jan. 30, 2024, 11 pages.
Non-Final Office Action issued for U.S. Appl. No. 17/849,177, issued Jul. 23, 2025, 23 pages.

* cited by examiner 3826  3854  3858  3890  3824
Out

3820

3804

3802

3802

3872

3868
3866
3802

3804

40

44

28

3822  3874  3846  3864  3852  3850  3836  3862
3880
IN

3834

3826  3826  3826

3820

3834

3836

3880
IN

Flow Rate
4902

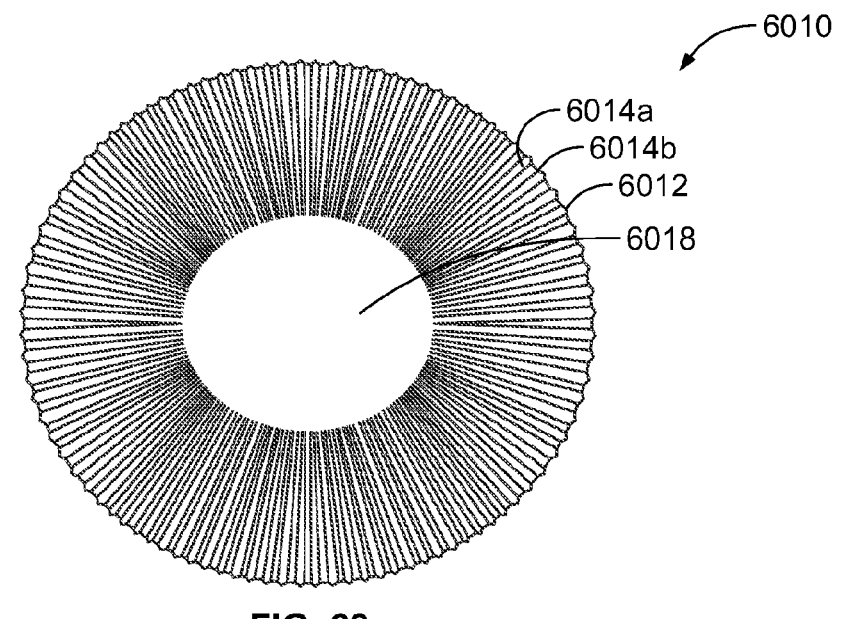
FIG. 63
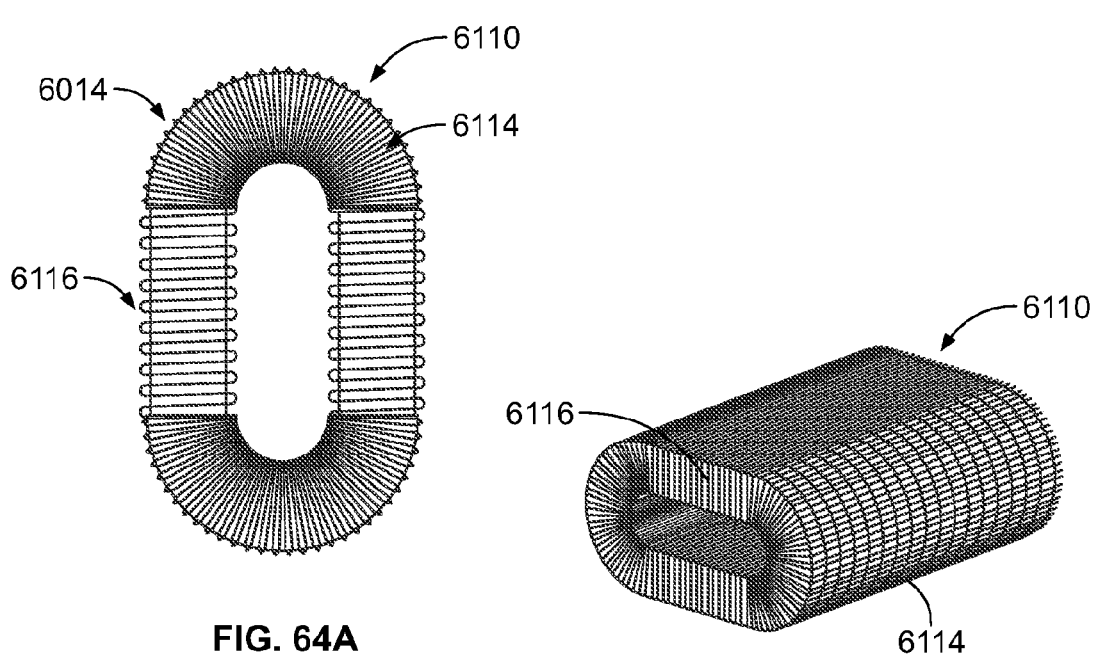
FIG. 64A
FIG. 64B

FORMED FILTER MEDIA

CROSS-REFERENCE TO RELATED APPLICATION

The present application is a National Phase of PCT Application No. PCT/US2019/065259, filed Dec. 9, 2019. The contents of this application are hereby incorporated by reference in their entirety.

TECHNICAL FIELD

The present disclosure relates generally to filters for use with engine systems. More particularly, the present application relates to filter media, filter media packs, and filter elements for filtering fluids having a wide variety of shapes including tetrahedral media.

BACKGROUND

Fluid streams, such as gases and liquids, carry contaminant material therein in many instances. It is often desirable to filter some or all of the contaminant material from fluid stream. The present technology applies to but is not limited to internal combustion engines. For example, internal combustion engines use various fluids during operation. For example, fuel (e.g., diesel, gasoline, natural gas, etc.) is used to run the engine. Air may be mixed with the fuel to produce an air-fuel mixture, which undergoes combustion within the engine to run at varying air-fuel ratios. Additionally, one or more lubricants may be provided to the engine to lubricate various parts of the engine (e.g., piston cylinder, crank shaft, bearings, gears, valves, cams, etc.). These fluids may become contaminated with particulate matter (e.g., carbon, dust, metal particles, etc.) which may damage the various parts of the engine if not removed from the fluid. To remove such particulate matter or other contaminants, the fluid is generally passed through a filter assembly (e.g., a fuel filter, a lubricant filter, an air filter, a water filter assembly, etc.) including a filter element structured to remove the particulate matter from the fluid prior to delivering the fluid. Many mounts or structures in which the filter assemblies are installed may be space constrained and have unique shapes, and complex filter element shapes may be desired to accommodate the filter element within such mounting structures.

SUMMARY

In a first set of embodiments, a filter element defining an upstream inlet and a downstream outlet disposed axially away from the upstream inlet in an axial direction is described. The downstream outlet extends laterally in a lateral direction that is substantially parallel to the upstream inlet. The axial direction is substantially perpendicular to the upstream inlet and the downstream outlet. The lateral direction is substantially perpendicular to the axial direction. The filter element includes a filter media layer folded along a plurality of bend lines between the upstream inlet and the downstream outlet. The plurality of bend lines include a first set of bend lines extending from the upstream inlet axially towards the downstream outlet. The first set of bend lines include a first subset of bend lines extending from the upstream inlet axially along the axial direction towards a first termination point adjacent the downstream outlet. A second subset of bend lines extends from the upstream inlet axially along the axial direction towards the downstream outlet. The second subset of bend lines taper in a transverse direction as the second subset of bend lines extend axially in the axial direction. The transverse direction is substantially perpendicular to the axial direction and the lateral direction. The second subset of bend lines provide lateral cross-flow thereacross along the lateral direction between axial channels downstream of the upstream inlet. A second set of bend lines extend from the downstream outlet axially towards the upstream inlet. The second set of bend lines includes a third subset of bend lines that extend from the downstream outlet axially along the axial direction toward a second termination point adjacent the upstream inlet. A fourth subset of bend lines extend from the downstream outlet axially along the axial direction towards the upstream inlet. The fourth subset of bend lines taper in a transverse direction as the fourth subset of bend lines extend axially in the axial direction. The fourth subset of bend lines provide lateral cross-flow thereacross along the lateral direction between channels upstream of the downstream outlet. A plurality of wall segments extend in a serpentine manner between the plurality of bend lines. The plurality of wall segments extend axially and define axial channels therebetween. The plurality of wall segments define a laterally extending first serpentine span. The first serpentine span includes a plurality of repeating spans. Each span in the plurality of repeating spans includes a first wall segment. An external surface of the first wall segment defines a portion of a first channel. A second wall segment is laterally adjacent the first wall segment and a bend line in the second subset of bend lines joining thereto. An internal surface of the first wall segment and an internal surface of the second wall segment define a second channel. The second channel is interdigitated with the first channel. A third wall segment is laterally adjacent the second wall segment. An external surface of the third wall segment defines a portion of third channel. A fourth wall segment is laterally adjacent the third wall segment and a bend line in the fourth subset of bend lines joining thereto. An internal surface of the third wall segment and an internal surface of the fourth wall segment define a fourth channel. The fourth channel is interdigitated with the third channel. Each of the first channel, the second channel, the third channel and the fourth channel have a height along the transverse direction and a lateral width along the lateral direction.

In another set of embodiments, a filter element defining an upstream inlet and a downstream outlet disposed axially away from the upstream inlet in an axial direction is described. The downstream outlet extends laterally in a lateral direction substantially parallel to the upstream inlet. The axial direction is substantially perpendicular to the upstream inlet and the downstream outlet. The lateral direction is perpendicular to the axial direction. The filter element includes a filter media layer folded along a plurality of bend lines between the upstream inlet and the downstream outlet. The plurality of bend lines include a first set of bend lines extending from the upstream inlet axially towards the downstream outlet. The first set of bend lines include a first subset of bend lines extending from the upstream inlet axially along the axial direction towards a first termination point adjacent the downstream outlet. A second subset of bend lines extend from the upstream inlet axially along the axial direction towards the first termination point adjacent the downstream outlet. The second subset of bend lines taper in a transverse direction as the second subset of bend lines extend axially in the axial direction. The transverse direction is substantially perpendicular to the axial direction and the lateral direction. A third subset of bend lines extend from the upstream inlet axially along the axial direction towards the first termination point adjacent the downstream outlet. The third subset of bend lines taper in the transverse direction as the third subset of bend lines extend axially in the axial direction. A fourth subset of bend lines extend from the upstream inlet axially along the axial direction towards the first termination point adjacent the downstream outlet. The fourth subset of bend lines taper in the transverse direction as the fourth subset of bend lines extend axially in the axial direction. A plurality of wall segments extend in a serpentine manner between the plurality of bend lines. The plurality of wall segments extend axially and define axial channels therebetween. The plurality of wall segments define a laterally extending serpentine span. The serpentine span includes a plurality of repeating spans. Each span in the plurality of repeating spans includes a first wall segment. An external surface of the first wall segment defines a first portion of a first channel. A first angled wall segment is laterally adjacent the first wall segment and a bend line in the second subset of bend lines joining thereto. An external surface of the first angled wall segment defines a second portion the first channel. A second angled wall segment is laterally adjacent the first angled wall segment and a bend line in the third subset of bend lines joining thereto. A second wall segment is laterally adjacent the second angled wall segment and a bend line in the fourth subset of bend lines joining thereto. An internal surface of the first wall segment, an internal surface of the first angled wall segment, an internal surface of the second wall segment, and an internal surface of the second angled wall segment define a second channel. The second channel is interdigitated with the first channel.

In still another set of embodiments, a filter assembly is described. The filter assembly includes a filter element. The filter element includes a filter media. The filter media includes a plurality of filter media layers stacked on top of each other along the transverse direction to form the filter media. The filter media having an inlet surface at an inlet portion of the filter media and an outlet surface at an outlet portion of the filter media. The outlet portion is disposed axially away from the inlet portion in an axial direction. The axial direction is substantially perpendicular to the inlet surface and the outlet surface. The transverse direction is perpendicular to the axial direction. Each filter media layer in the plurality of filter media layers is folded along a plurality of bend lines between the inlet portion and the outlet portion. Each filter media layer in the plurality of filter media layers includes a plurality of wall segments extending in a serpentine manner between the plurality of bend lines. The plurality of wall segments extend axially and define axial channels therebetween. A seal member is disposed around the inlet portion of the filter media and adjacent the inlet surface. A support rib extends in the axial direction from the inlet portion toward the outlet portion. The support rib is configured to maintain the filter element structure.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing in this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
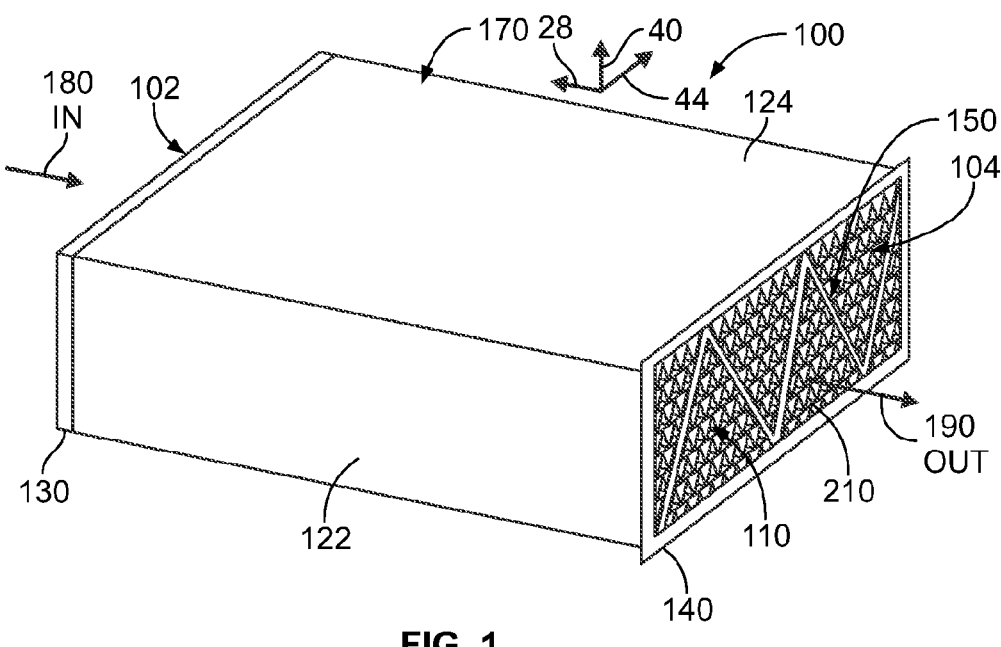

FIG. 1 is a perspective view of a filter assembly, according to an embodiment.

Figure 2:
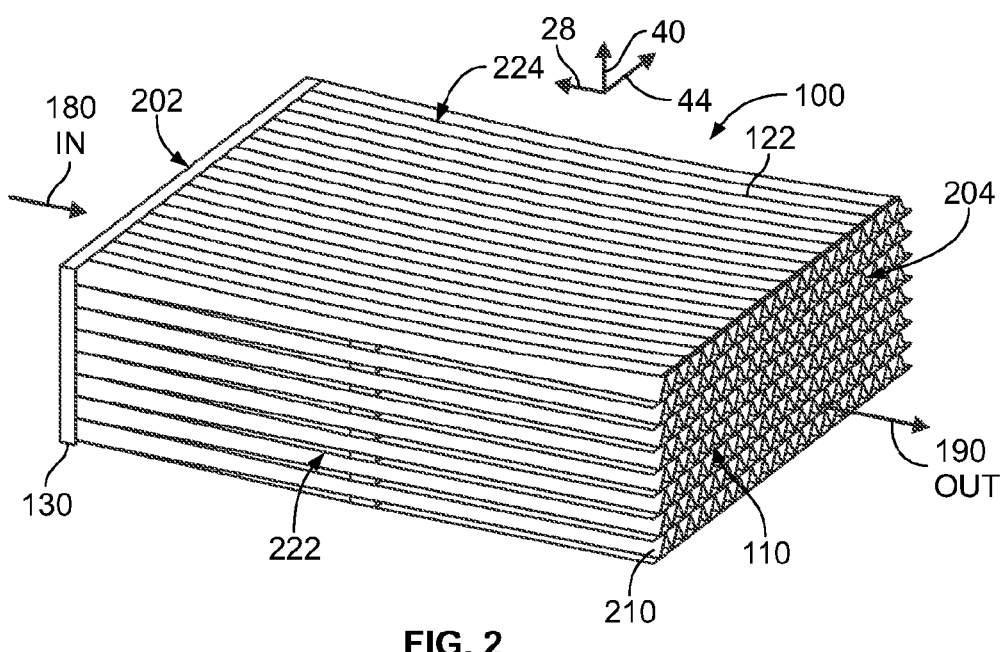

FIG. 2 is a perspective view of a filter media pack and seal member of the filter assembly FIG. 1.

Figure 3:
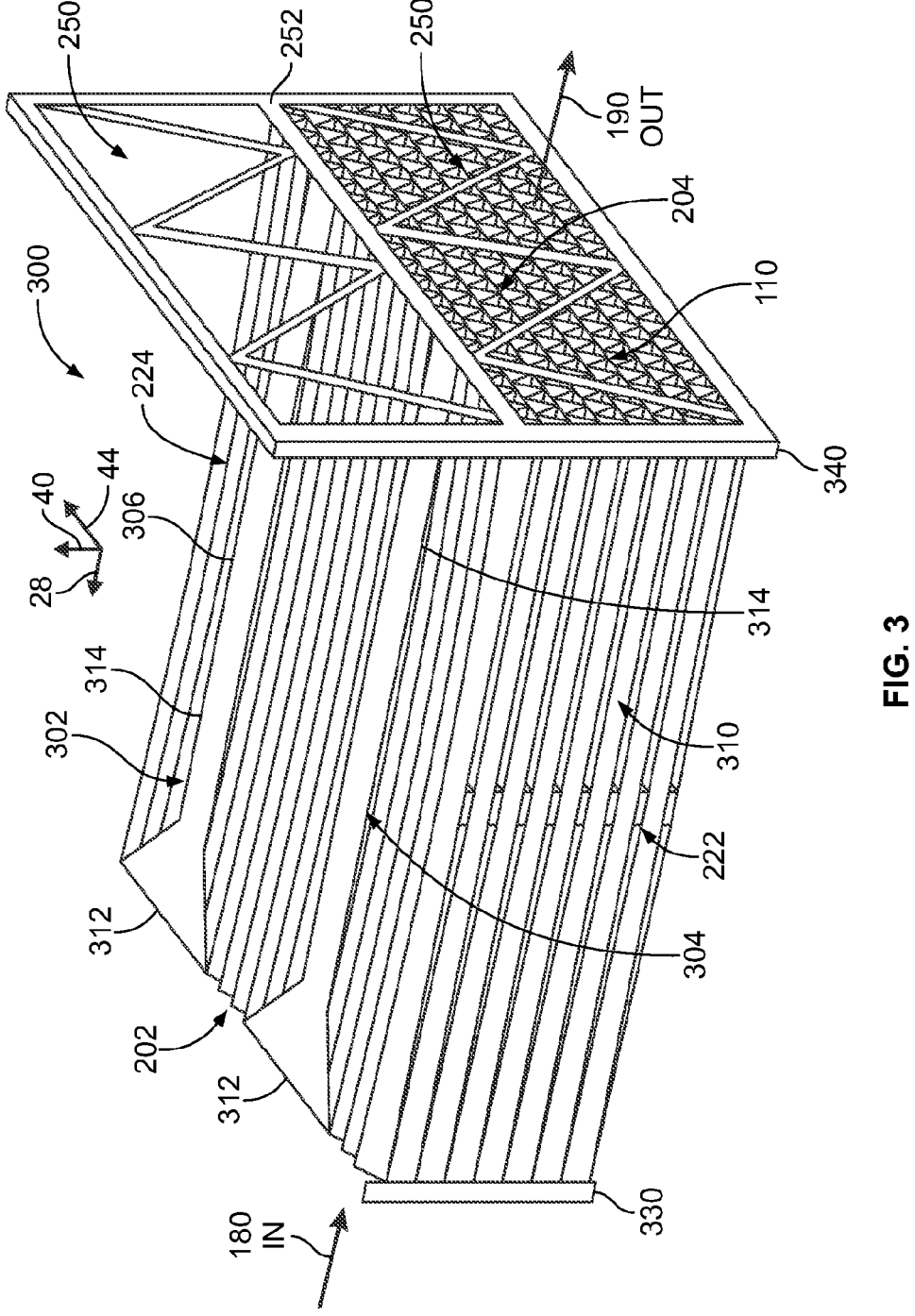

FIG. 3 is a perspective view of a filter media with seal members and internal support ribs, according to an embodiment.

Figure 4:
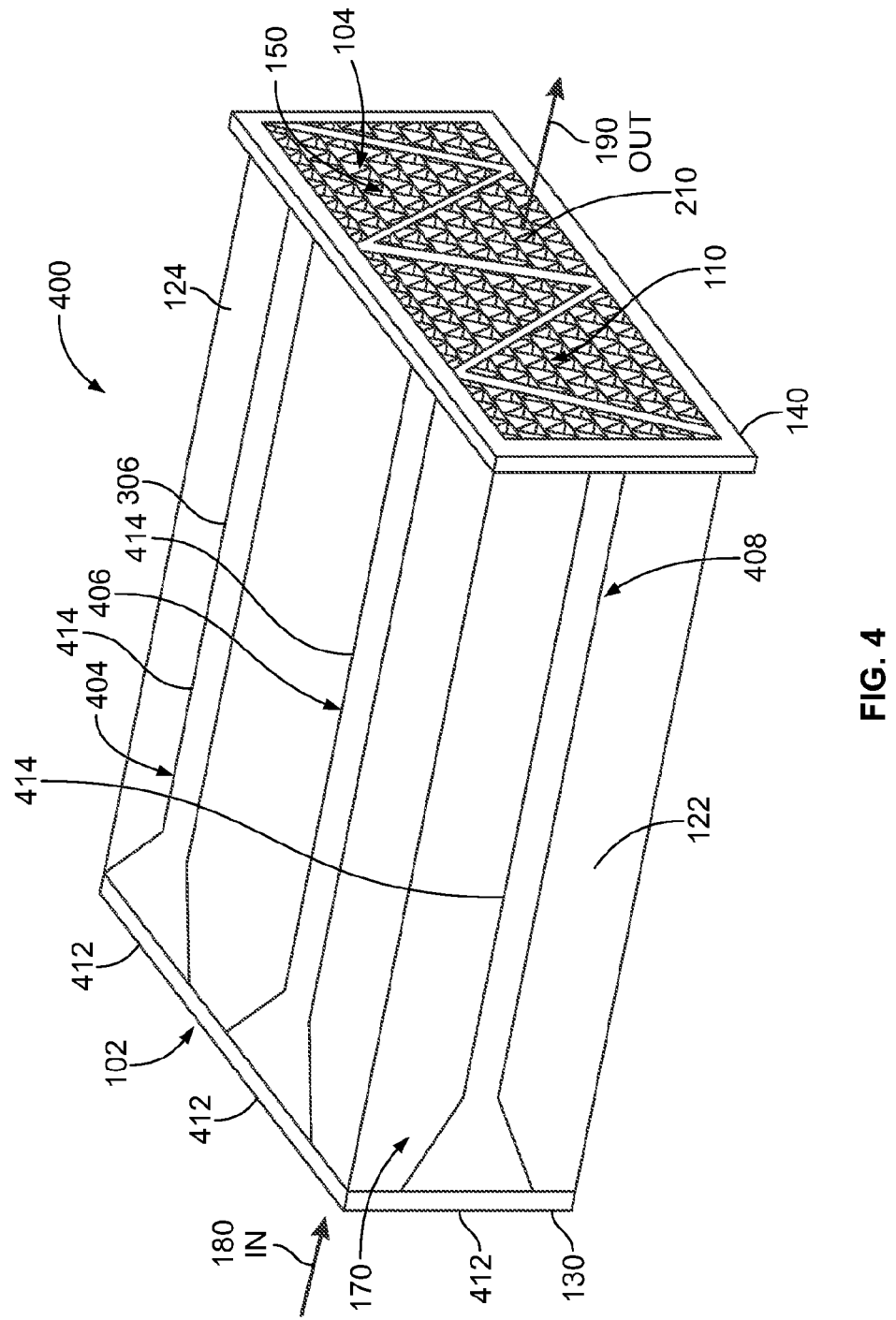

FIG. 4 is a perspective view of a filter media with seal members and external support ribs, according to an embodiment.

Figure 5:
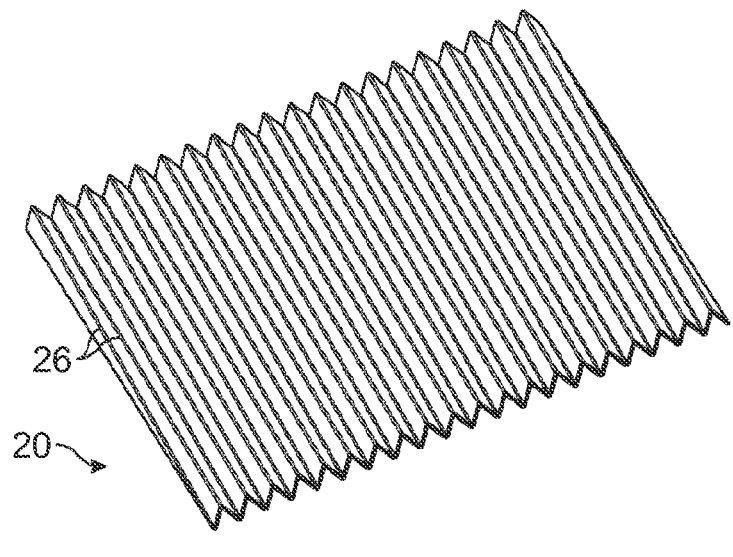

FIG. 5 is a perspective view of a filter media defining a plurality of tetrahedron forms, according to an embodiment.

Figure 6:
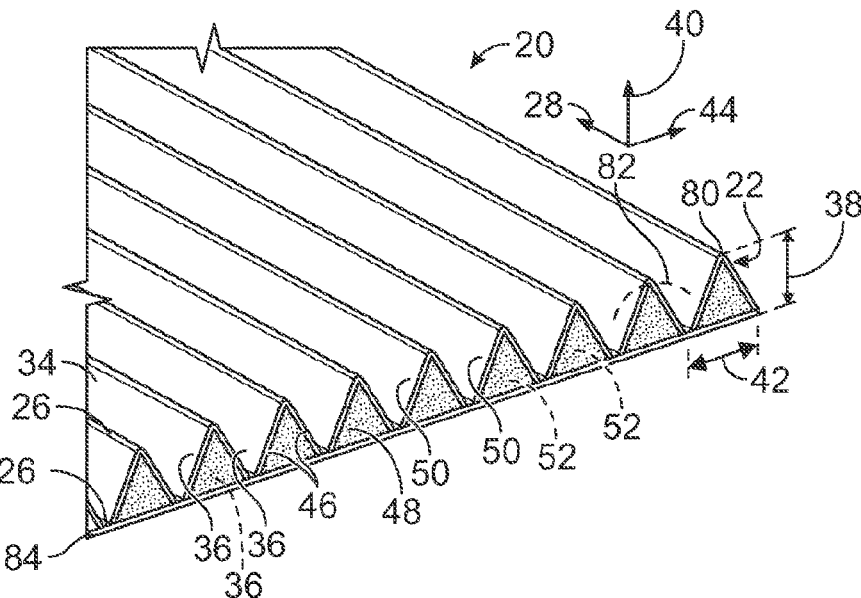

FIG. 6 is an enlarged perspective view of a filter media defining a plurality of tetrahedron forms.

Figure 7:
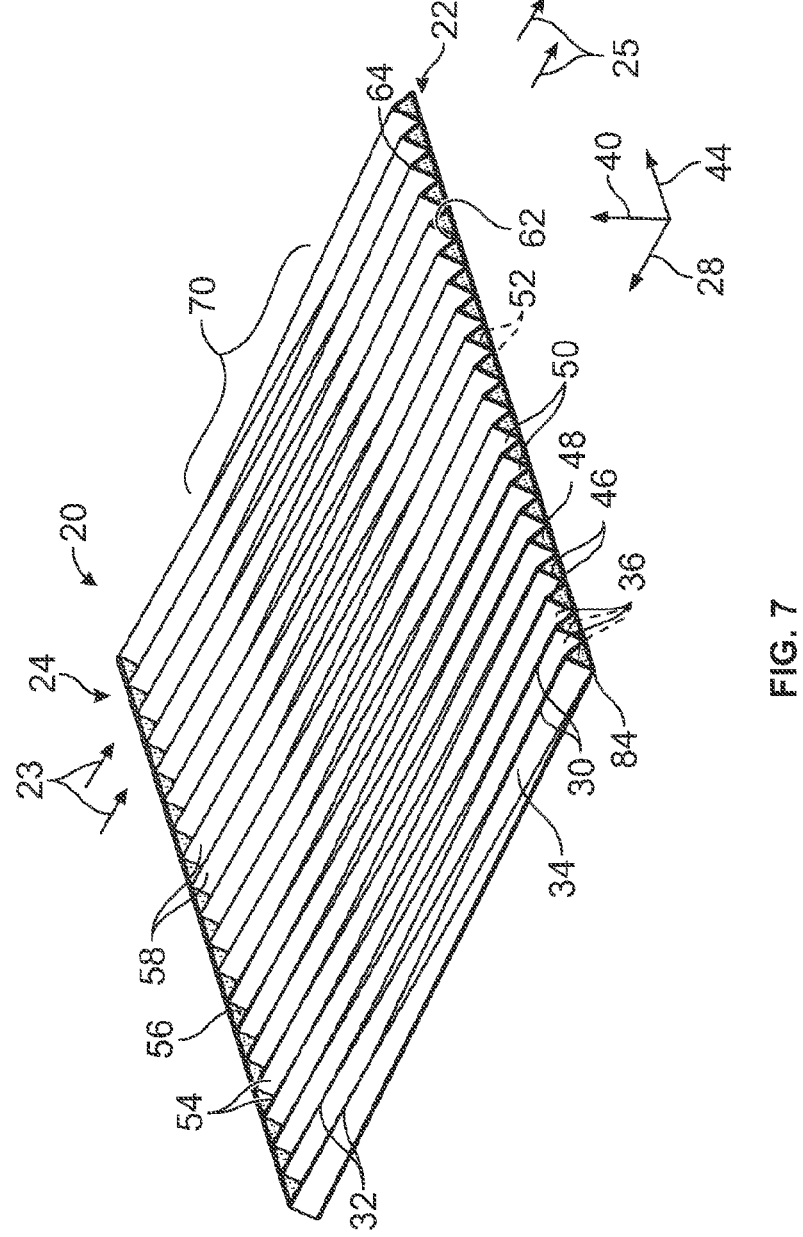

FIG. 7 shows the filter media of FIG. 2 from the outlet end.

Figure 8:
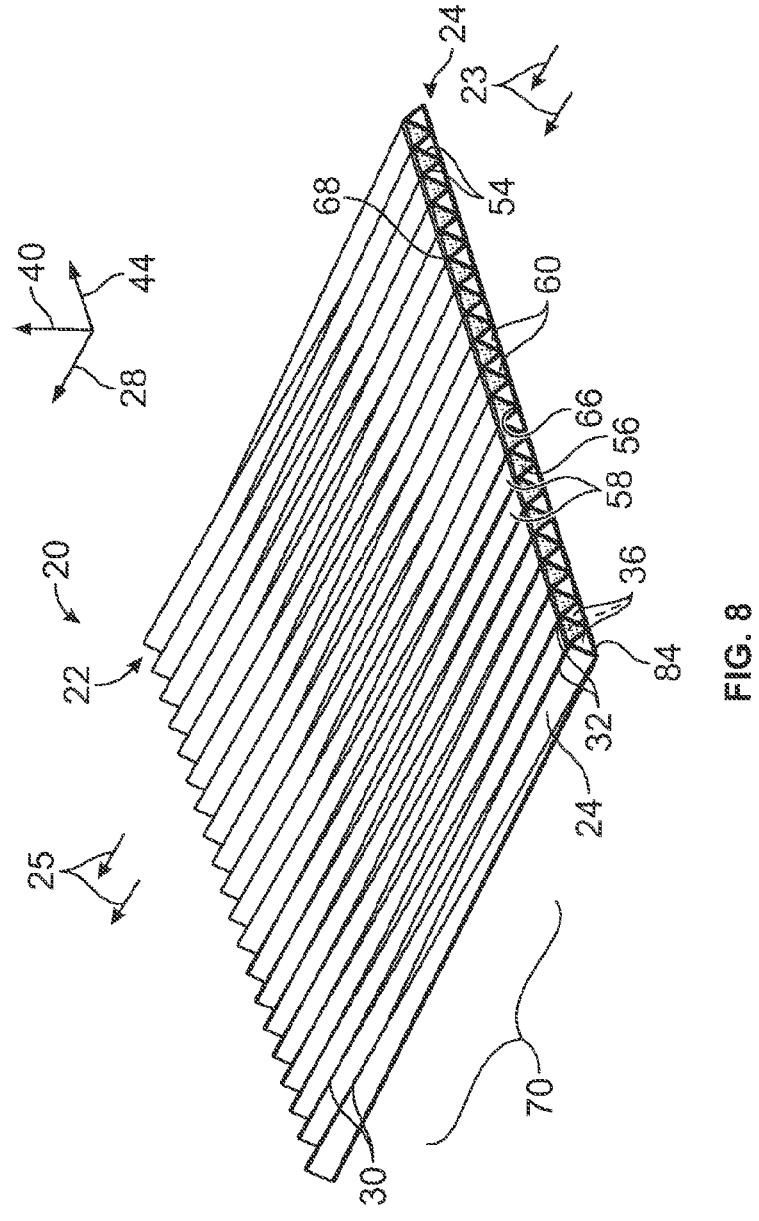

FIG. 8 shows the filter media of FIG. 2 from the inlet end.

Figure 9:
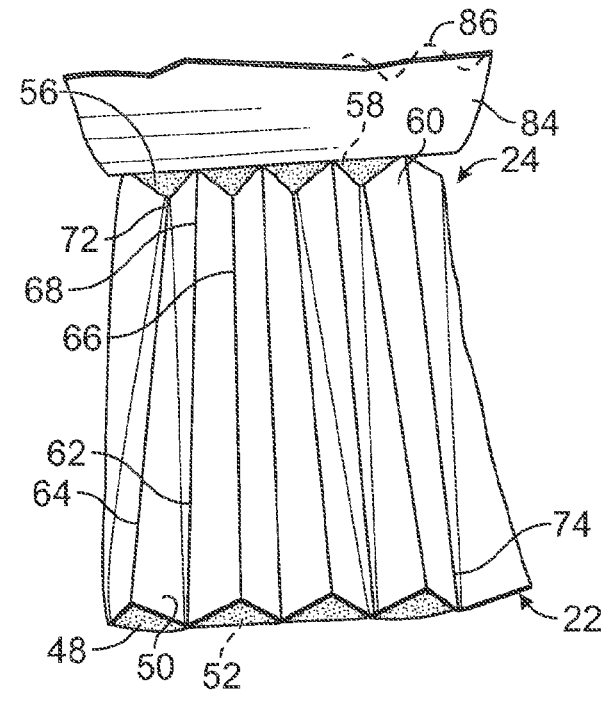

FIG. 9 is an exploded perspective view showing a portion of a filter media defining tetrahedron forms, according to an embodiment.

Figure 10:
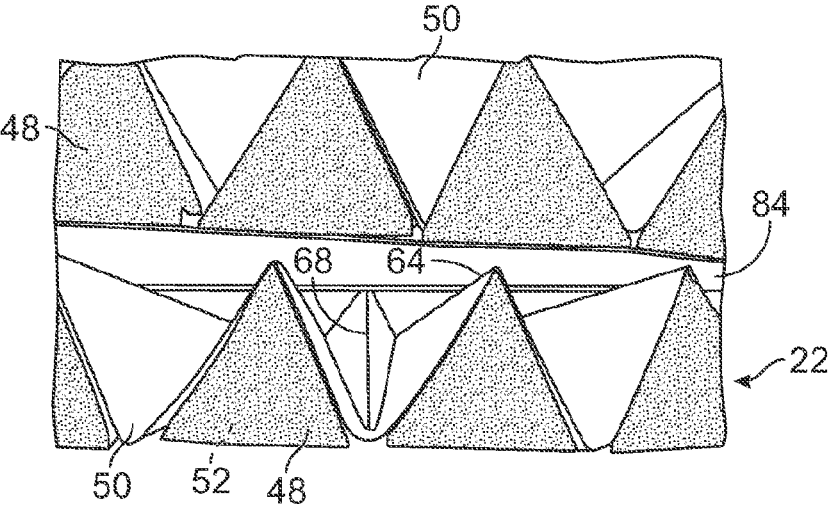

FIG. 10 is an enlarged perspective view showing a portion of a filter media defining tetrahedron forms, according to an embodiment.

Figure 11:
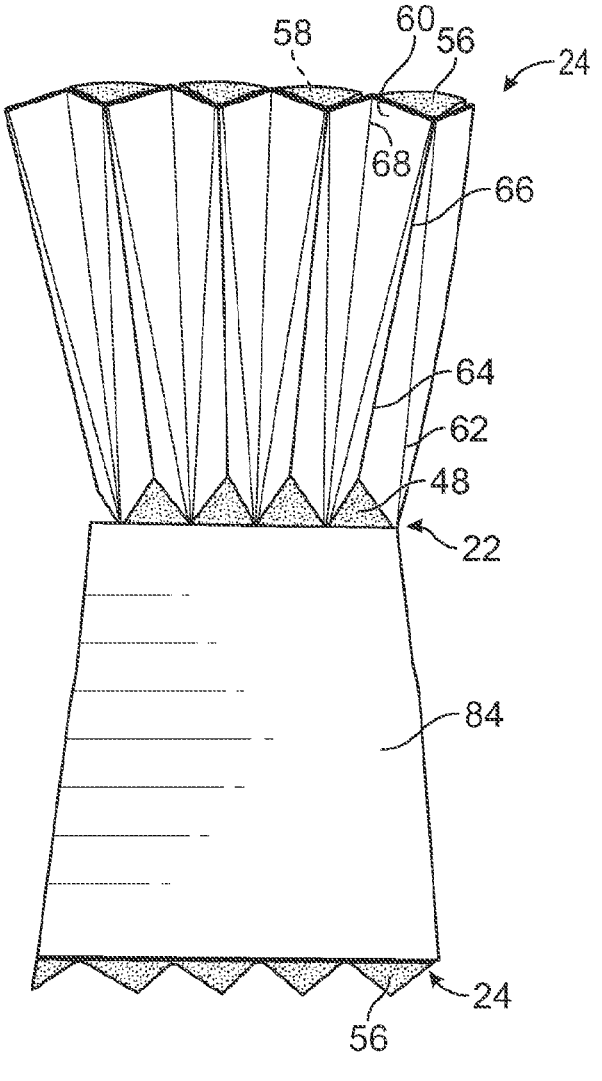

FIG. 11 is a view from the opposite end of the filter media shown in FIG. 10.

Figure 12:
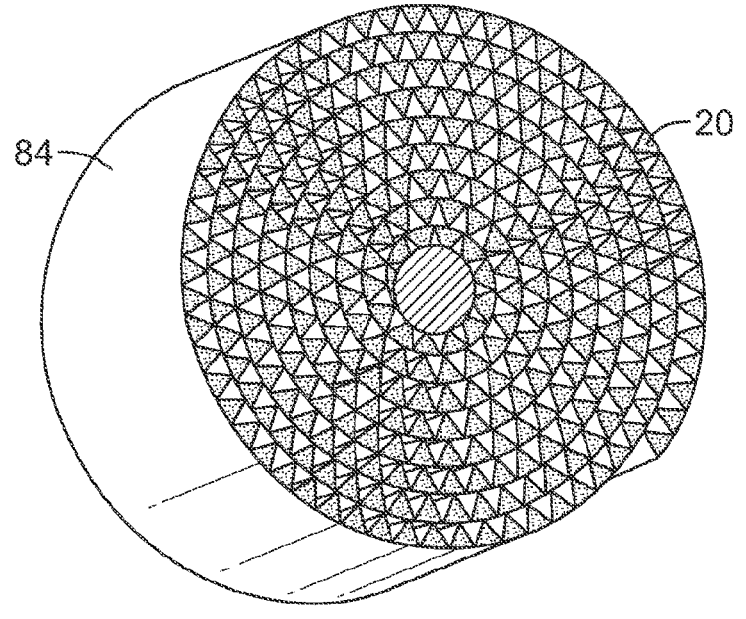

FIG. 12 is a perspective view showing a round, coiled media pack configuration including filter media, according to an embodiment.

Figure 13:
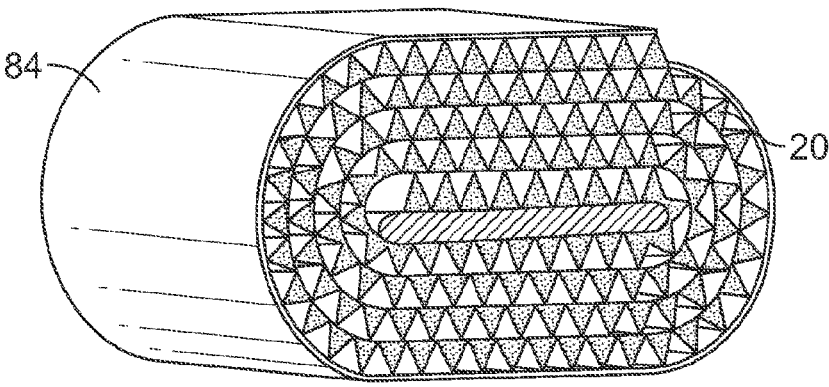

FIG. 13 is a perspective view showing an oval-shaped media pack configuration including filter media, according to an embodiment.

Figure 14:
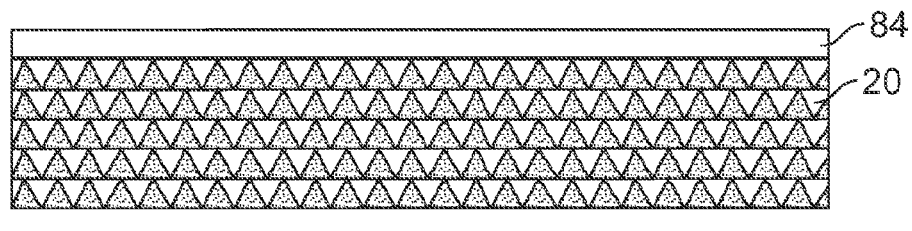

FIG. 14 is an end view showing a layered, stacked media pack configuration including filter media, according to an embodiment.

Figure 15:
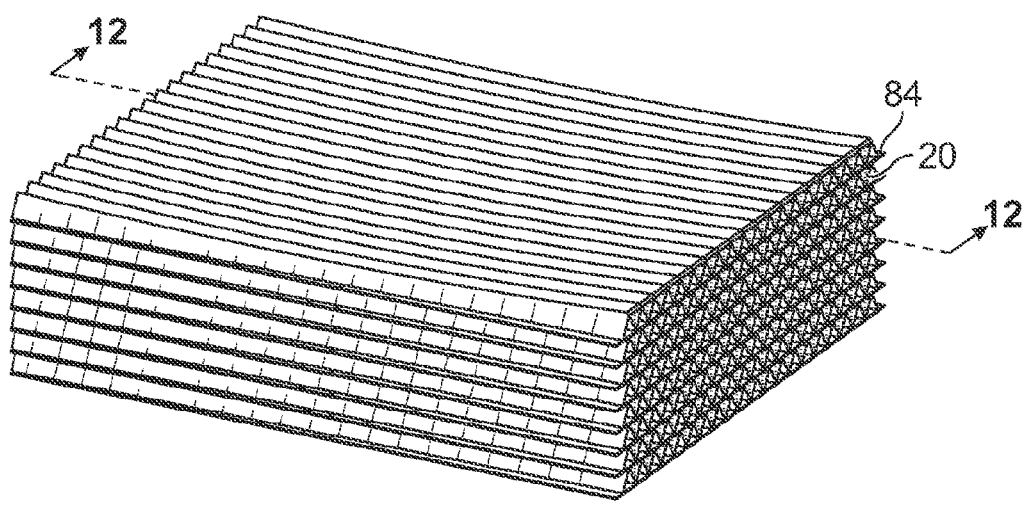

FIG. 15 is a perspective view further showing the implementation of FIG. 14.

Figure 16:
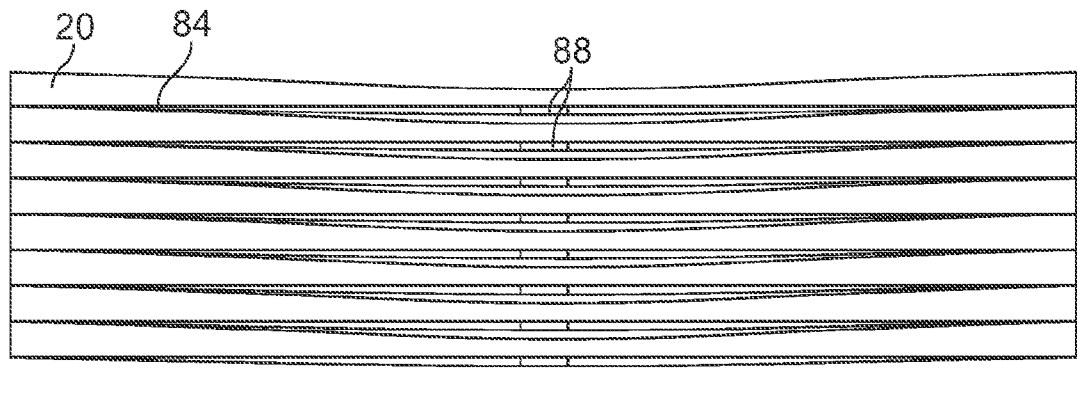

FIG. 16 is a sectional view taken along line 12-12 of FIG. 15.

Figure 17:
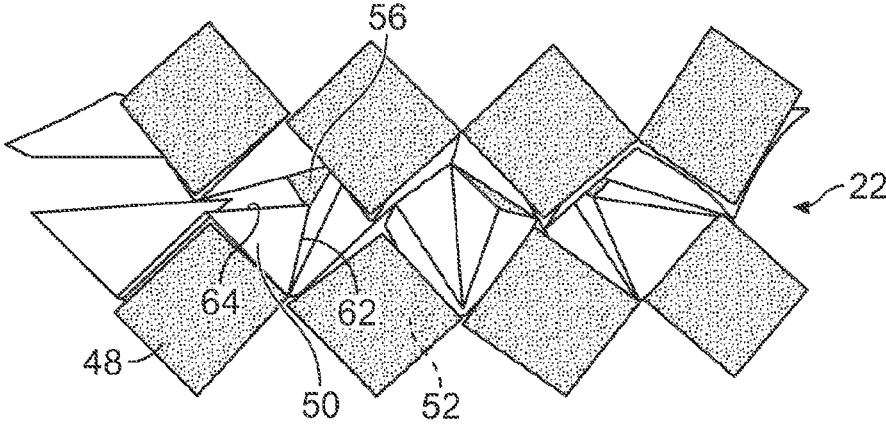

FIG. 17 is similar to FIGS. 9 and 10 and shows another embodiment.

Figure 18:
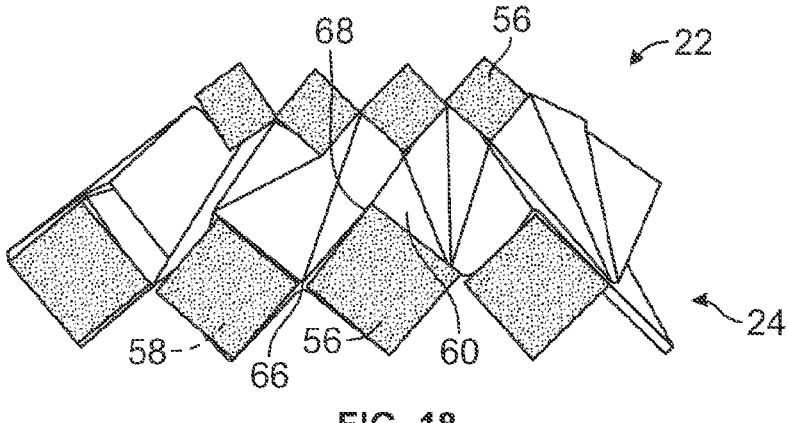

FIG. 18 is similar to FIG. 11 and is a view from the opposite end of FIG. 17.

Figure 19:
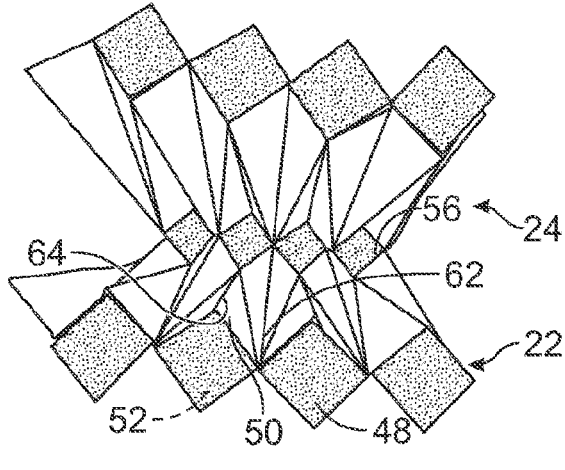

FIG. 19 is similar to FIG. 9 and further shows the construction of FIG. 17.

Figure 20:
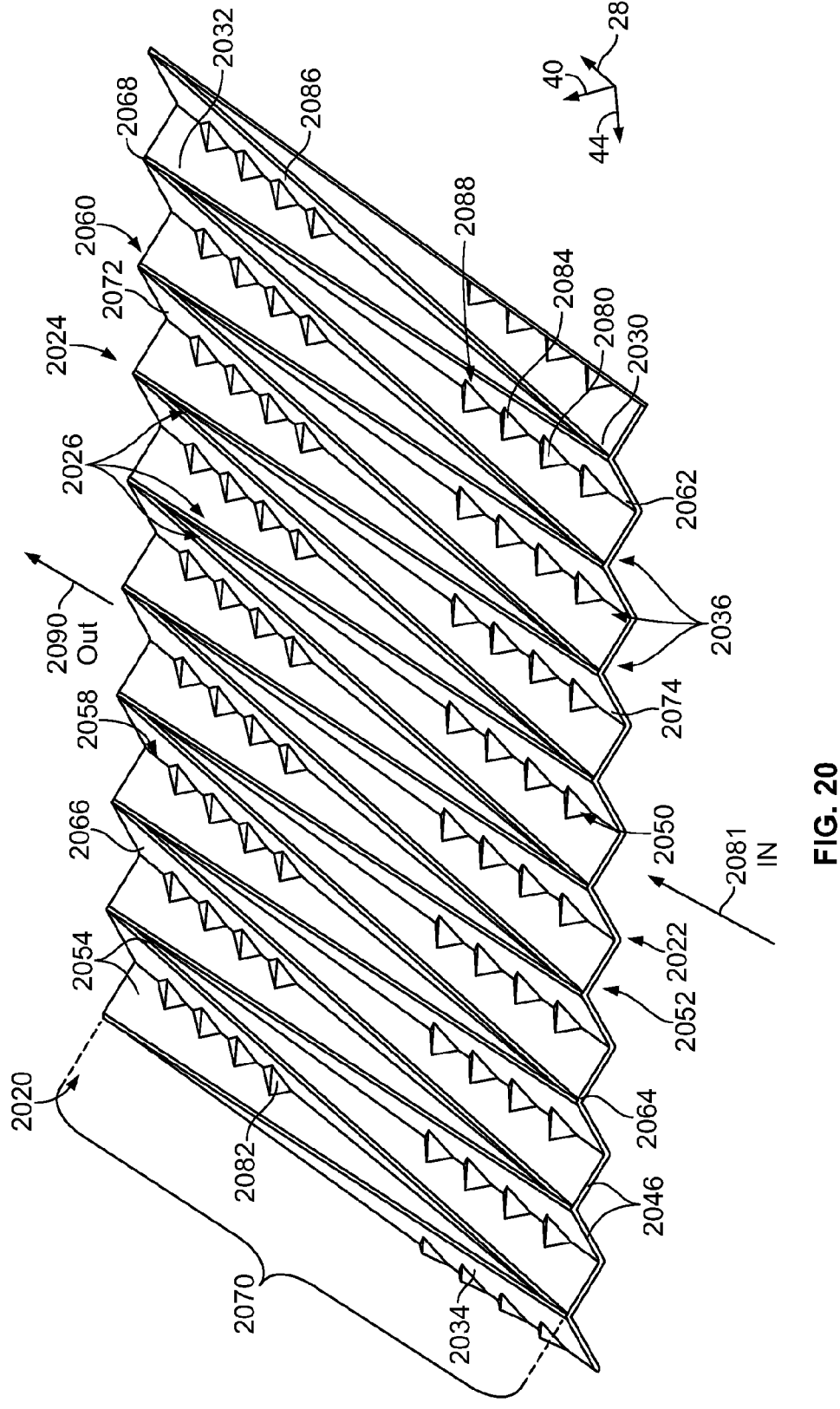

FIG. 20 is perspective view of a filter media with a plurality of embossments, according to an example embodiment.

Figure 21:
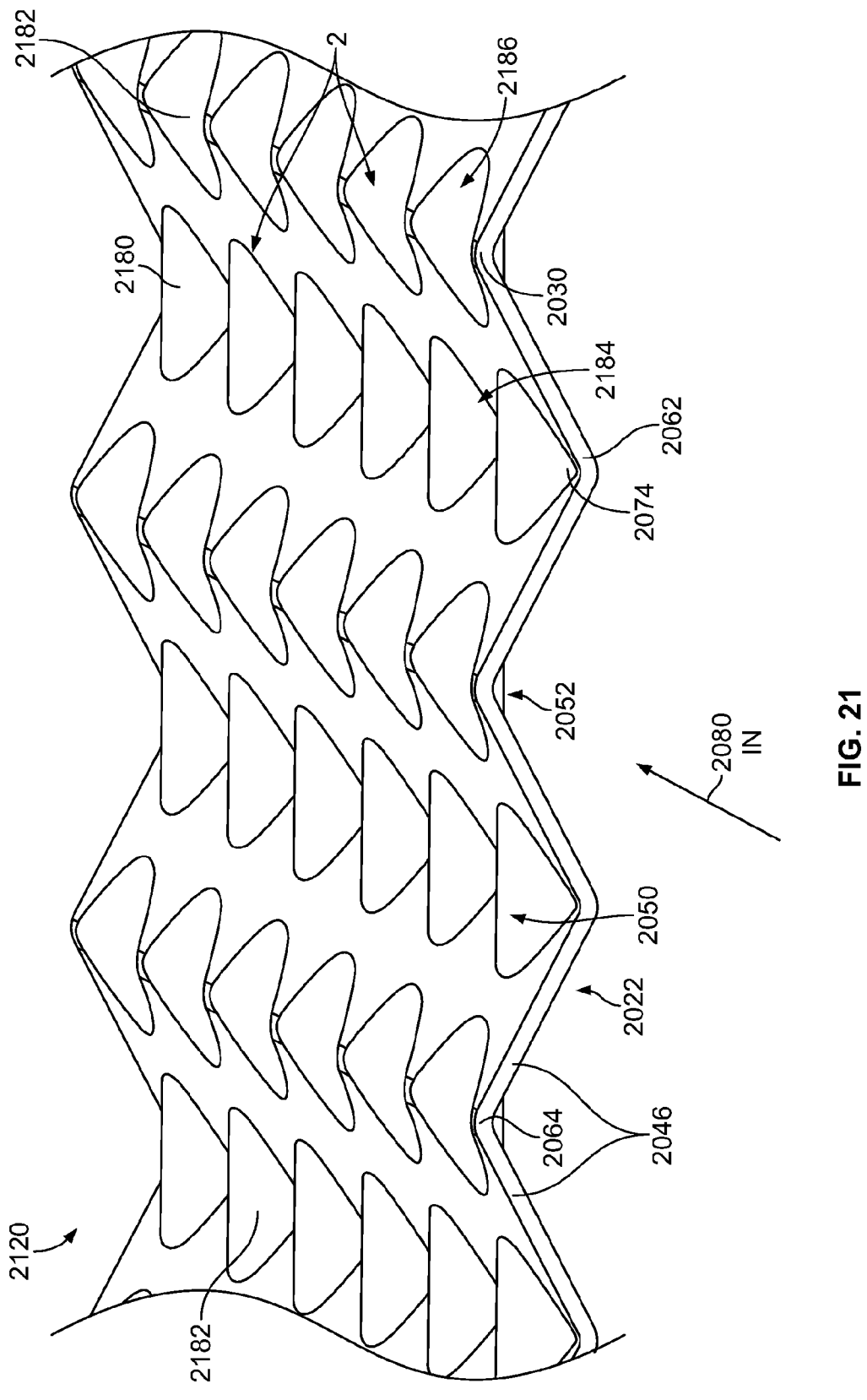

FIG. 21 is a front view of a filter media with a plurality of embossments, according to another example embodiment.

Figure 22A:
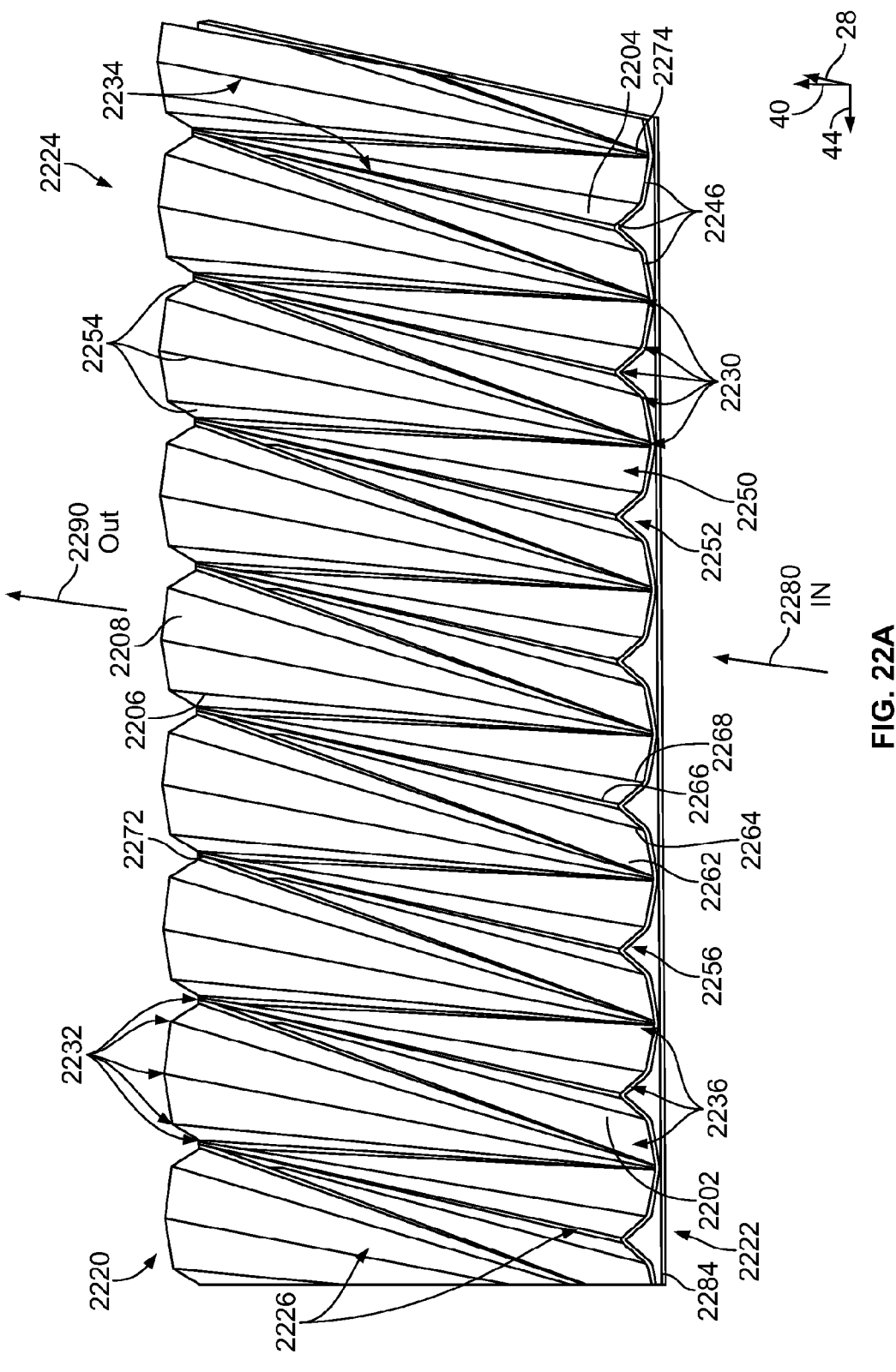

FIG. 22A is a front-perspective view of an inlet side of a five-sided formed filter media, according to an example embodiment.

Figure 22B:
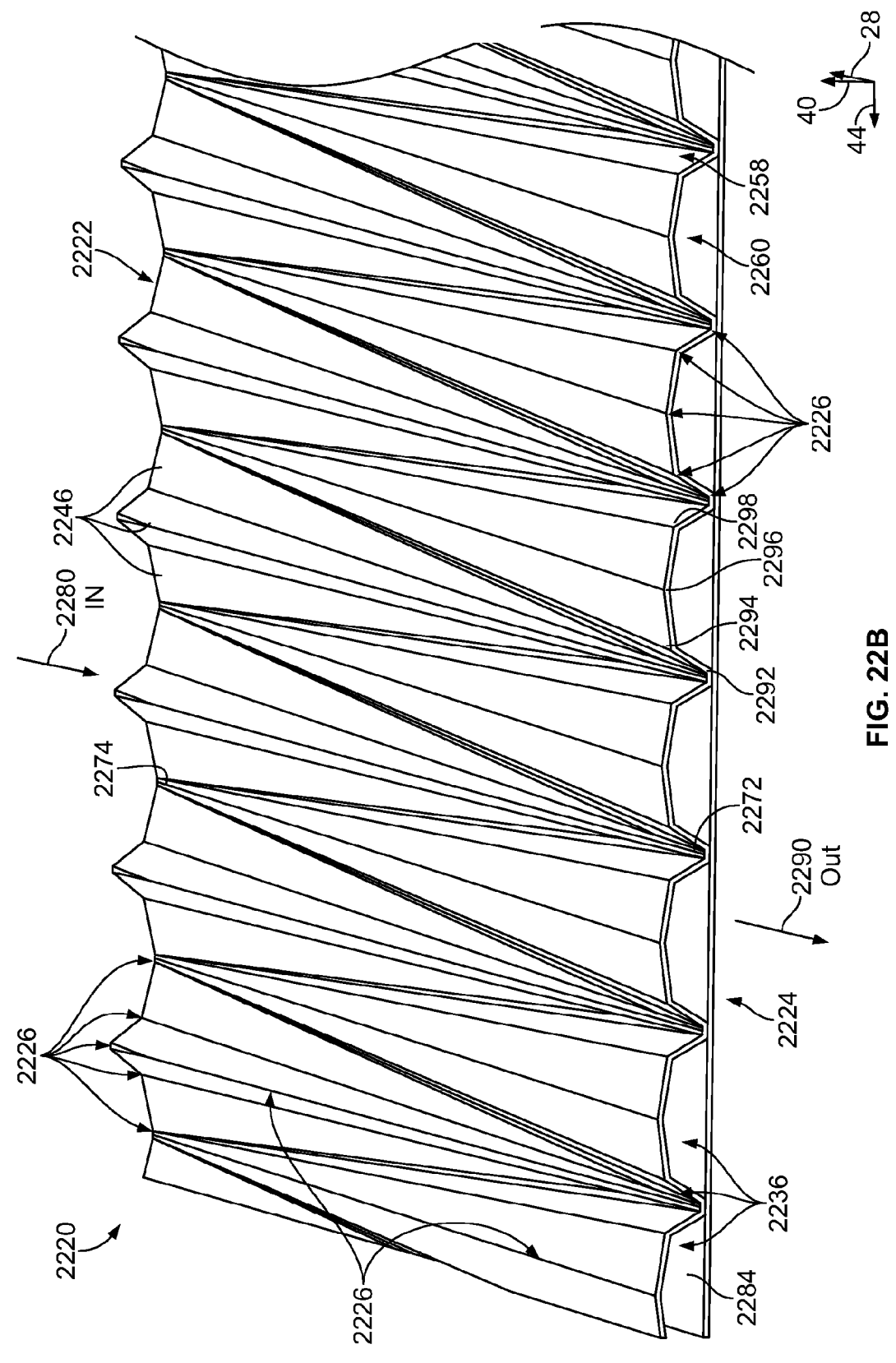

FIG. 22B is a front-perspective view of the outlet side of the five-sided formed filter media of FIG. 22A.

Figure 23A:
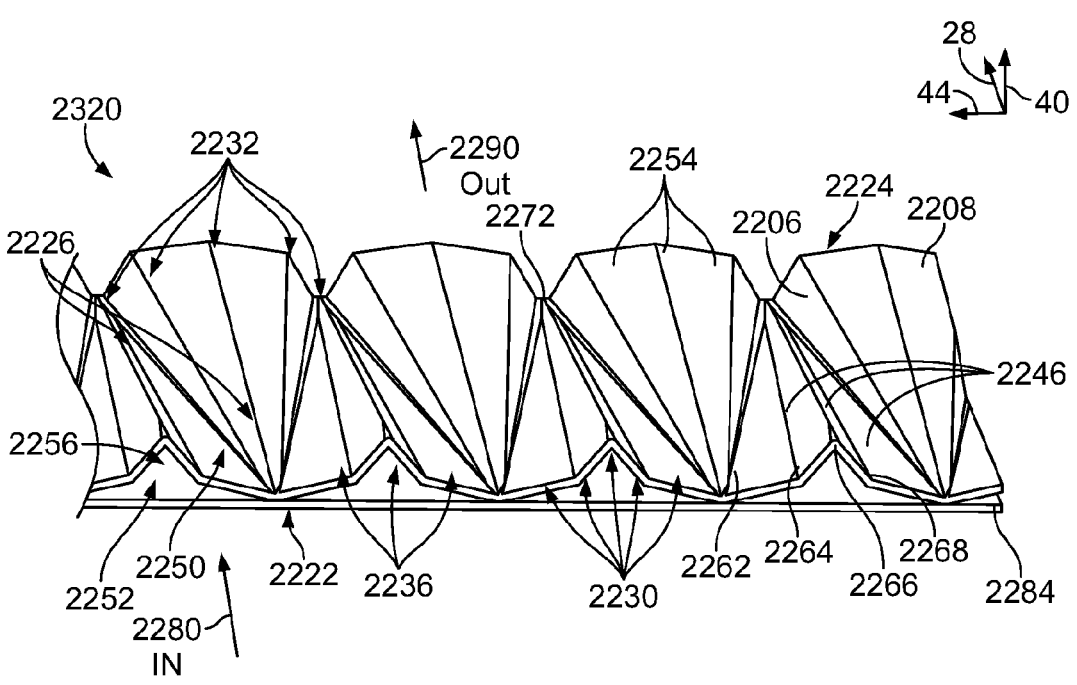

FIG. 23A is a front-perspective view of an inlet side of a five-sided formed filter media, according to an example embodiment.

Figure 23B:
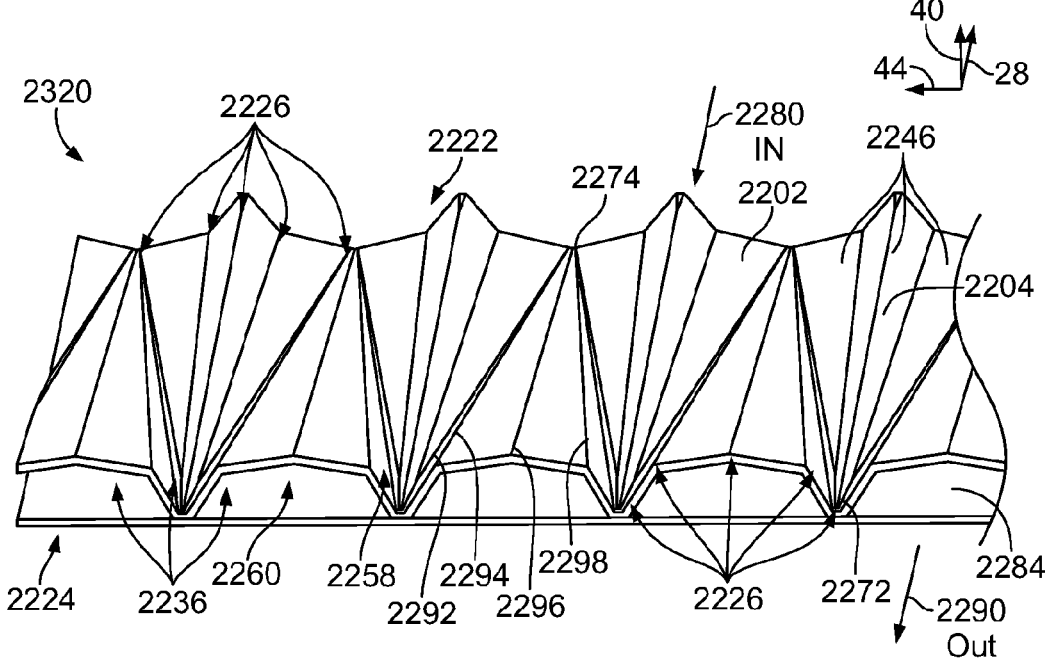

FIG. 23B is a front-perspective view of the outlet side of the five-sided formed filter media of FIG. 23A.

Figures 24A, 24B:
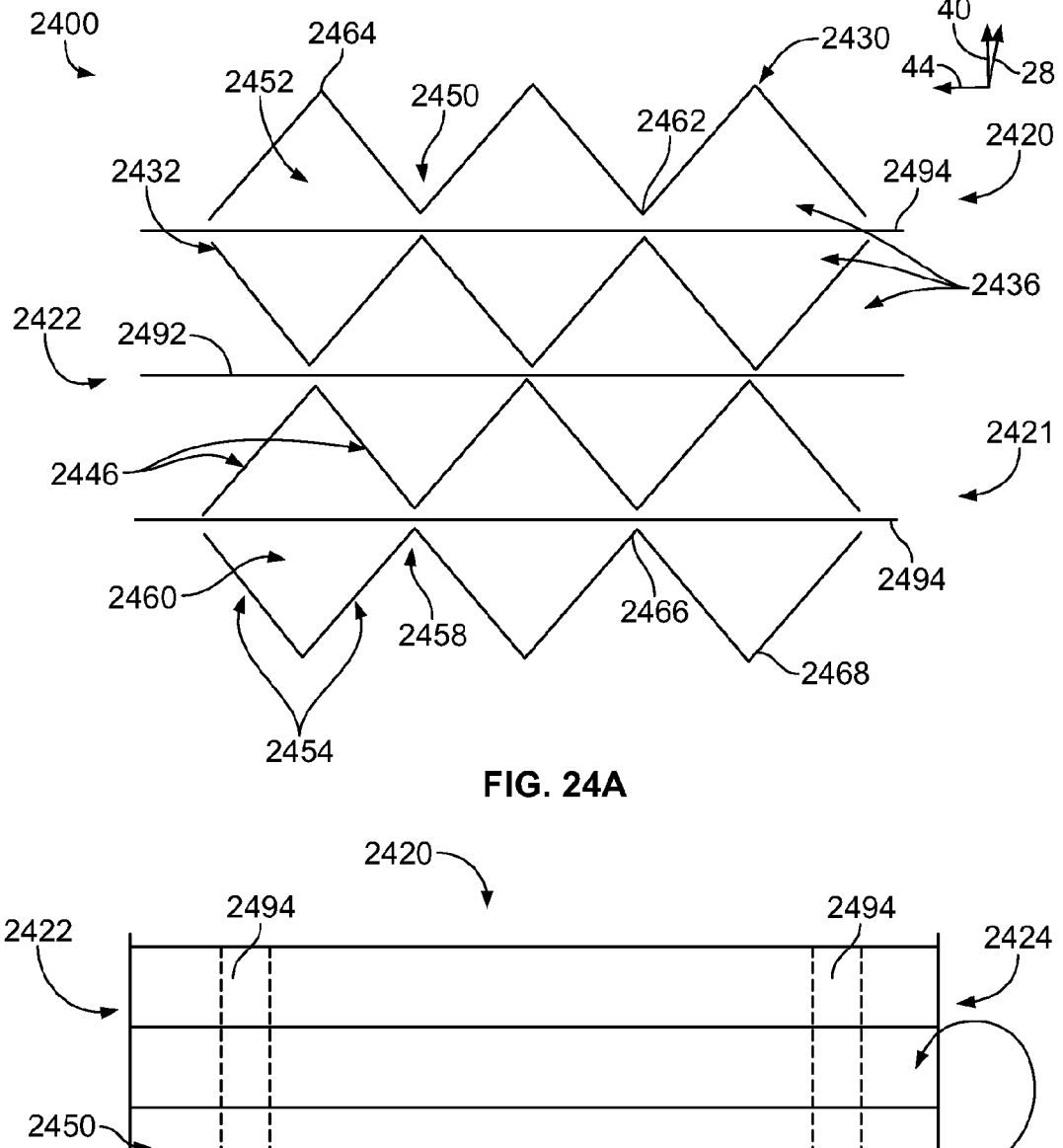

FIG. 24A is a front-perspective view of the edge of an inlet side of a straight corrugated filter media with spacer strips, according to an example embodiment.

FIG. 24B is a top view of a filter media layer of the straight corrugated filter media with spacer strips of FIG. 24A.

Figure 24C:
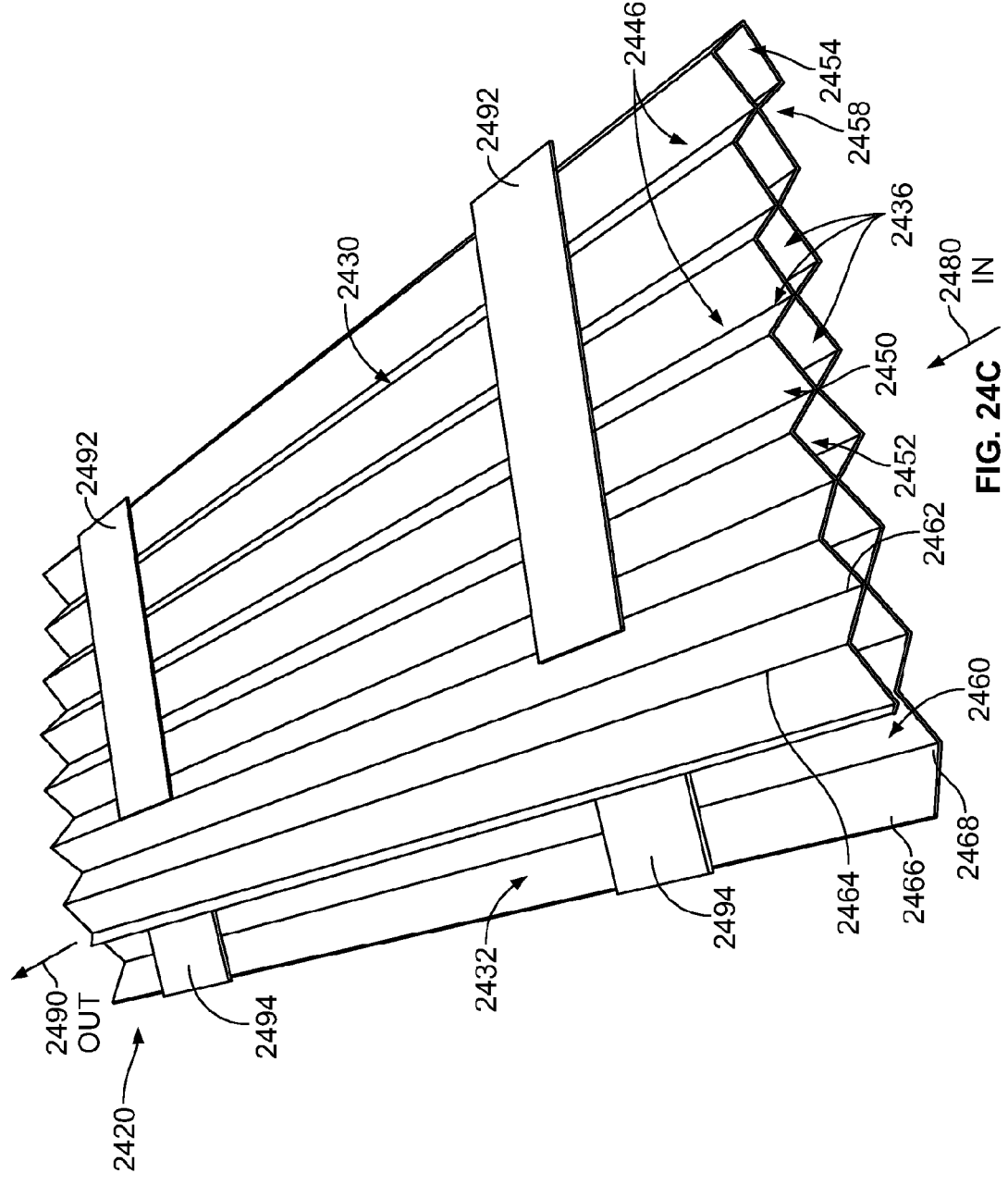

FIG. 24C is a perspective view of the filter media layer of the straight corrugated filter media with spacer strips of FIG. 24B.

Figures 25A, 25B:
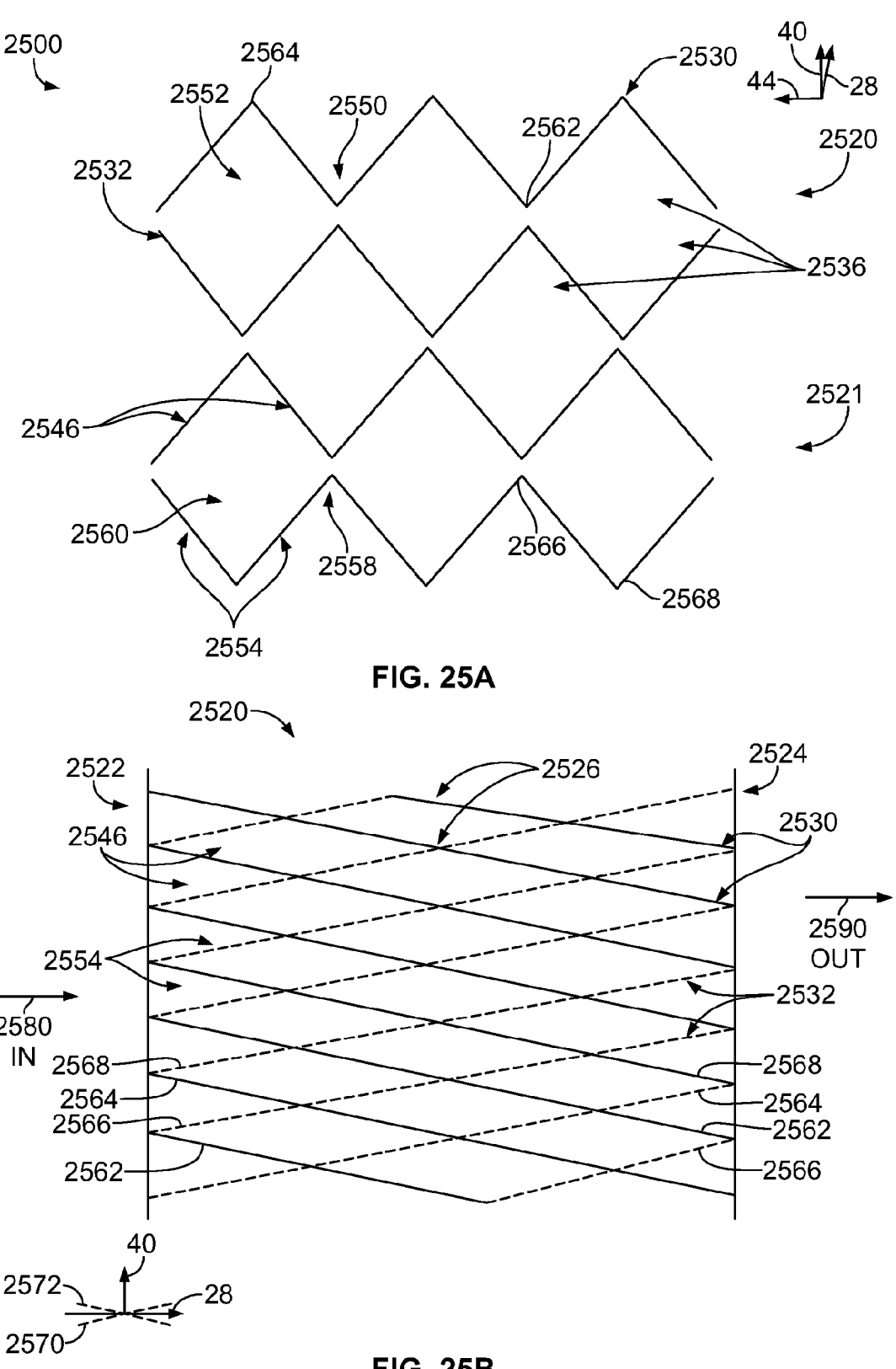

FIG. 25A is a front-perspective view of the edge of an inlet side of an angled corrugated filter media, according to an example embodiment.

FIG. 25B is a top view of a filter media layer of the angled corrugated filter media of FIG. 25A.

Figure 25C:
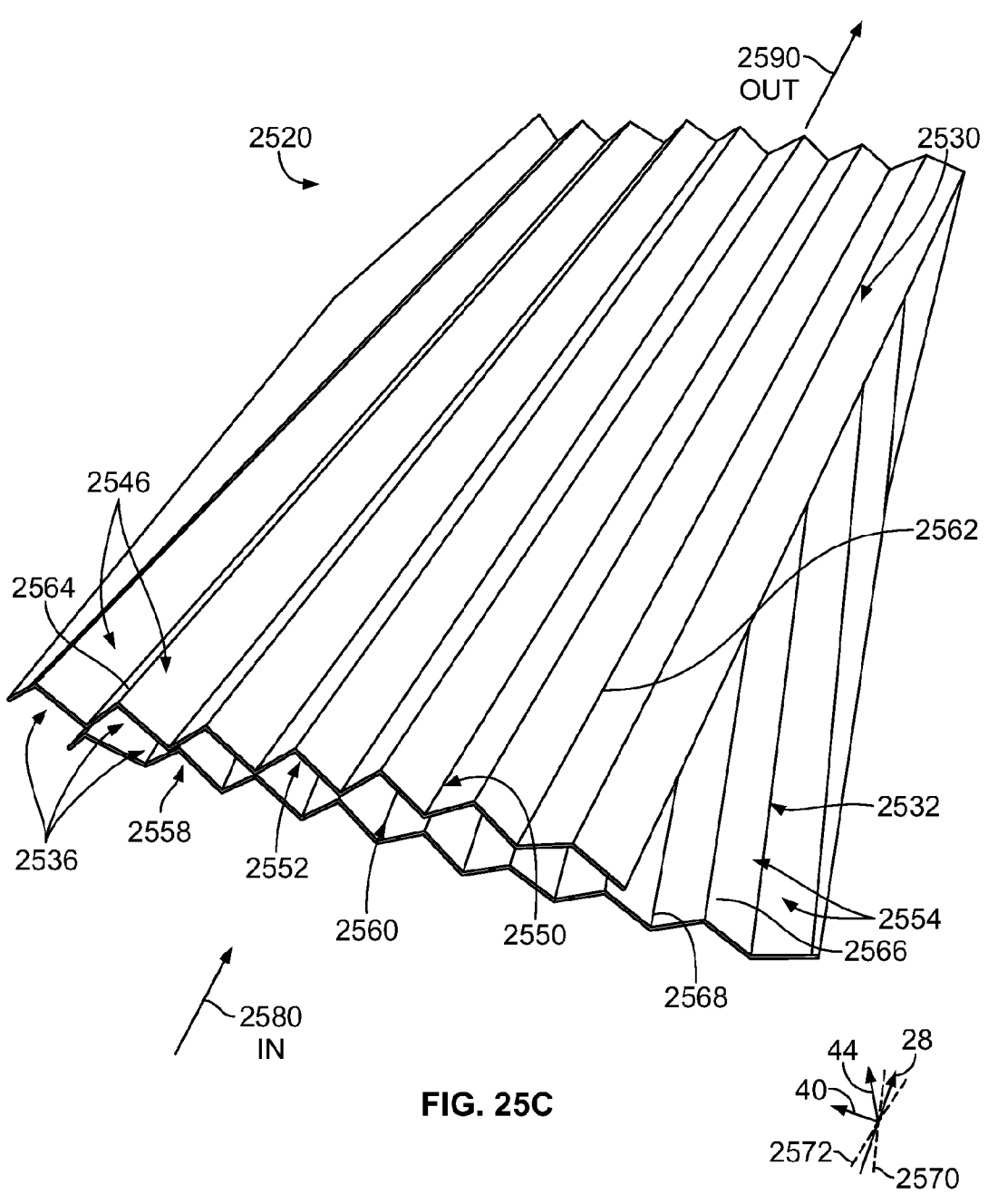

FIG. 25C is a perspective view of the filter media layer of the angled corrugated filter media of FIG. 25B.

Figures 26A, 26B:
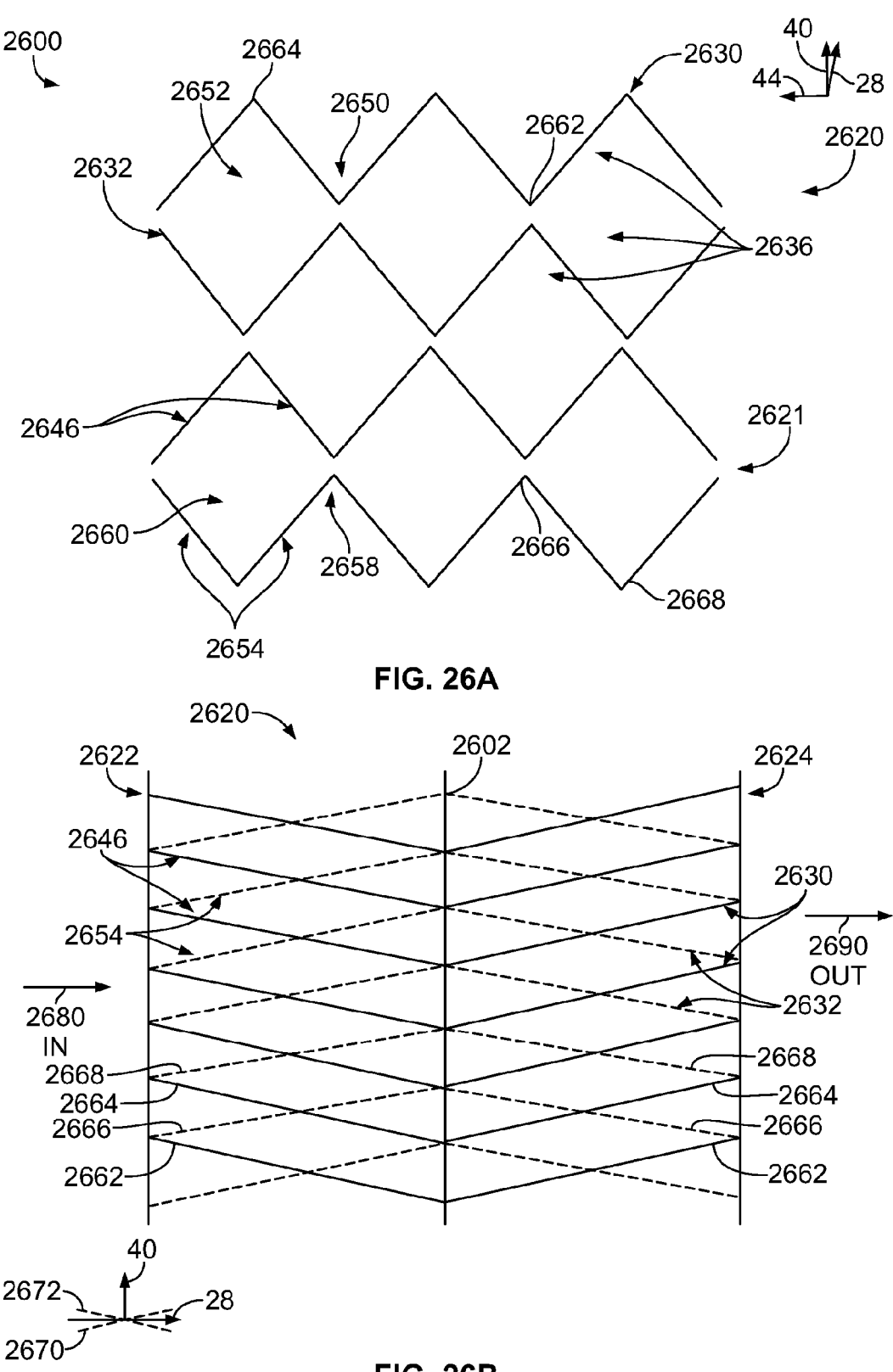

FIG. 26A is a front-perspective view of the edge of an inlet side of a v-shaped corrugated filter media, according to an example embodiment.

FIG. 26B is a top view of a filter media layer of the v-shaped corrugated filter media of FIG. 26A.

Figure 27:
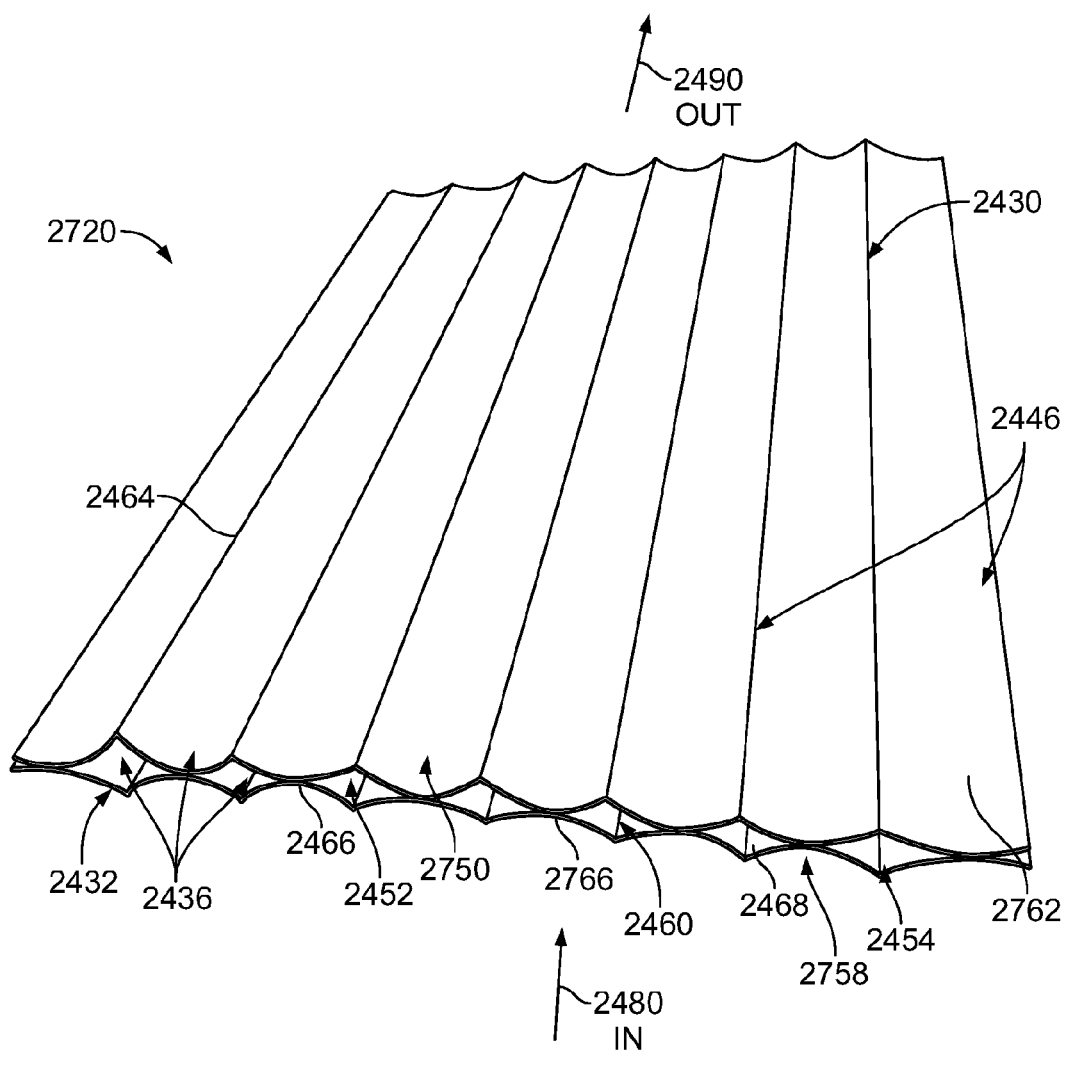

FIG. 27 is a perspective view of a filter media layer of a corrugated filter media, according to another example embodiment.

Figure 28:
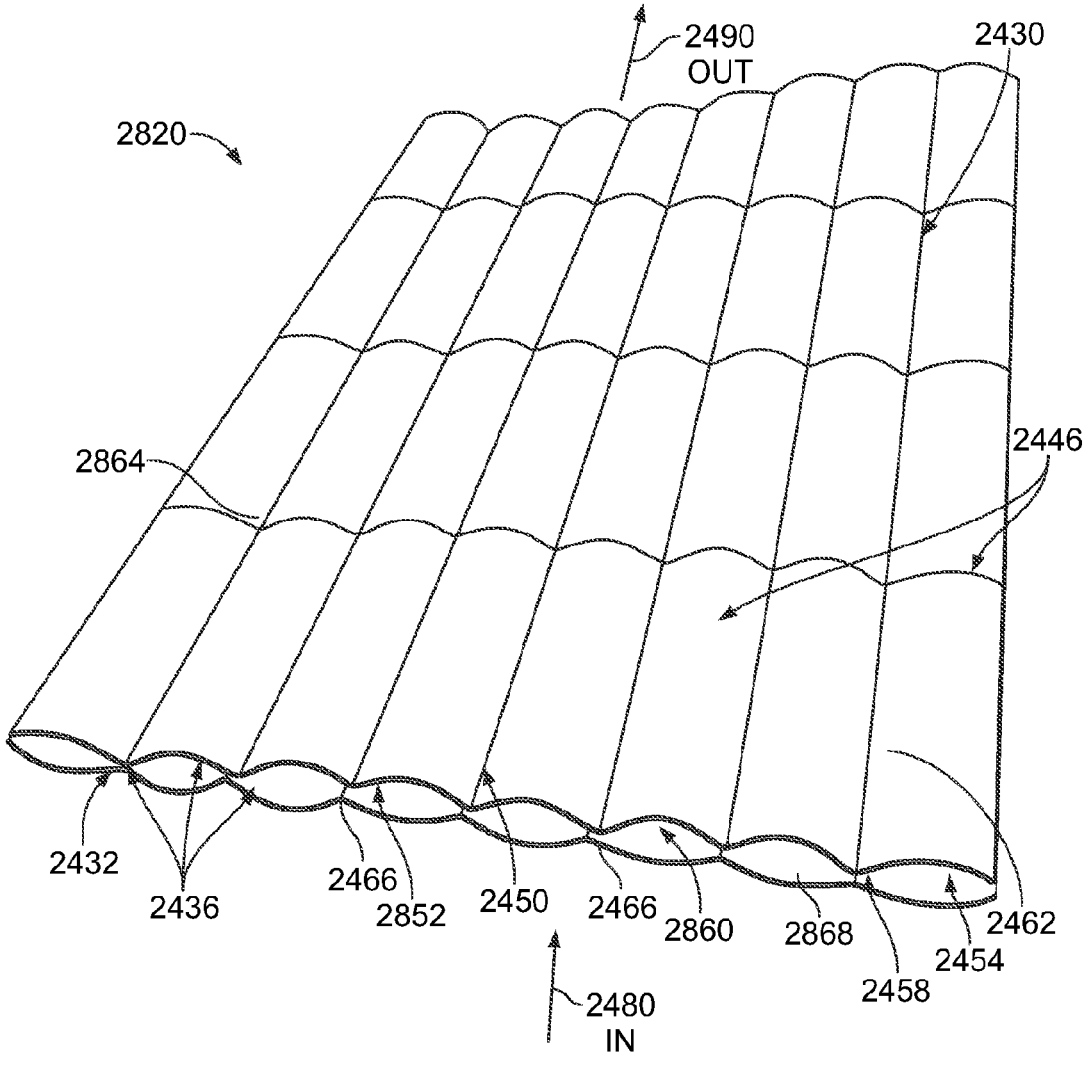

FIG. 28 is a perspective view of a filter media layer of a corrugated filter media, according to yet another example embodiment.

Figure 29:
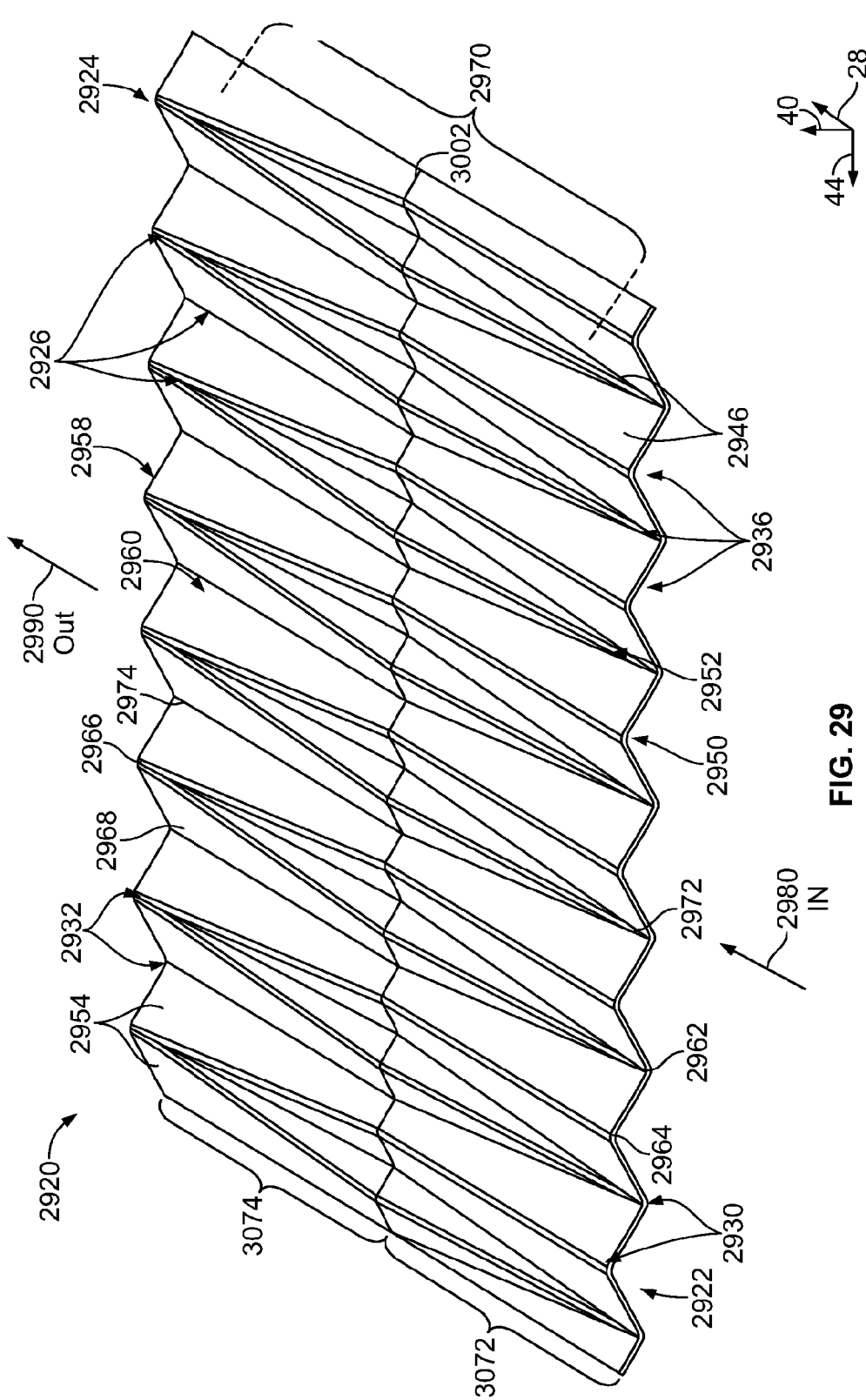

FIG. 29 is a perspective view of a multiple form filter media layer, according to an example embodiment.

Figures 30A, 30B, 30C:
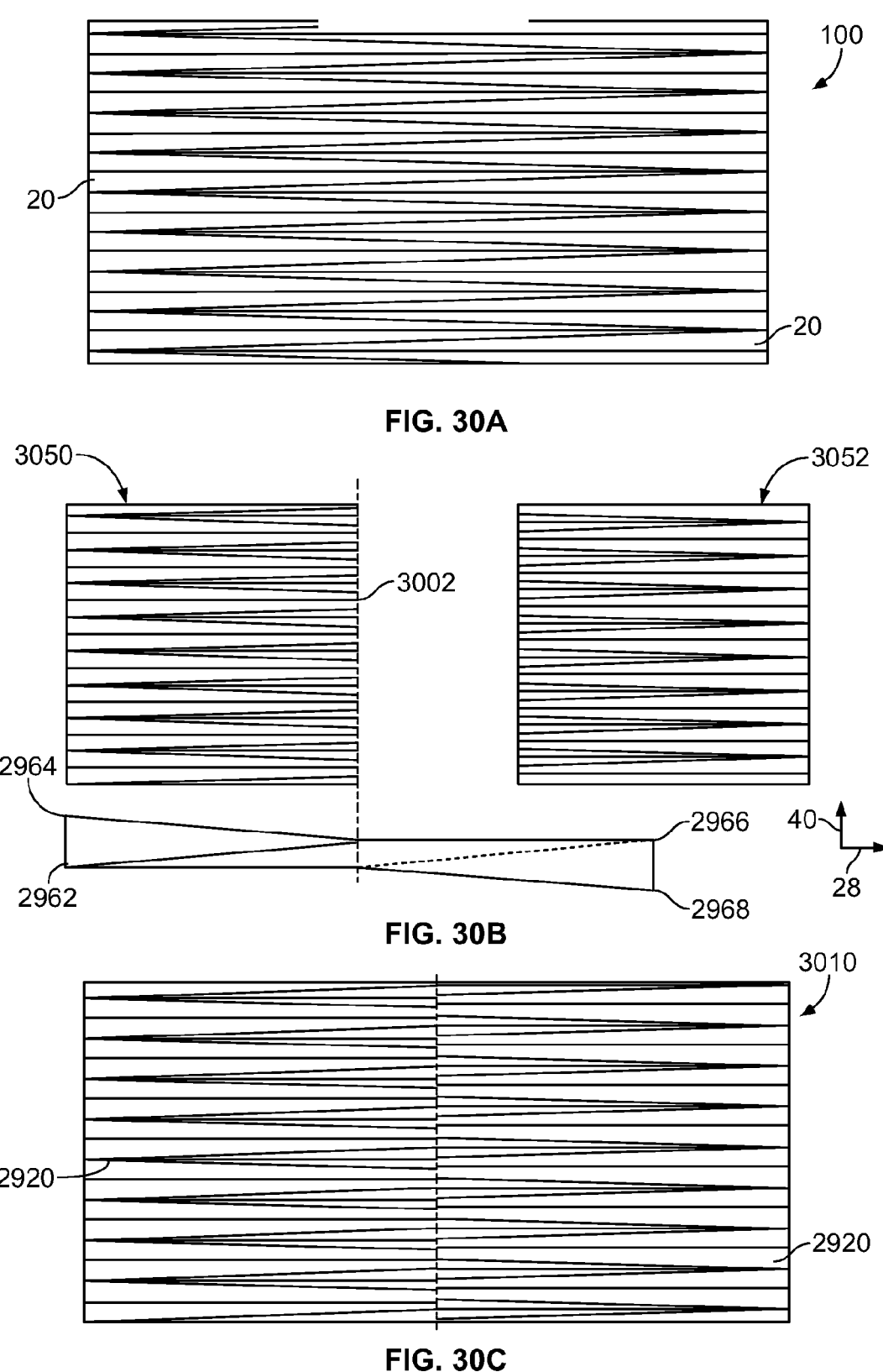

FIGS. 30A-30C are views depicting the formation of a filter media that includes the multiple form filter media layer of FIG. 29.

Figure 31A:
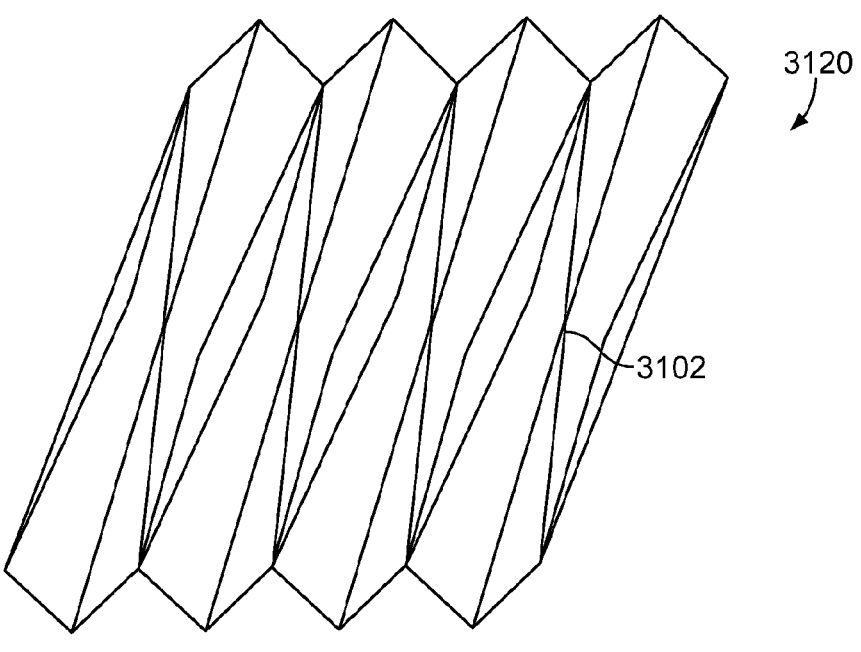
Figure 31B:
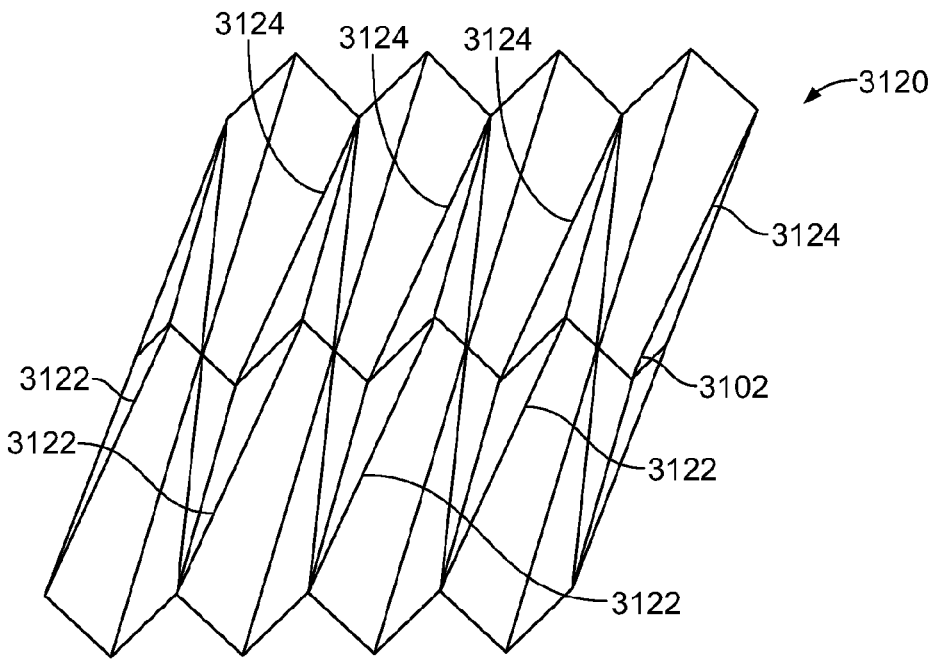

FIGS. 31A-31B are a perspective view of a multiple form filter media layer, according to another example embodiment.

Figure 32:
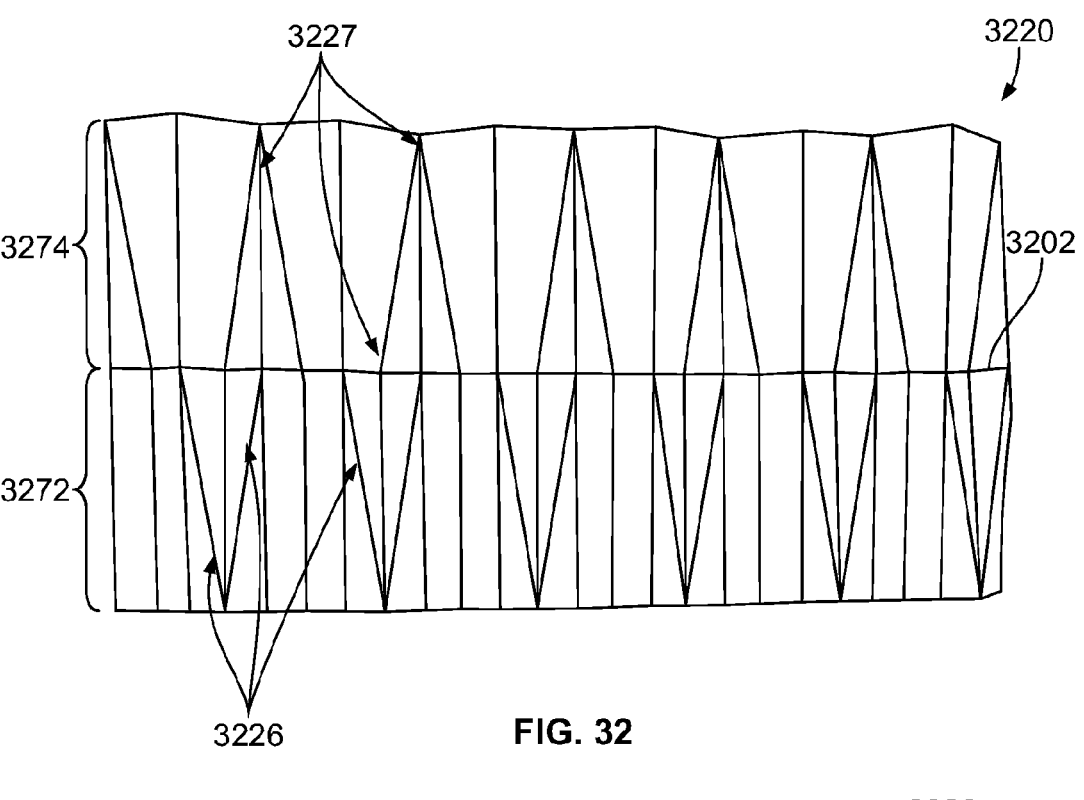

FIG. 32 is a top view of a flat, unformed multiple form filter media layer, according to an example embodiment.

Figure 33:
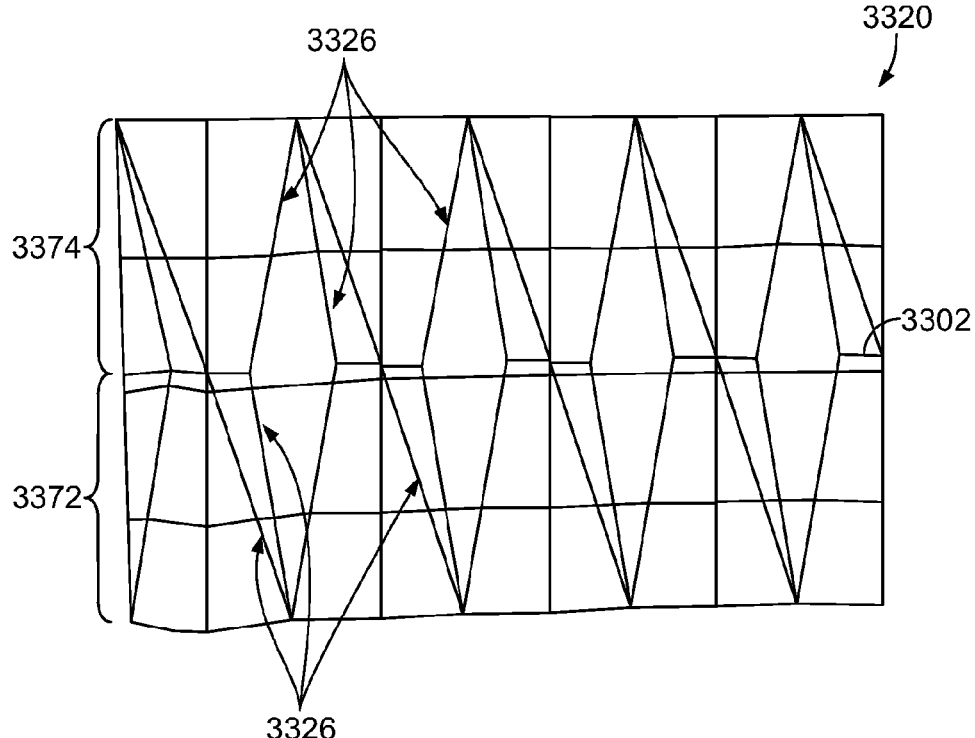

FIG. 33 is a top view of a flat, unformed multiple form filter media layer, according to another example embodiment.

Figures 34, 35:
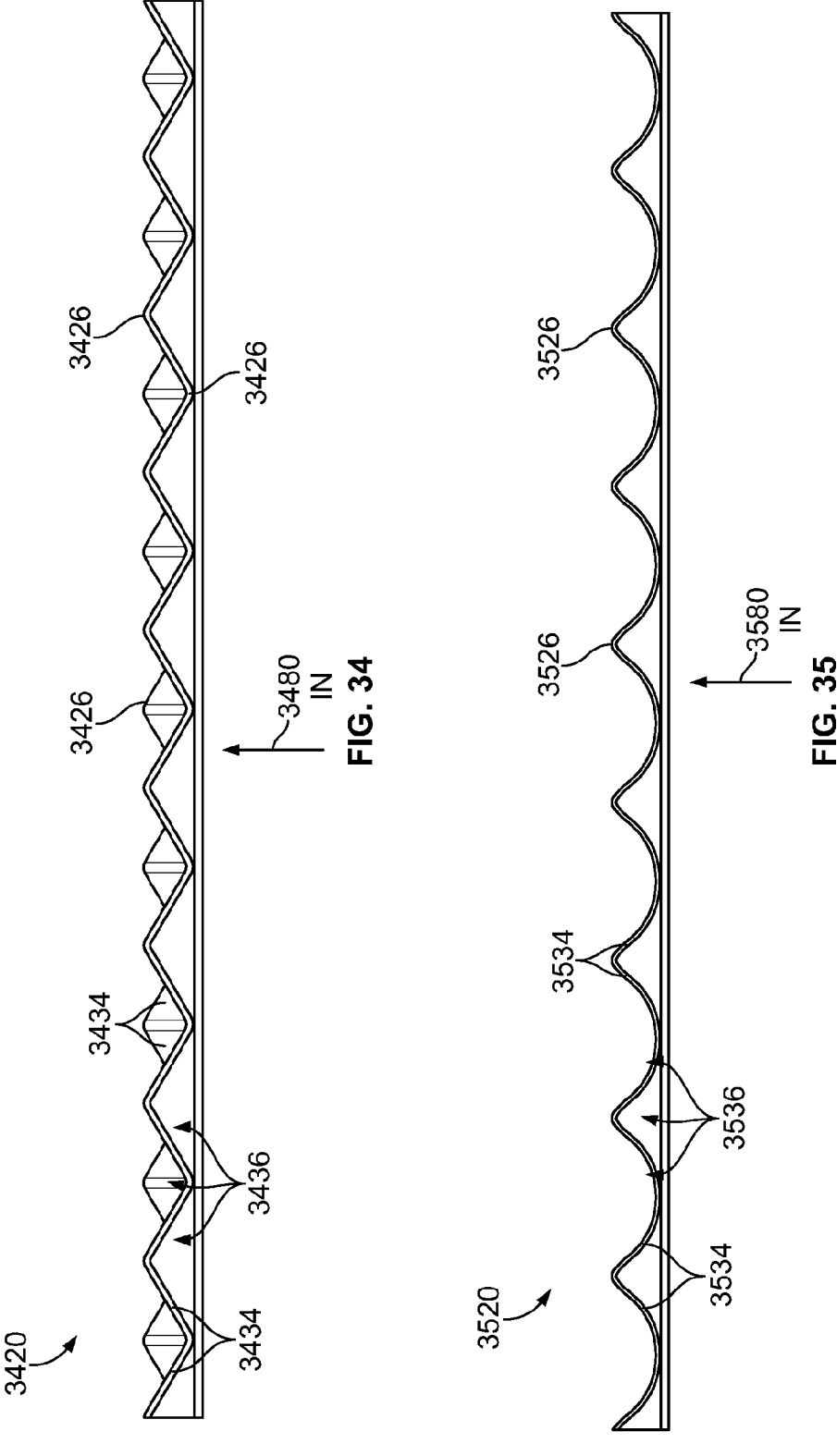

FIG. 34 is a front view of a triangular multiple form filter media layer, according to another example embodiment.

FIG. 35 is a front view of a rounded multiple form filter media layer, according to yet another example embodiment.

Figures 36, 37:
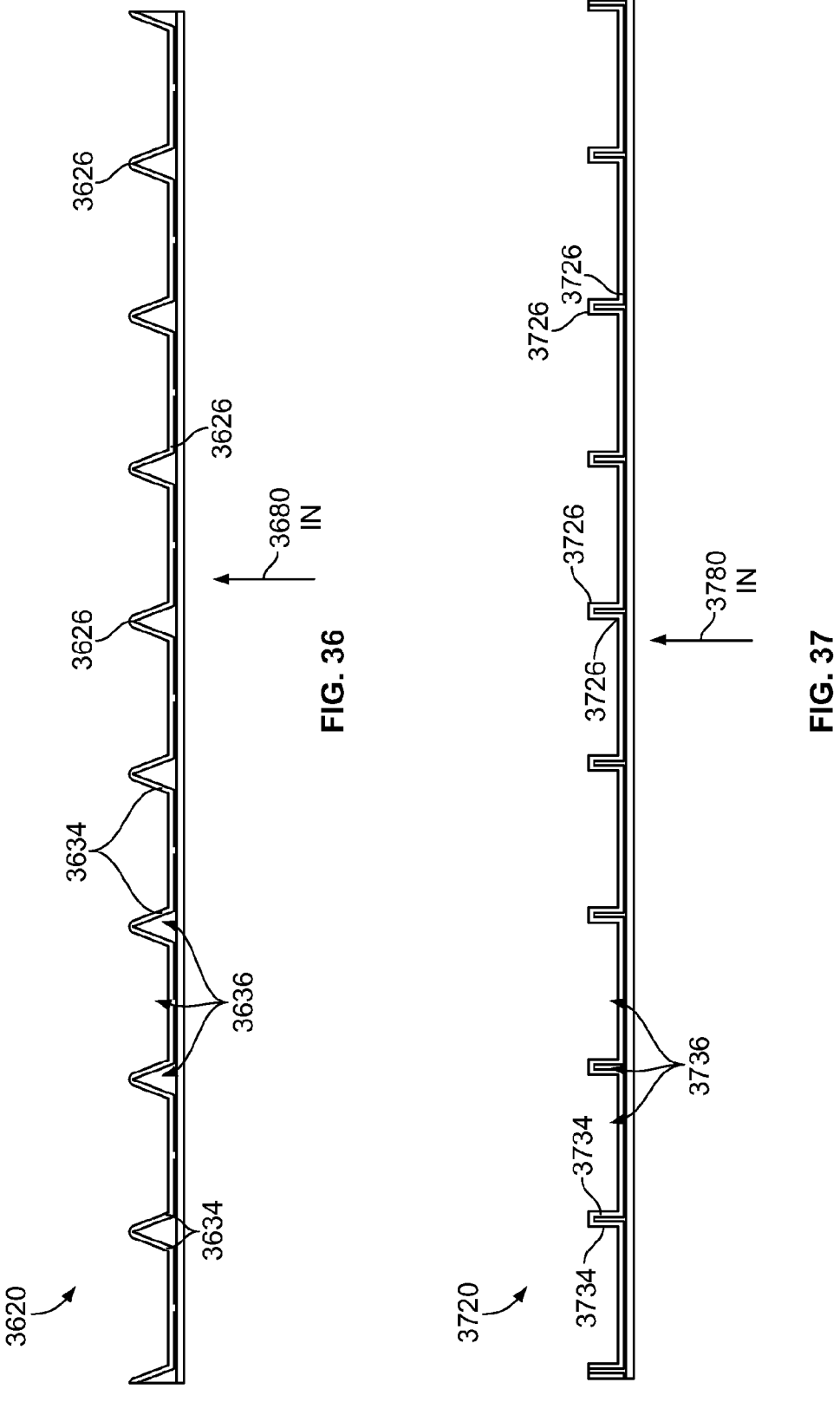

FIG. 36 is a front view of a flat-triangle multiple form filter media layer, according to an example embodiment.

FIG. 37 is a front view of a flat-rectangular multiple form filter media layer, according to an example embodiment.

Figures 38A, 38B:
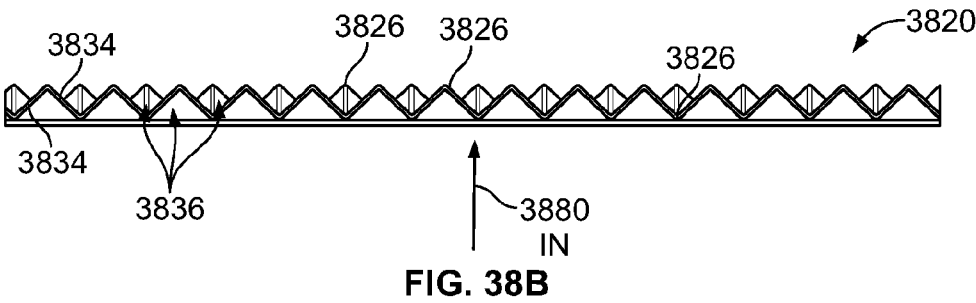

FIG. 38A is a perspective view of a rhombus pyramid repeating filter media layer, according to an example embodiment.

FIG. 38B is a front view of the rhombus pyramid repeating filter media layer of FIG. 38A.

Figures 39A, 39B:
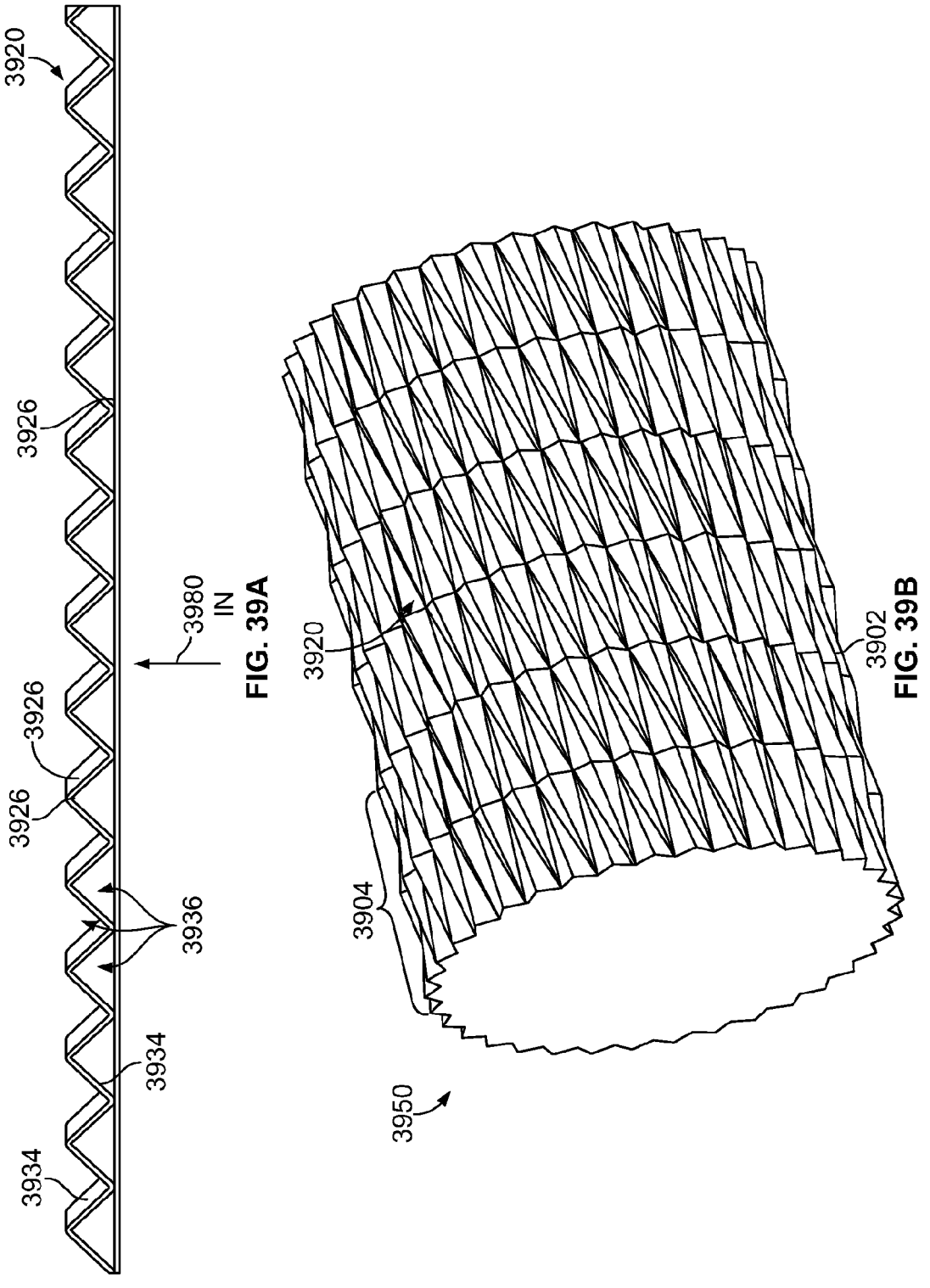

FIG. 39A is a front view of an offset rhombus pyramid repeating filter media layer, according to an example embodiment.

FIG. 39B is a perspective view of one of the offset rhombus pyramid forming rolls used to create the repeating filter media layer of FIG. 39A.

Figure 40:
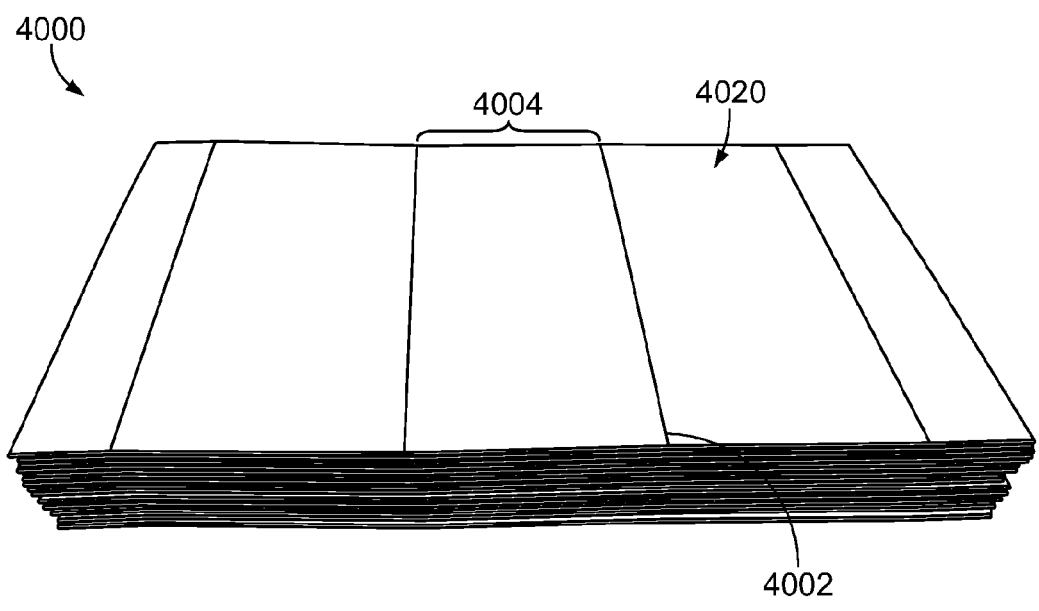

FIG. 40 is a perspective view of a filter media pack of a two-sided repeating filter media layer, according to an example embodiment.

Figure 41:
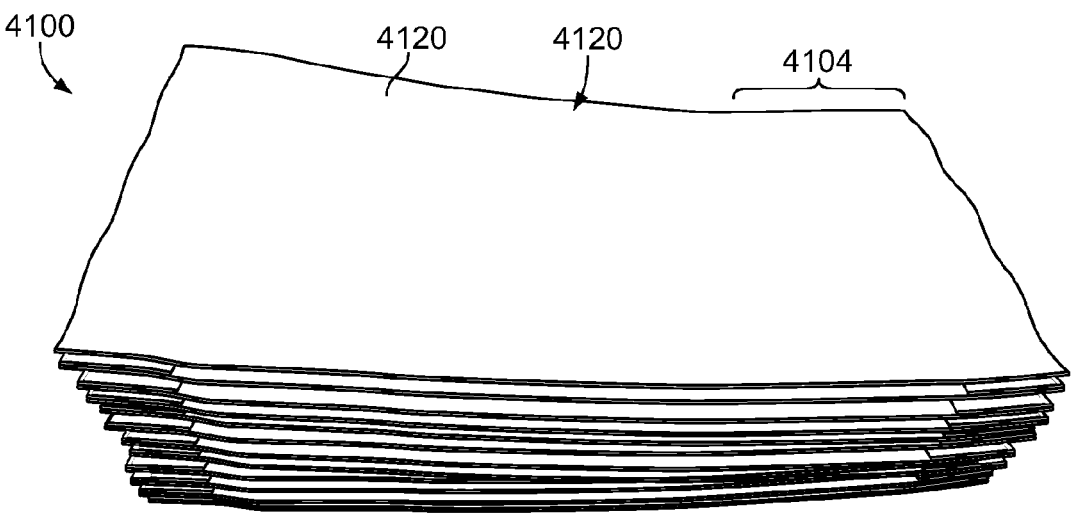

FIG. 41 is a perspective view of a filter media pack of a two-sided repeating filter media layer, according to another example embodiment.

Figures 42A, 42B:
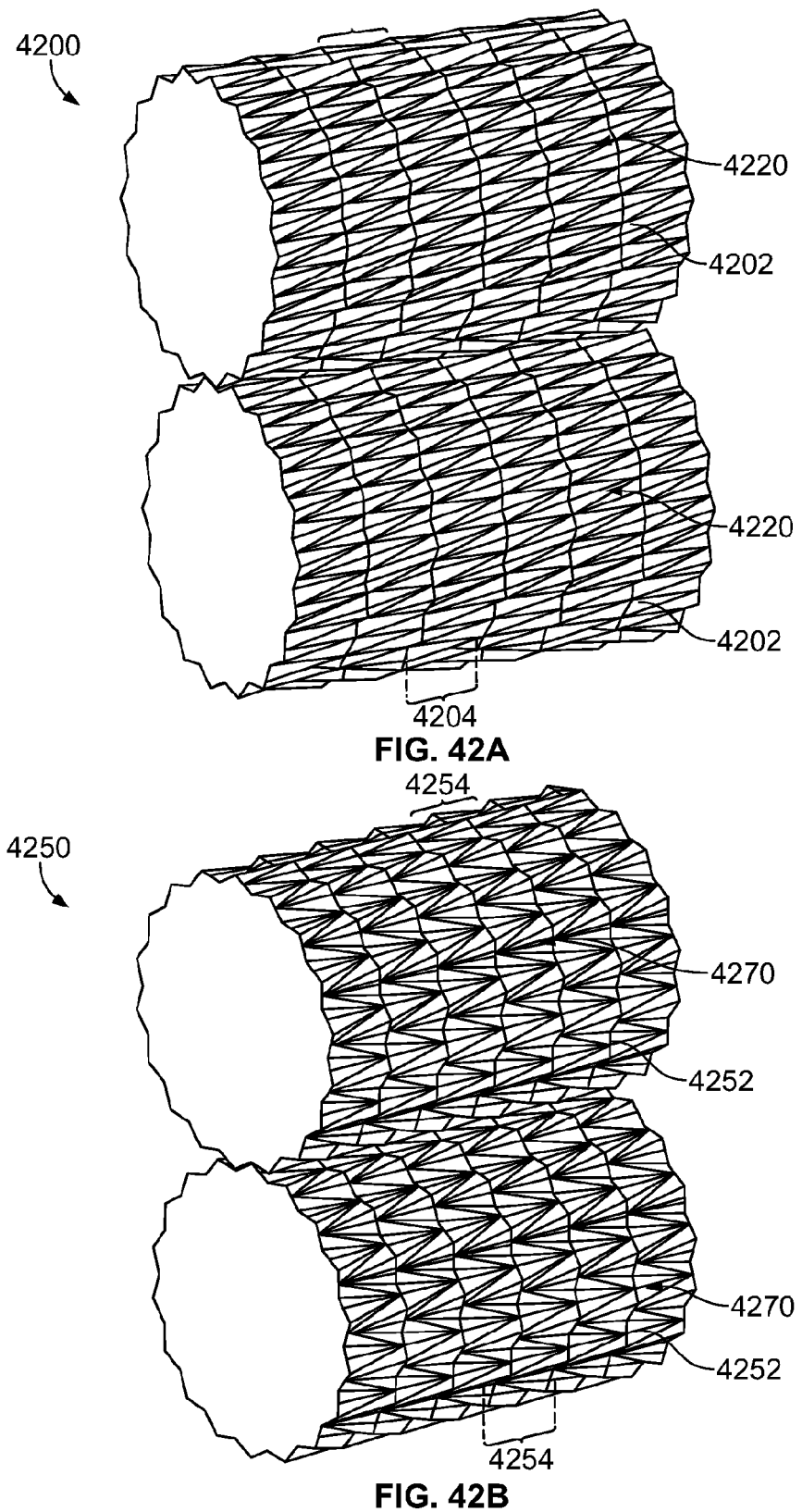

FIG. 42A is a perspective view of a roller pair used to form a two-sided repeating pattern filter media layer, according to an example embodiment.

FIG. 42B is a perspective view of a roller pair used to form a two-sided repeating pattern filter media layer, according to an example embodiment.

Figure 43A:
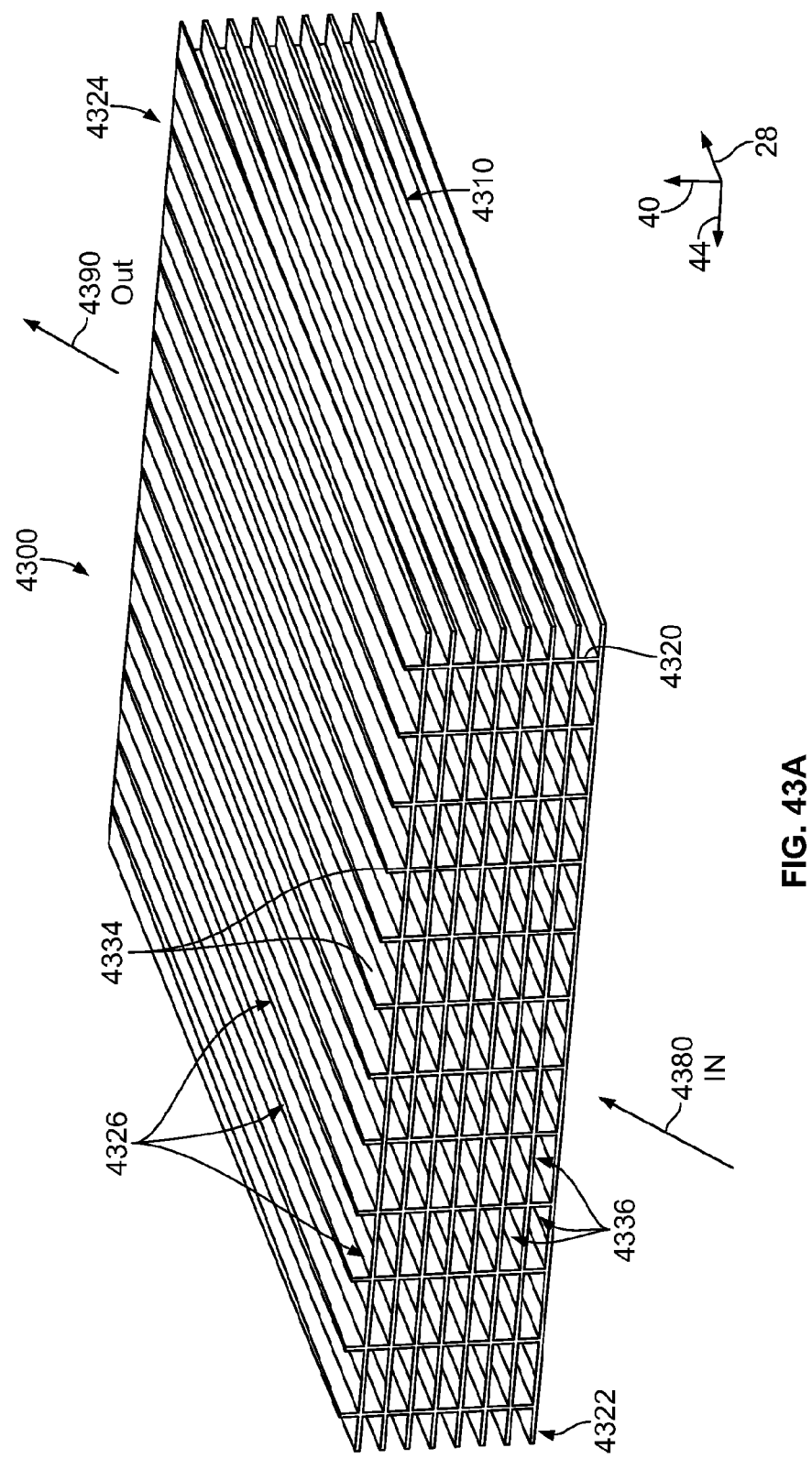

FIG. 43A is perspective view of a filter media pack that includes filter media with negative and positive adjacent fin wall segments, according to an example embodiment.

Figure 43B:
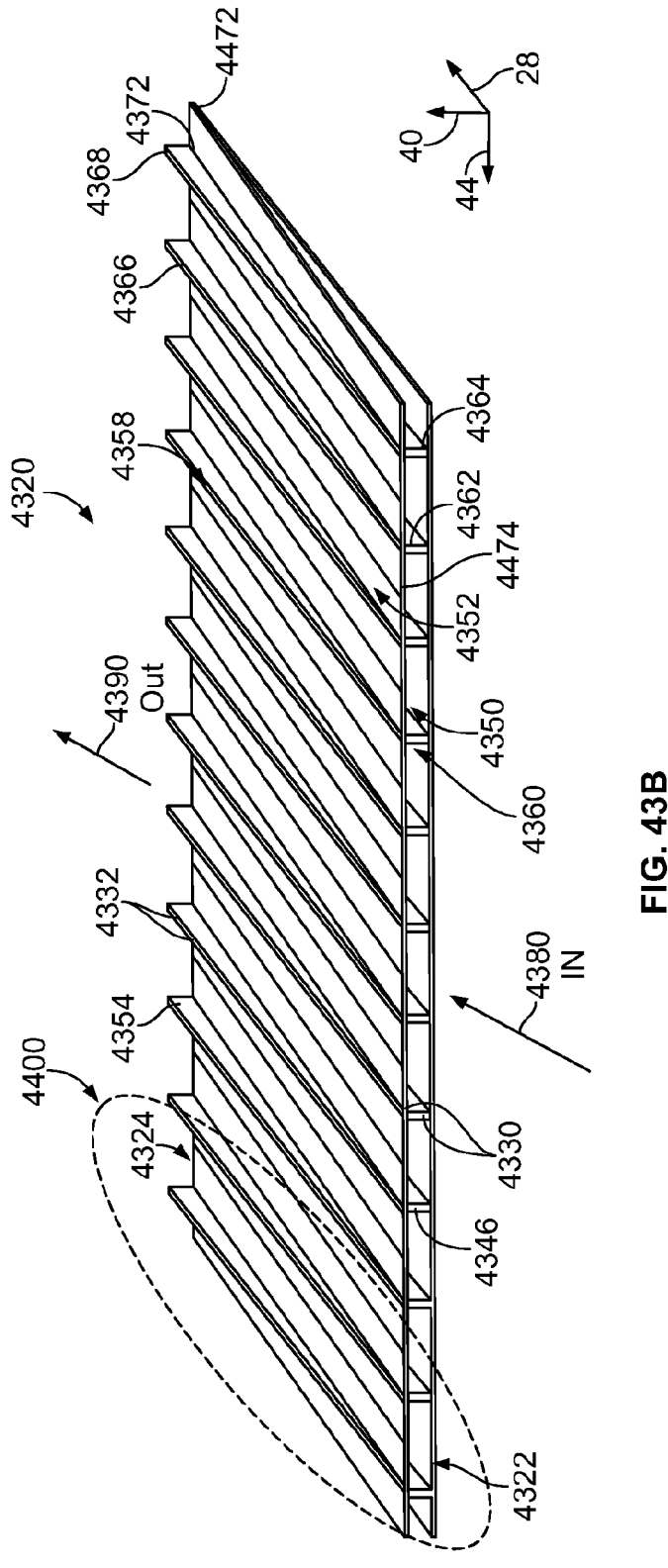

FIG. 43B is a perspective view of a filter media layer of the filter media of the filter media pack of FIG. 43A.

Figures 44A, 44B, 44C:
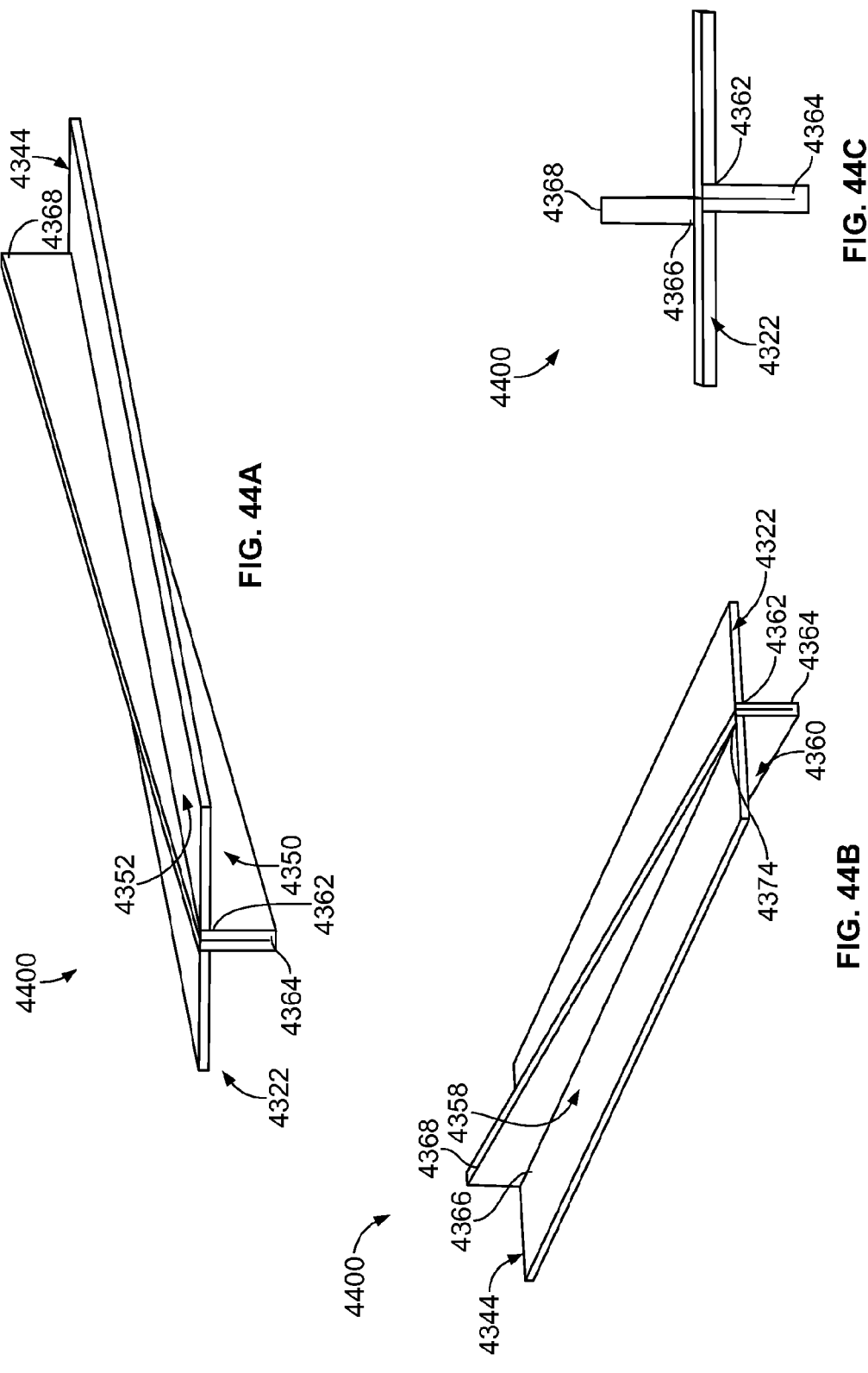

FIG. 44A-C are views of a portion of the negative and positive adjacent fin wall segments of the filter media layer of FIG. 43B.

Figure 45:
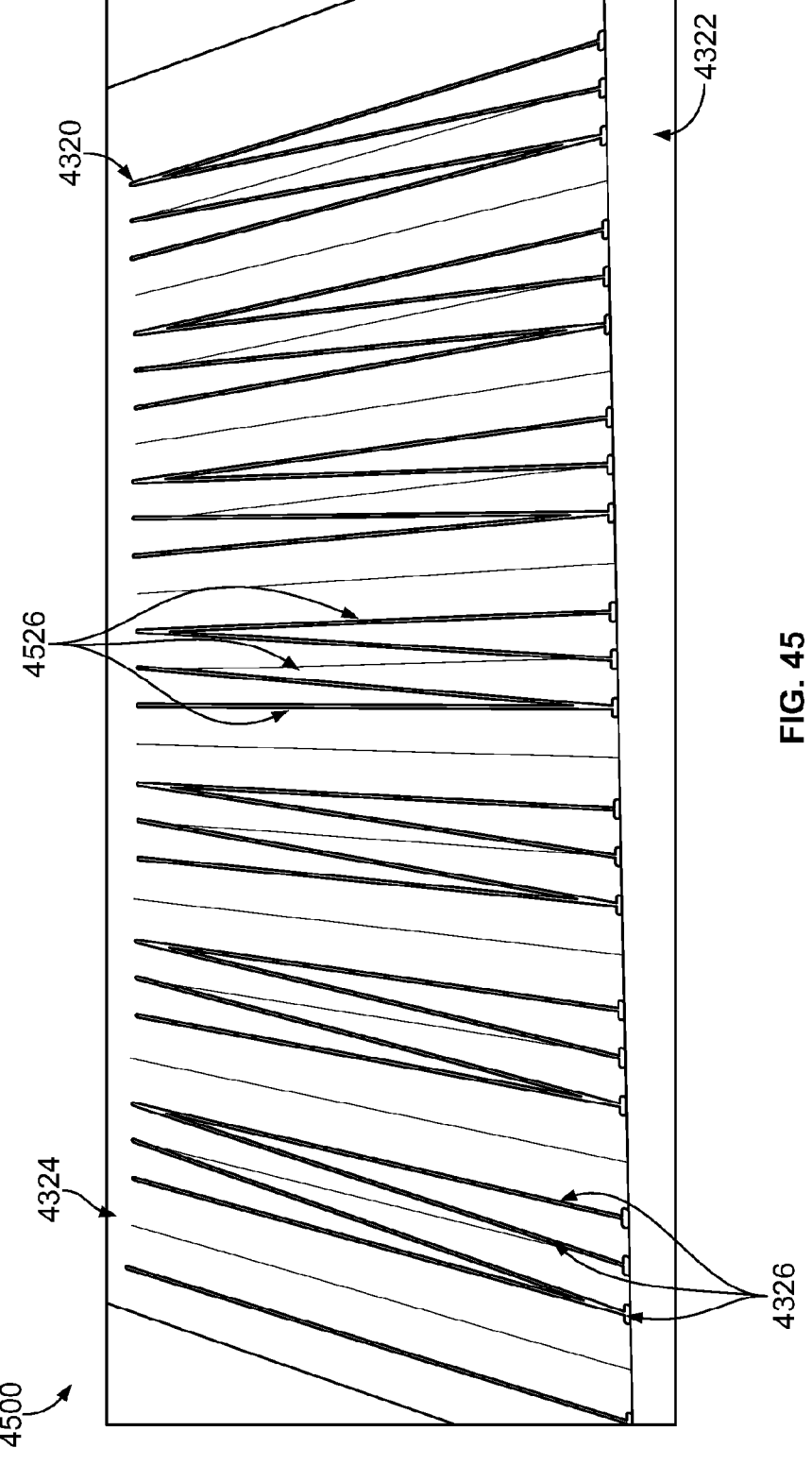

FIG. 45 is a top perspective view of a flat filter media sheet with a plurality of bend lines marked to form the filter media layer of FIG. 43B.

Figures 46A, 46B:
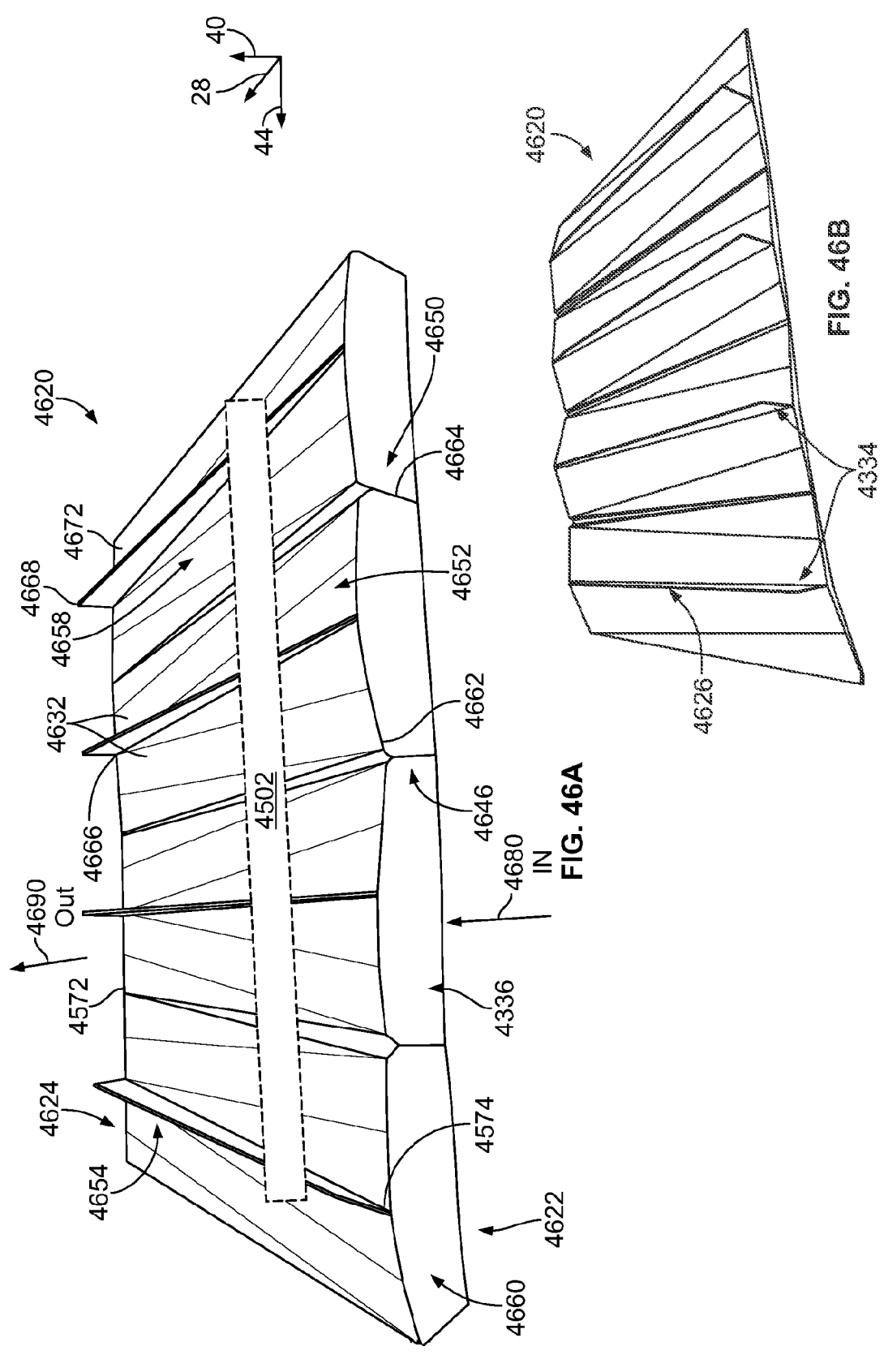

FIG. 46A is a perspective view of a filter media layer with negative fin wall segments offset from adjacent positive fin wall segments, according to another example embodiment.

FIG. 46B is a rear perspective view of the top of the filter media layer of FIG. 46A.

Figure 47:
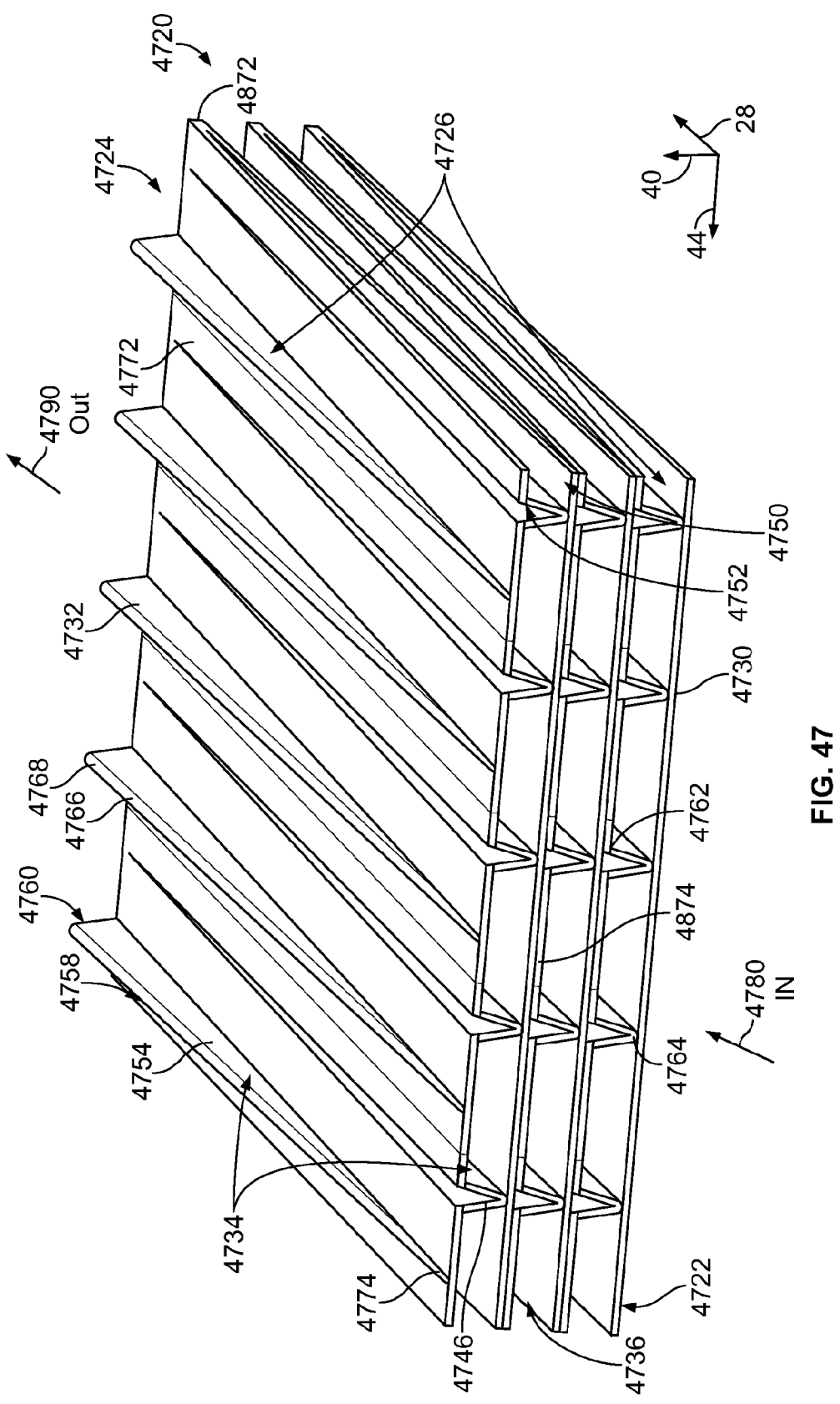

FIG. 47 is a perspective view of a filter media layer with negative open fin wall segments offset from adjacent positive open fin wall segments, according to an example embodiment.

Figure 48A:
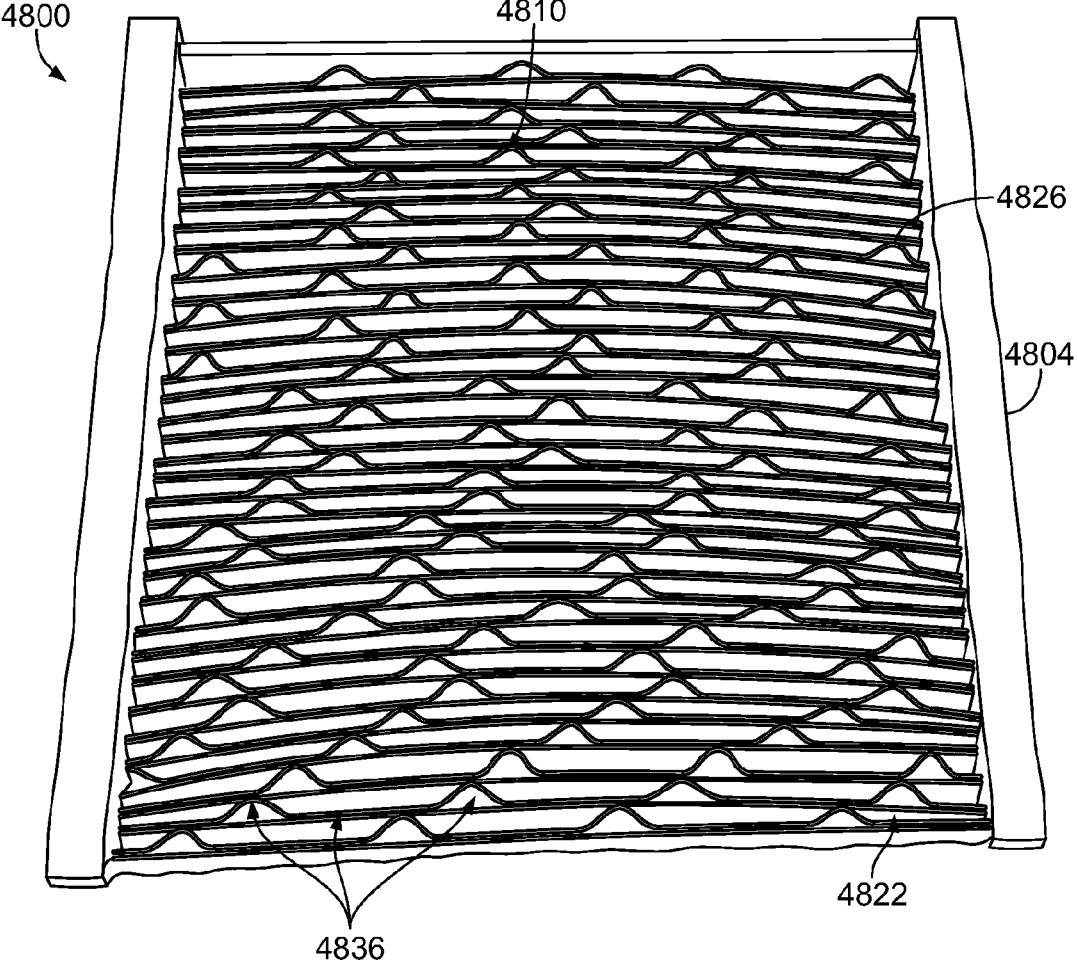

FIG. 48A is a filter element that includes a filter media pack having filter media layers with rounded triangular channels, according to an example embodiment.

Figures 48B, 48C:
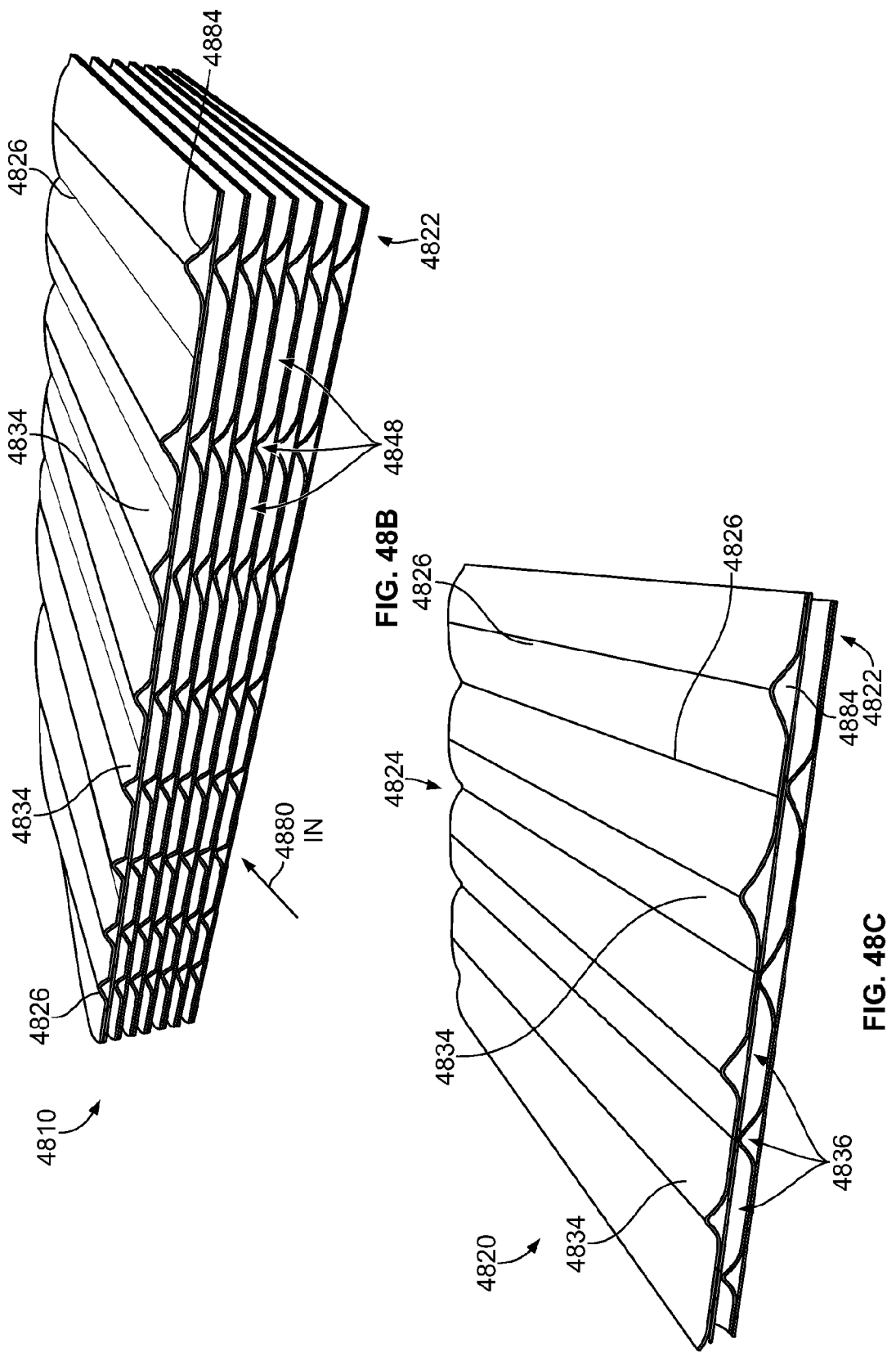

FIG. 48B is the filter media pack of the filter element of FIG. 48A.

FIG. 48C is the filter media layer of the filter element of FIG. 48A.

Figure 49:
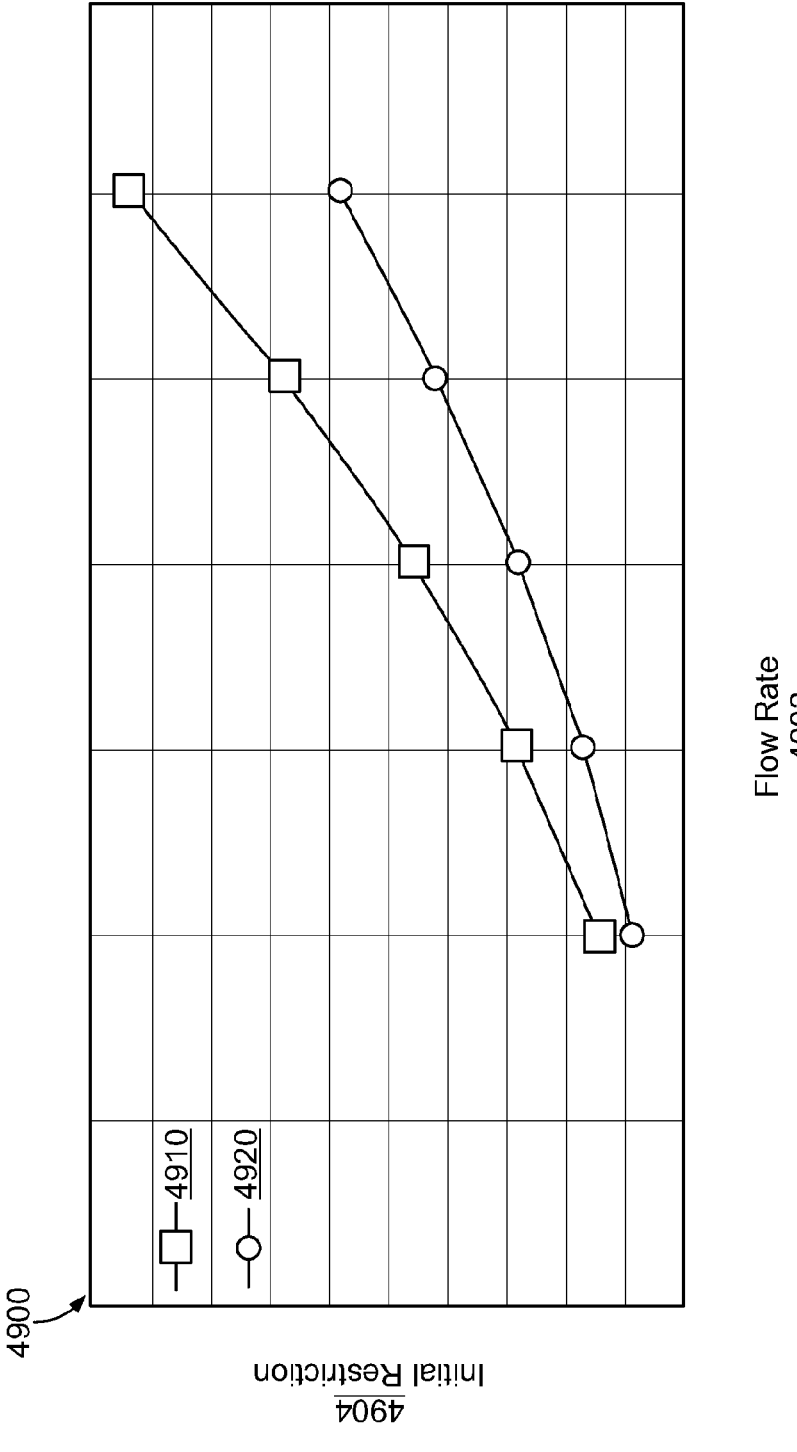

FIG. 49 is a graphical representation of flow rate and the initial restriction for a first filter media and a second filter media, according to an example embodiment.

Figure 50:
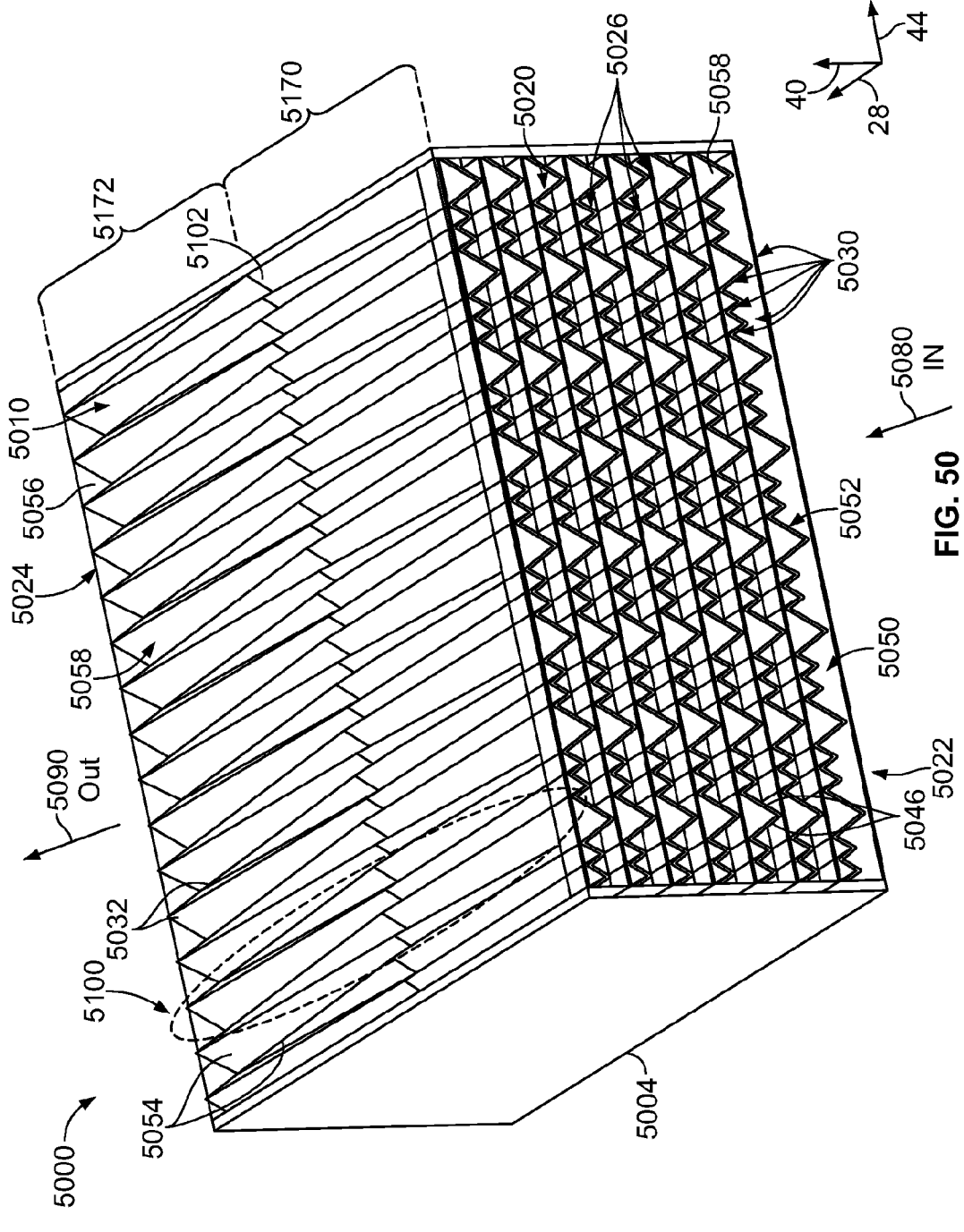

FIG. 50 is a top perspective view of an inlet side of a layered filter media pack, according to an example embodiment.

Figure 51:
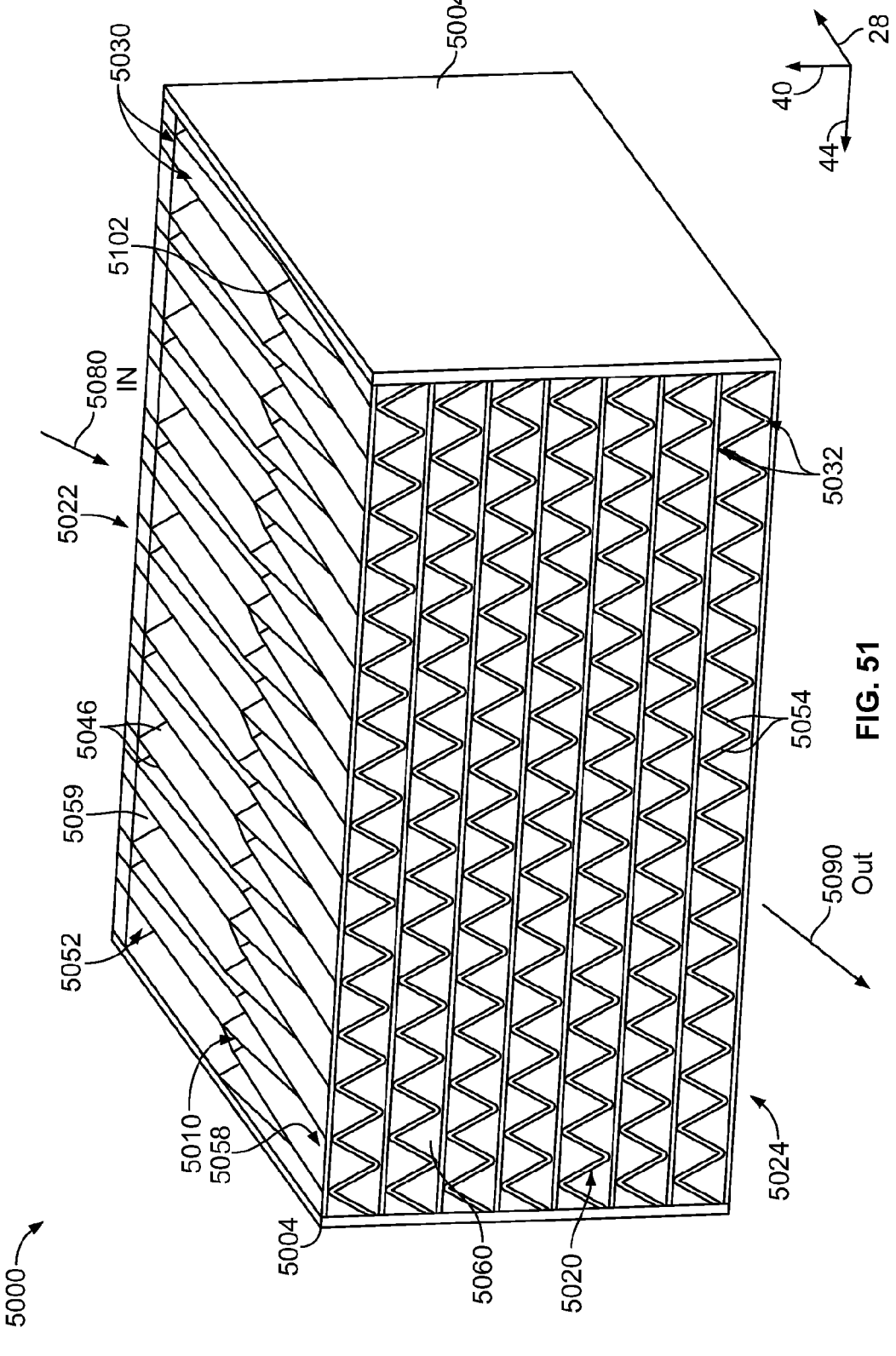

FIG. 51 is a top perspective view of an outlet side of the layered filter media pack of FIG. 50.

Figure 52:
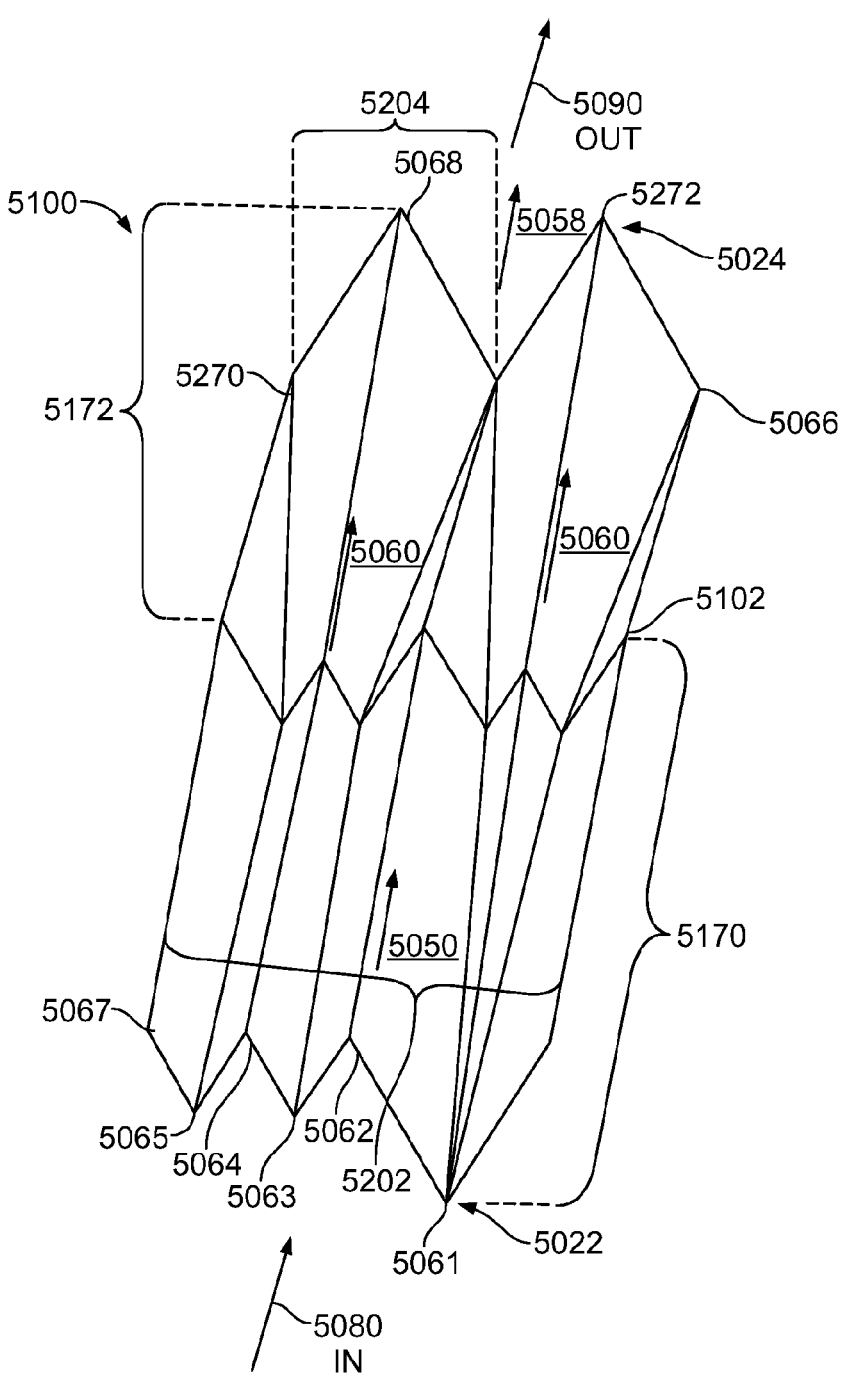

FIG. 52 is a bottom perspective view of a portion of the filter media layer of the layered filter media pack of FIG. 50.

Figure 53A:
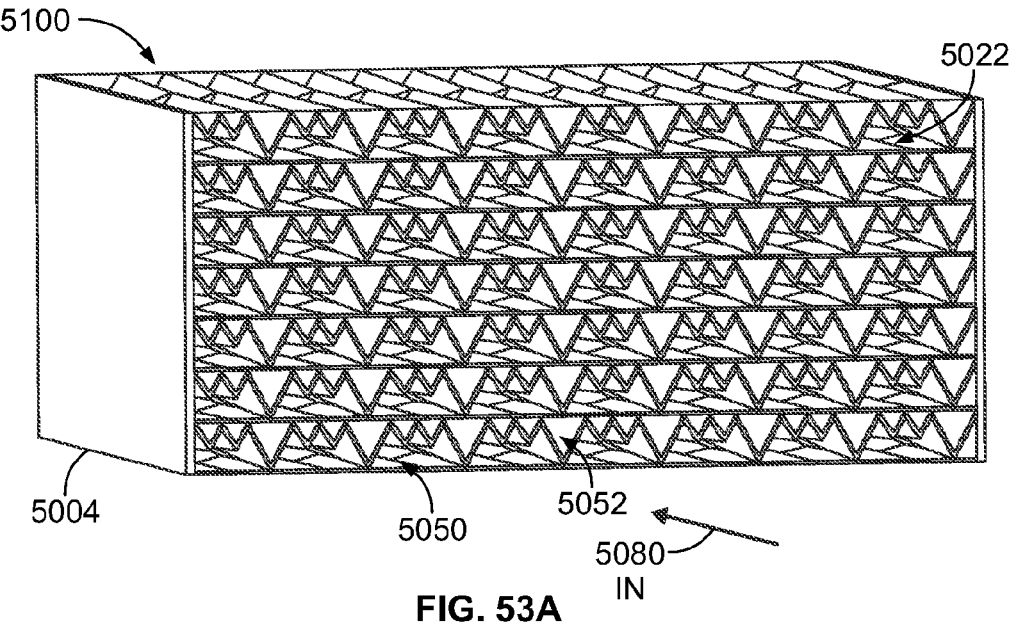

FIG. 53A is a perspective view of the inlet side of the layered filter media pack of FIG. 50.

Figure 53B:
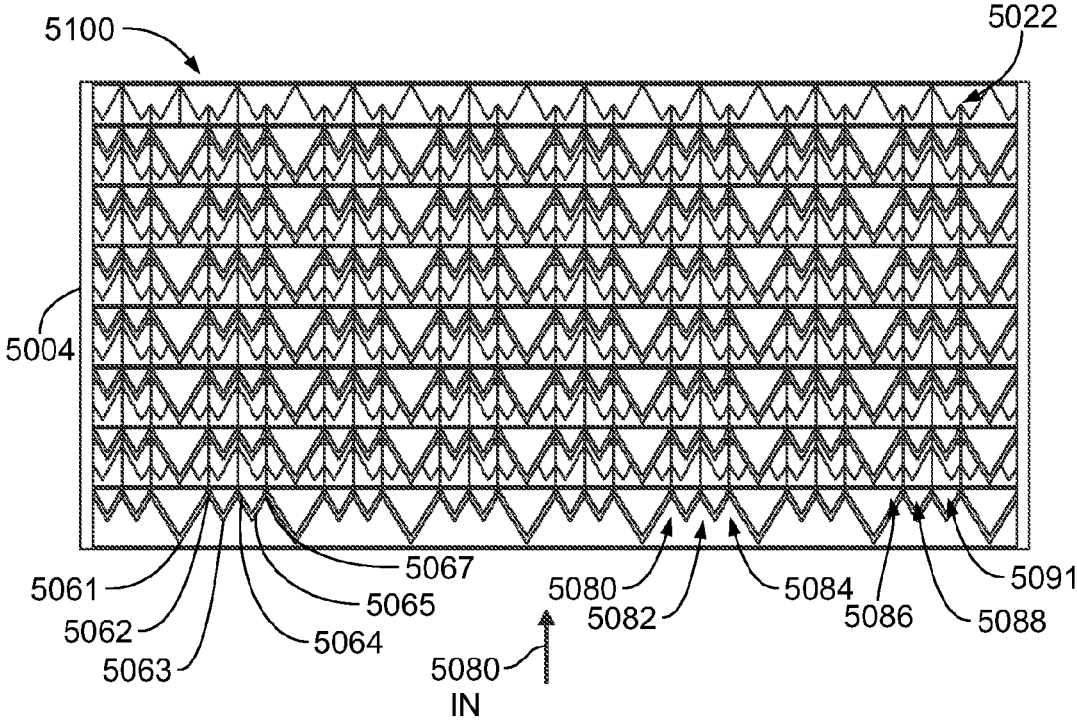

FIG. 53B is a raised front view of the inlet side of the layered filter media pack of FIG. 50.

Figure 53C:
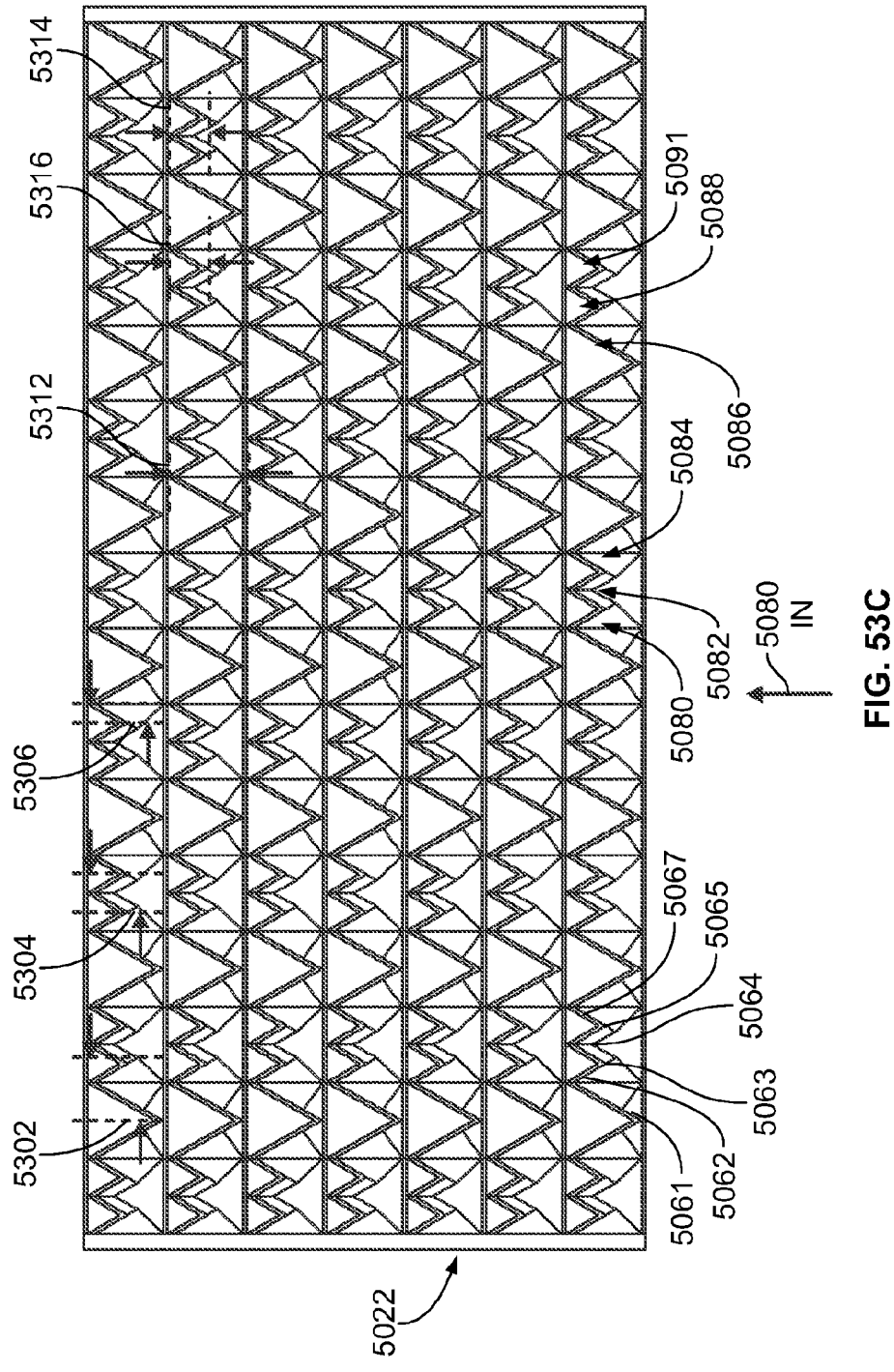

FIG. 53C is an angled planar view of the inlet side of the layered filter media pack of FIG. 50.

Figure 54:
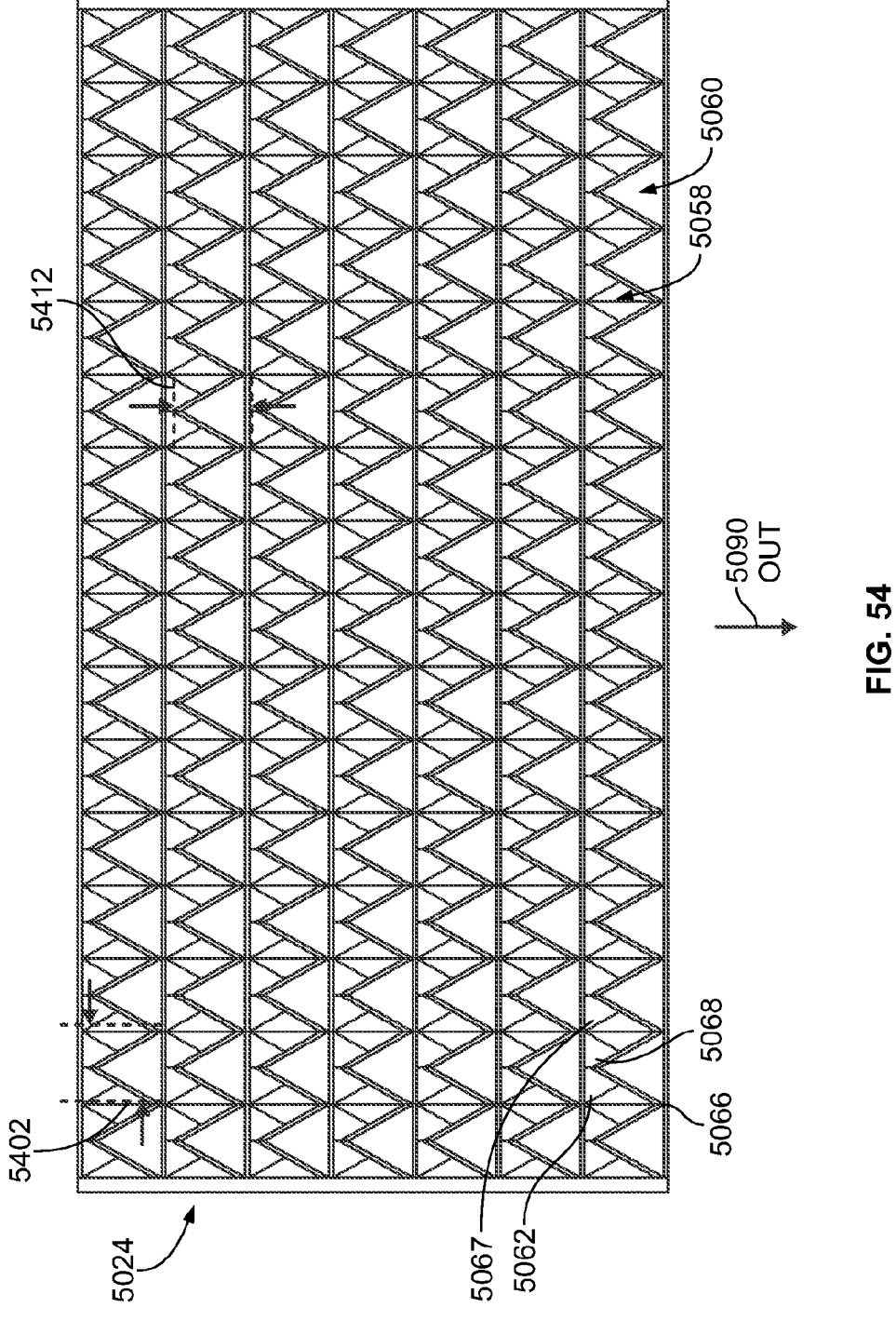

FIG. 54 is a rear planar view of the outlet side of the layered filter media pack of FIG. 50.

Figure 55:
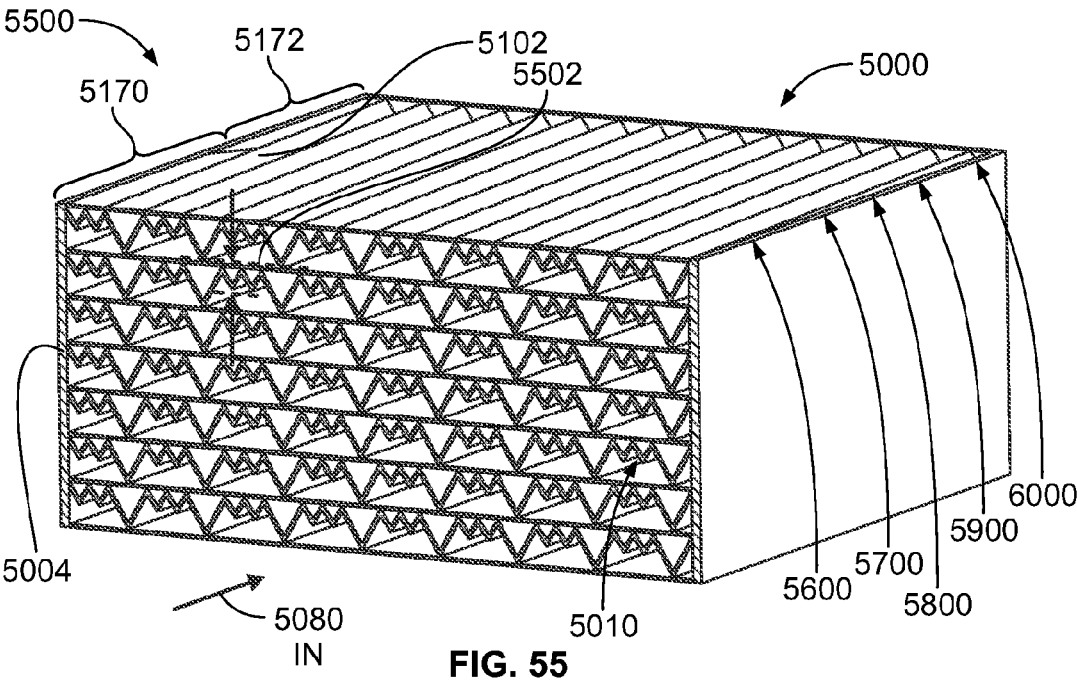

FIG. 55 is a cross-sectional view of the layered filter media pack of FIG. 50 at a first location along the axial direction.

Figure 56:
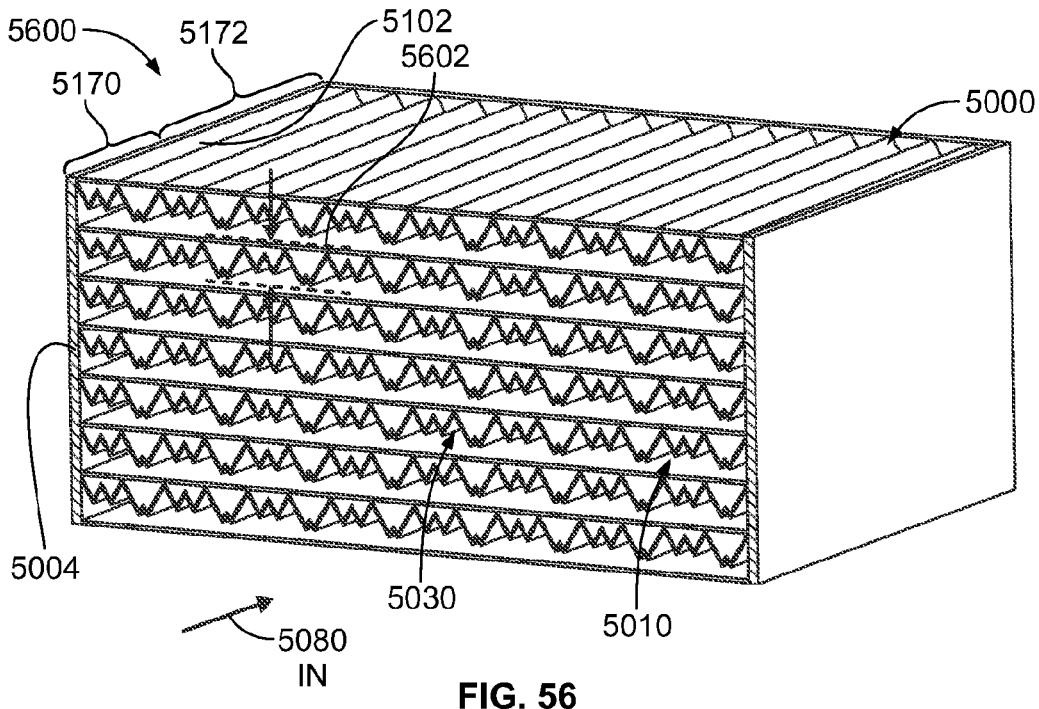

FIG. 56 is a cross-sectional view of the layered filter media pack of FIG. 50 at a second location along the axial direction.

Figure 57:
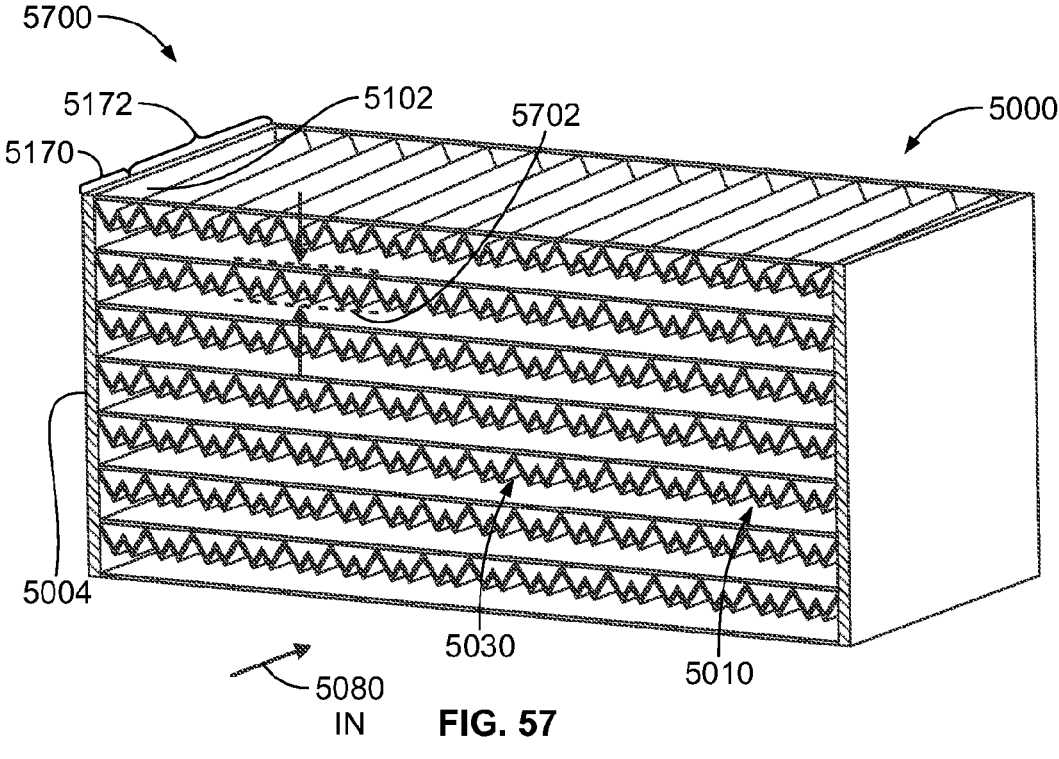

FIG. 57 is a cross-sectional view of the layered filter media pack of FIG. 50 at a third location along the axial direction.

Figure 58:
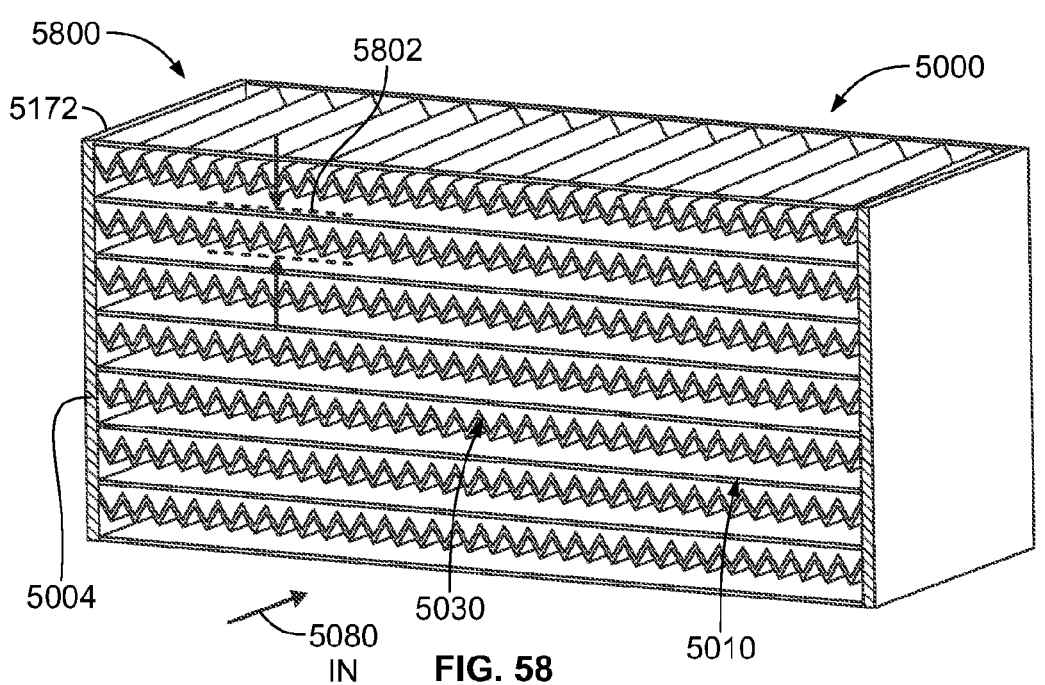

FIG. 58 is a cross-sectional view of the layered filter media pack of FIG. 50 at a fourth location along the axial direction.

Figure 59:
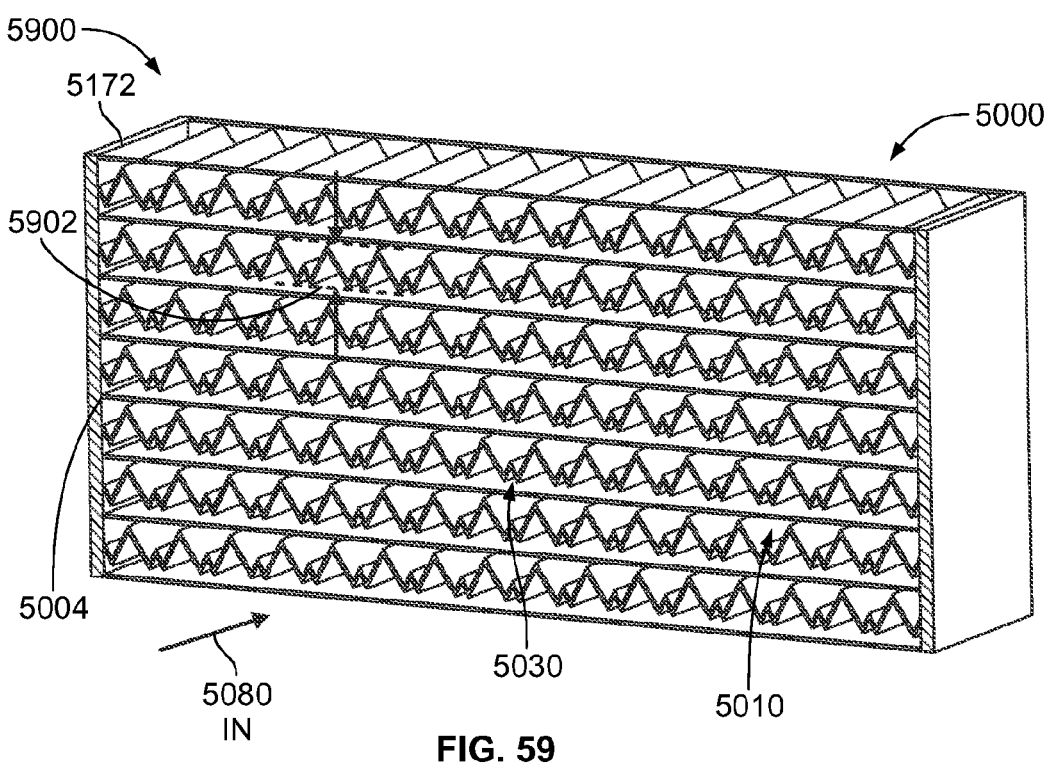

FIG. 59 is a cross-sectional view of the layered filter media pack of FIG. 50 at a fifth location along the axial direction.

Figure 60:
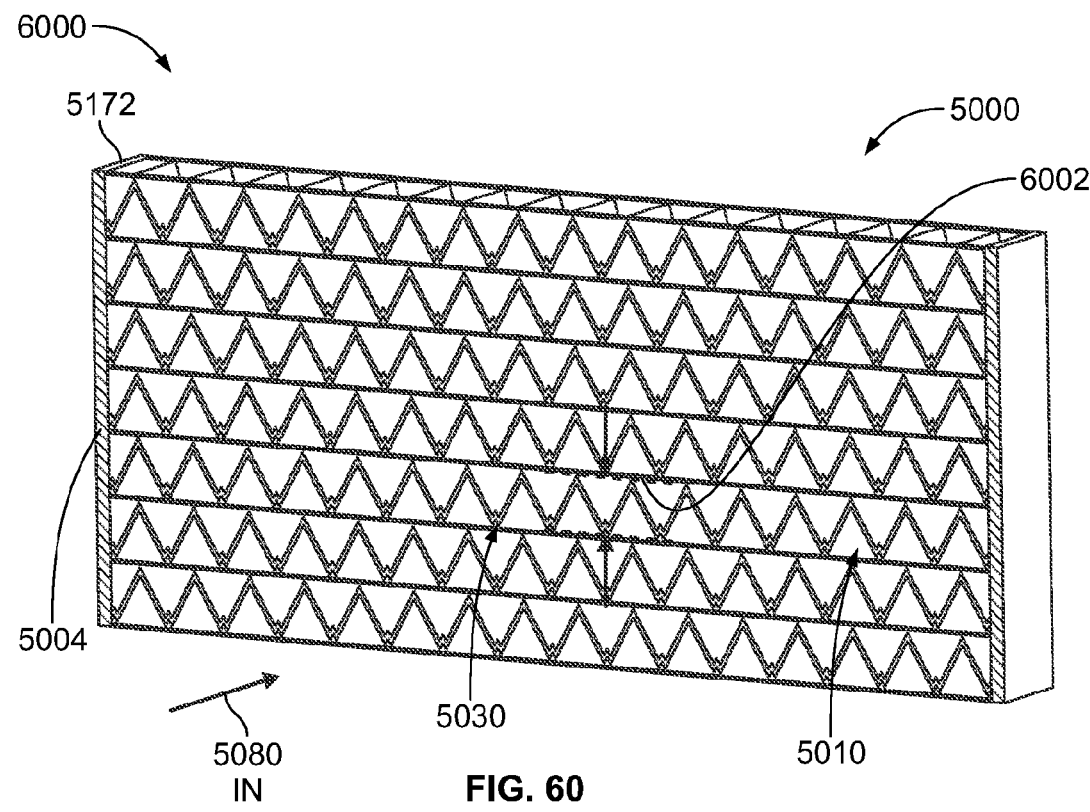

FIG. 60 is a cross-sectional view of the layered filter media pack of FIG. 50 at a sixth location along the axial direction.

Figure 61:
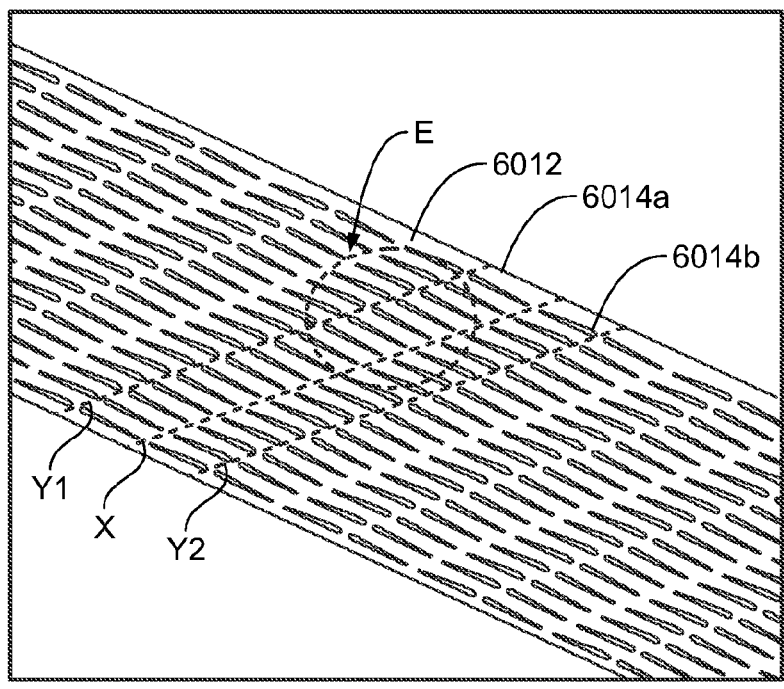

FIG. 61 is pleated filter media that is formed without the use of pleat tip spacing devices, according to an example embodiment.

Figure 62:
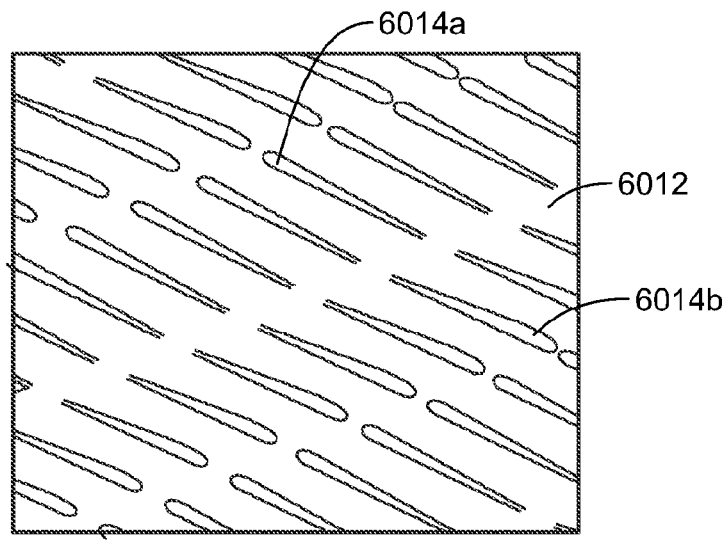

FIG. 62 is a portion of the filter media of FIG. 61.

FIG. 63 is a top view of an oval filter media implementing the pleated filter media of FIG. 61, according to an example embodiment.

FIG. 64A is a front view of a racetrack filter media formed using the filter media of FIG. 61, according to an example embodiment.

FIG. 64B is a perspective view of the filter media of FIG. 64A.

Figure 65A:
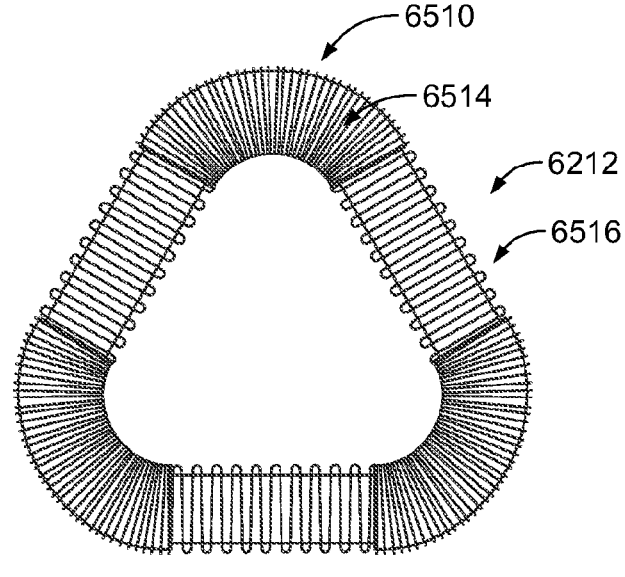

FIG. 65A is a front view of a triangular filter media formed using the filter media of FIG. 61, according to an example embodiment.

Figure 65B:
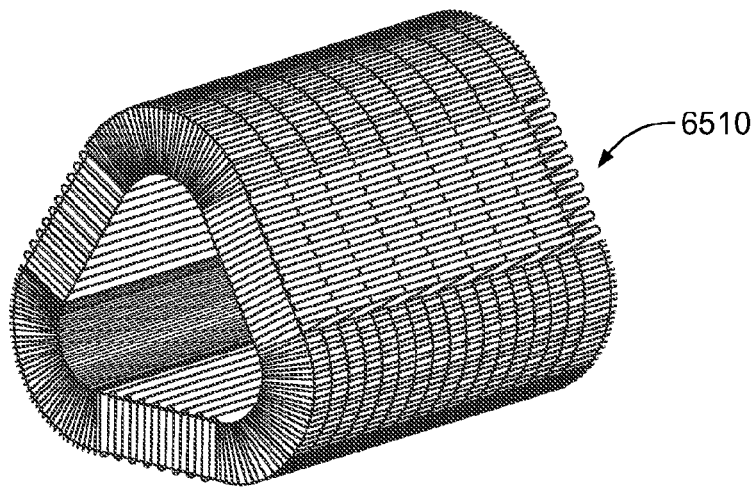

FIG. 65B is a perspective view of the filter media of FIG. 65A.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to filter assemblies including filter elements having flat, folded, and/or tetrahedral arrangements for optimized functionality and performance. The filter assemblies may be formed (e.g., shaped, constructed, etc.) using a wide variety of shapes, angles, overlapping, and materials to improve the filtration, fluid flow, and, in some embodiments, cross-channel flow of fluid through the filter media. In some embodiments, the filter elements formed herein may be formed using pleated filter media.

Many filter media packs in which formed or tetrahedral media are implemented may be space constrained and have unique shapes, and complex filter element shapes may be desired to accommodate the filter element within such mounting structures. The filter media may implement a wide variety of patterns (e.g., repeating, origami, rounded, etc.), shapes (e.g., tetrahedral, rhombus, square), and construction (e.g., pleated, integrated, interdigitated, etc.). In some embodiments, the term "formed" refers to a shape that is imprinted into the media web and this is joined, bonded, sealed, etc. to a flat or second formed media (e.g., media web, media layer, media pack, etc.) Embodiments of filter elements and filter assemblies described herein may provide one or more benefits including, for example, (1) allowing formation of complex shaped filter elements that can be installed in complex shaped housing; (2) minimizing undesirable filter media to filter media contact (e.g., blind-off area); (3) minimizing initial pressure drop along the inlet and/or outlet; and (4) increasing dust loading capacity and cross-flow through the filter media.

As used herein, the term "media form sheet" refers to a flat filter media sheet (e.g., flat sheet) that is formed, folded, or altered into a desired shape to form a "formed sheet." The term "media layer" refers to bonding a formed sheet to a flat filter media sheet and/or bonding multiple media form sheets together (e.g., a pleat). The term "media pack" refers to a plurality of filter media layers (e.g., a filter assembly). The term "filter media" may be used to describe, generally, one or more of the media form sheet, formed sheet, media layer, and/or media pack throughout the description. The term "filter element" refers to a filter media pack with structure, housing, and/or seals.

FIG. 1 is a perspective view of a rectangular filter element 100, according to an example embodiment. The rectangular filter element 100 forms an upstream inlet face 102 (e.g., first end) and a downstream outlet face 104 (e.g., second end) that is disposed away from the upstream inlet face 102 along an axial direction 28. The rectangular filter element 100 includes a first seal member 130, a second seal member 140, an optional liner 170, and filter media pack 110. Generally, the rectangular filter element 100 is configured to constrain pocket movement of the filter media pack 110, particularly during high pressure applications. As shown in FIG. 1, the upstream inlet face 102 and the downstream outlet face 104 are substantially rectangular in shape with the upstream inlet face 102 configured to receive a flow of fluid 180 (e.g., inlet) and the downstream outlet face 104 configured to expel a fluid flow 190 that has been filtered after passing through the filter media pack 110. The filter media pack 110 extends axially from the upstream inlet face 102 towards the downstream outlet face 104. While the upstream inlet face 102, the downstream outlet face 104, and the filter media pack 110 are shown as having a rectangular shape, a wide variety of shapes of the filter media pack 110 may be implemented. Accordingly, the liner 170, the first seal member 130, and/or the second seal member 140 may be configured to have a shape to constrain pocket movement (e.g., channel) of the wide variety of shapes of the filter media pack 110. The filter element 100 may be used to filter air, fuel, air/fuel mixtures, water, lubricants, or other fluids. In some embodiments, the filter element 100 may be used in a vehicle, equipment or power generation system.

The first seal member 130 is disposed around (e.g., adjacent to) the upstream inlet face 102 and is configured to form a seal with a filter housing, additional filter element, and/or similar filter assembly element. In some embodiments, and as shown in FIG. 3, a portion of the first seal member 330 may be disposed around a first media pack 310 and a second filter media (not shown) that is stacked on top of the first media pack 310. In some embodiments, the first seal member 130 is an inlet seal member configured to form a seal with an inlet side of a filter housing.

The second seal member 140 is disposed around (e.g., adjacent to) the downstream outlet face 104 and is configured to form a seal with a filter housing, additional filter element, or similar filter assembly element. The second seal member 140 may include a plurality of seal ribs 150 or flanges that extend along the outlet face of the downstream outlet face 104. In some embodiments, and as shown in FIG. 3, the second seal member 340 may be disposed around a first media pack 310 and a second filter media that is stacked on top of the first media pack 310. In those embodiments, the second seal member 340 may include a plurality of seal ribs 250 that are stacked upon one another with a cross seal member 252 disposed therebetween. In some embodiments, the plurality of seal ribs 250 are configured to provide structure and support to the outlet face along the downstream outlet face 104 to prevent outlet collapse and facilitate expelling of the fluid flow 190. In some embodiments, the second seal member 140 is an outlet seal member configured to form a seal with an outlet side of a filter housing.

The filter media pack 110 is a multilayered filter media that includes a plurality of filter media layers 210. In some embodiments, the plurality of filter media layers 210 are sealed on three sides (e.g., the side walls and the top or bottom surface) and cut to a width to be stacked to create the filter media pack 110. In some embodiments, the plurality of filter media layers 210 are on an outlet face 104 and on at least two sides of the filter media pack 110. In other embodiments, the plurality of filter media layers 210 are alternately sealed on an inlet face 102, alternately sealed on an outlet face 104 and either potted or sealed along the edge of the filter media pack 110. In those embodiments, a plurality of pockets are formed that facilitate cross-channel flow, but may move during high pressure applications. The liner 170 is configured to constrain pocket movement of the filter media pack 110, particularly during high pressure applications. As shown in FIG. 1, the liner 170 is disposed between the first seal member 130 and the second seal member 140 and extends around the outer surfaces of the filter media pack 110. In other words, the liner 170 is structured to take the shape of the filter media pack 110 as it surrounds the outer surfaces of the filter media pack 110. In this manner, complex shapes may be formed that can comply with constrained spaces or complex mounting structures.

The liner 170 (e.g., liner element) is formed by a pair of sidewall surfaces 122 (e.g., the surfaces along the transverse direction 40 and the axial direction 28) and a pair of wall surfaces 124 (e.g., the surface along the lateral direction 44 and the axial direction 28). In particular implementations, the liner 170 is disposed on all outer surfaces of the filter media pack 110 except on the inlet portion and the outlet portion (e.g., except on the inlet surface and the outlet surface), and the liner 170 adheres to the plurality of walls 122, 124 of the filter media pack 110. In some embodiments, the liner 170 includes one or more adhesive portions to secure the liner 170 to the filter media pack 110 and/or a portion of the liner 170 itself. In other embodiments, the liner 170 is secured to the filter media pack 110 by the first seal member 130 and/or the second seal member 140. In some embodiments, the liner 170 may be secured to the filter media pack 110 by one or more support ribs.

Expanding upon the multilayered filter media pack 110, as shown in FIG. 2, the filter media pack 110 includes an inlet portion 202 and an outlet portion 204. The plurality of filter media layers 210 are stacked on top of each other and alternatively sealed to form the filter media pack 110 (e.g., filter media, pleat pack, etc.) such that a pair of sidewall surfaces 222 and pair of wall surfaces 224 are formed. The filter media pack 110 includes a porous material having a mean pore size and configured to filter particulate matter from a fluid flowing therethrough so as to produce filtered fluid. The filter media pack 110 may comprise any suitable filter media. In other embodiments, a filter media layer slot may be formed in each filter media layer 210 before stacking, and the plurality of filter media layers 210 may then be stacked such that each filter media layer slot is axially aligned with each other to form the filter media slot. For example, as shown in FIG. 3, which includes an end face of the stacked filter media (not shown in its entirety). In some embodiments, the filter media pack 110 may comprise a tetrahedral media, (e.g., a formed filter media including tetrahedral shapes) as described in detail herein. In other embodiments, the filter media pack 110 may include a fluted media, an origami media or any other suitable filter media.

While FIGS. 1-4 show the filter media pack 110 as having a generally rectangular shape, in other embodiments, the filter media pack 110 may have any suitable shape, for example, square, polygonal, circular, oval, elliptical, asymmetric, etc. The filter media pack 110 defines an inlet surface being at the inlet portion 202 configured to receive unfiltered fluid, and an outlet surface being at the outlet portion 204 configured to expel fluid that has been filtered after passing through the filter media pack 110. In some embodiments, the filter media pack 110 or any other filter media described herein, may comprise a tetrahedral filter media form. For example, in particular embodiments, the filter media pack 110 may comprise tetrahedral filter media defined by a plurality of tetrahedron forms (e.g., tetrahedron channels, tetrahedron volumes, etc.) as described in U.S. Pat. No. 8,397,920, the contents of which are incorporated herein by reference.

Turning to FIG. 3, a rectangular filter element 300 is shown. The rectangular filter element 300 is similar to the rectangular filter element 100 of FIG. 1. A difference between the rectangular filter element 300 and the rectangular filter element 100 is the rectangular filter element 300 includes a plurality of internal ribs 302, an extended first seal member 330, and an extended second seal member 340 to include additional filter media layers 210, as shown in FIG. 2. Accordingly, similar numbering will be used for similar features of the rectangular filter element 300 and the rectangular filter element 100. The plurality of internal ribs 302 are configured to provide support and structure between a second filter media stacked on top of a first media pack 310 (e.g., two filter media pack 110 stacked on top of each other). The implementation of one or more internal ribs 302 maintains the structure of the filter element 300 and constrain pocket movement of filter media pack 110 during high pressure applications. The first seal member 330 and the second seal member 340 may be extended to accommodate multiple filter medias 110 stacked upon one another. In some embodiments, the first media pack 310 and the second filter media may be positioned side-by-side (e.g., along the lateral direction 44) with a plurality of internal ribs 302 disposed between the sidewall surfaces 222 of the filter media. In some embodiments, the first media pack 310 and/or multiple filter media packs 110 may include different media depths and/or media types as described in U.S. Patent Pub. No. 2017/0197165, the contents of which are incorporated herein by reference.

As shown in FIG. 3, the plurality of internal ribs 302 includes a first internal rib 304 and a second internal rib 306 that extend from the inlet portion 202 toward the outlet portion 204 along an upper surface of the first media pack 310. In some embodiments, a pair of internal ribs are disposed along a bottom surface of the first media pack 310 (e.g., along both wall surfaces 124). Each of the first internal rib 304 and the second internal rib 306 include a base portion 312 adjacent the inlet portion 202 and a beam portion 314 that extends from the base portion 312 toward the outlet portion 204. While the base portion 312 is adjacent the inlet portion 202 and the beam portion 314 extends from the base portion 312 toward the outlet portion 204, in some embodiments, the base portion 312 is adjacent the outlet portion 204 and the beam portion 314 extends from the base portion 312 toward the inlet portion 202. In some embodiments, one or more internal ribs 302 are disposed along the pair of sidewall surfaces 222 of the filter media pack 110. In some embodiments, one or more internal ribs 302 are disposed between the outer surface of the filter media pack 110 and an internal surface of the liner 170. In various embodiments, the internal ribs 302 are secured to the filter media pack 110 via adhesive.

Referring to FIG. 4, a rectangular filter element 400 is shown. The rectangular filter element 400 is similar to the rectangular filter element 100 of FIG. 1. A difference between the rectangular filter element 400 and the rectangular filter element 100 is the rectangular filter element 400 includes a plurality of external ribs outside of the liner 170. Accordingly, similar numbering will be used for similar features of the rectangular filter element 400 and the rectangular filter element 100. The plurality of external ribs, shown as a first external rib 404, a second external rib 406, and a third external rib 408, are configured to provide support and structure to the filter media pack 110 during installation and operation of the filter media 400. The implementation of one or more external ribs maintains the structure of the filter element 400 and constrain pocket movement of filter media pack 110 during high pressure applications. In some embodiments, one or more plurality of external ribs can be configured to provide guidance and/or alignment features. In some embodiments, the first seal member 130 and the second seal member 140 may be extended to accommodate multiple filter medias stacked upon one another.

As shown in FIG. 4, the plurality of external ribs includes a first external rib 404 along the wall surface 124, a second external rib 406 along the wall surface 124, and a third external rib 408 along a sidewall surface 122. The first external rib 404 and the second external rib 406 extend from the inlet face 102 toward the outlet face 104 along an upper surface of the wall surface 124 of the filter media pack 110. In some embodiments, one or more external ribs are disposed along a lower surface (e.g., bottom) of a wall surface 124 of the filter media pack 110. The third external rib 408 extends from the inlet face 102 toward the outlet portion face 104 along a surface of the sidewall surface 122 of the filter media pack 110. In some embodiments, one or more external ribs are disposed along an opposite surface of a sidewall surface 122 of the filter media pack 110.

Each of the first external rib 404, the second external rib 406, and the third external rib 408 include a base portion 412 adjacent the inlet face 102 and a beam portion 414 that extends from the base portion 412 toward the outlet face 104. While the base portion 412 is adjacent the inlet face 102 and the beam portion 414 extends from the base portion 412 toward the outlet face 104, in some embodiments, the base portion 412 is adjacent the outlet face 104 and the beam portion 414 extends from the base portion 412 toward the inlet face 102. In some embodiments, one or more internal ribs 302 are disposed between the outer surface of the filter media pack 110 and an internal surface of the liner 170. In various embodiments, the external ribs are secured to the filter media pack 110 via adhesive.

In some embodiments, the rectangular filter element 100 is configured to extend the filter life and/or is confined to small spaces/volumes. The filter media pack 110 is designed to increase filter media area, compared to conventional pleated filter media, by including a plurality of pockets stacked to fit within a rectangular shaped and used as an axial flow filter. The implementation of one or more internal ribs 302 and/or external ribs with the liner 170 maintains the structure of the filter element 100 and constrains pocket movement of the filter media pack 110 during high pressure applications.

Turning to FIGS. 5-8, a filter media form 20 which can be used as the filter media pack 110 of a filter element is shown. The filter media form 20 has an upstream inlet 24 receiving incoming dirty fluid as shown at arrows 23, and has a downstream outlet 22 discharging clean filtered fluid as shown at arrows 25. In some embodiments, the filter media form 20 is configured to receive flows in the opposite direction through the filter media form 20. In other words, in those embodiments, the downstream outlet 22 receives dirty fluid 23 and the upstream inlet 24 discharges clean filtered fluid 25. The filter media form 20 is folded along a plurality of bend lines 26. The bend lines extend axially along an axial direction 28, FIGS. 5-8, and include a first set of bend lines 30 extending from the downstream outlet 22 towards the upstream inlet 24, and a second set of bend lines 32 extending from the upstream inlet 24 axially towards the downstream outlet 22. The filter media form 20 has a plurality of filter media wall segments 34 extending in serpentine manner between the bend lines. The wall segments extend axially and define axial flow channels 36 therebetween. As will be appreciated, the term "flow channels" includes flow volumes, flow passages, and similar flow structures. The channels 36 have a height 38 along a transverse direction 40, which transverse direction 40 is substantially perpendicular to axial direction 28, FIG. 6. The channels 36 have a lateral width 42 along a lateral direction 44, which lateral direction 44 is substantially perpendicular to axial direction 28 and substantially perpendicular to transverse direction 40. At least some of the noted bend lines taper in the noted transverse direction as they extend axially in the noted axial direction, to be described. In particular embodiments, the filter media form 20 may comprise tetrahedral filter media defined by a plurality of tetrahedron forms as described in U.S. Pat. No. 8,397,920. Other embodiments of the present application may implement shaped filter media and/or tetrahedral filter media defined by a plurality of channels and/or tetrahedron forms as described in U.S. Pat. No. 8,397,920.

As used herein, the term "serpentine span" and/or "serpentine manner" refers to a repeating pattern along a direction of the filter media and/or filter media layer. In some embodiments, the serpentine span is a repeating pattern along the lateral direction. In some embodiments, a plurality of wall segments extend in a serpentine manner between a plurality of bend lines in a lateral direction to define a serpentine span. In those embodiments, the span in the serpentine span includes a first wall segment, a second wall segment laterally adjacent the first wall segment, a bend line in the second subset of bend lines joining thereto, a third wall segment laterally adjacent the second wall segment, and a fourth wall segment laterally adjacent the third wall segment, a bend line in the fourth subset of bend lines joining thereto. In some embodiments, the "serpentine span" includes a wavy shape, waviness, or similar patterning along a formed sheet.

As shown in FIGS. 6-7, the wall segments include a first set of wall segments 46 alternately sealed to each other at the downstream outlet 22, e.g. by adhesive 48 or the like, to define a first set of channels 50 having open downstream ends, and a second set of channels 52 interdigitated with the first set of channels 50 and having closed downstream ends. As shown in FIG. 7-8, the wall segments include a second set of wall segments 54 alternately sealed to each other at the upstream inlet 24, e.g., by adhesive 56 or the like, to define a third set of channels 58 having closed upstream ends, and a fourth set of channels 60 (FIG. 8) interdigitated with the third set of channels 58 and having open upstream ends. The first set of bend lines 30 includes a first subset of bend lines 62 defining the first set of channels 50, and a second subset of bend lines 64 defining the second set of channels 52. The second subset of bend lines 64 taper in transverse direction 40 as they extend from the downstream outlet 22 axially towards the upstream inlet 24 (FIGS. 9-11). The second set of bend lines 32 includes a third subset of bend lines 66 defining the third set of channels 58, and a fourth subset of bend lines 68 defining the fourth set of channels 60. The fourth subset of bend lines 68 taper in the transverse direction 40 as they extend from the upstream inlet 24 axially towards the downstream outlet 22 (FIGS. 9-11). The second set of channels 52 have a decreasing transverse channel height 38 along transverse direction 40 as the second set of channels 52 extend axially along axial direction 28 towards the upstream inlet 24. The tapering of the second subset of bend lines 64 in the transverse direction 40 provides the decreasing transverse channel height 38 of the second set of channels 52. The fourth set of channels 60 have a decreasing transverse channel height along transverse direction 40 as the fourth set of channels 60 extend axially along axial direction 28 towards the downstream outlet 22. The tapering of the fourth subset of bend lines 68 in the transverse direction 40 provides the decreasing transverse channel height 38 of the fourth set of channels 60.

Incoming dirty fluid 23 to be filtered flows along axial direction 28 into open channels 60 at the upstream inlet 24 and passes laterally and/or transversely through the filter media wall segments of the filter media form 20 and then flows axially along axial direction 28 as clean filtered fluid 25 through open channels 50 at the downstream outlet 22. Second subset of bend lines 64 provides lateral cross-flow thereacross along lateral direction 44 between respective channels upstream of the downstream outlet 22. Fourth subset of bend lines 68 provides lateral cross-flow thereacross along lateral direction 44 between respective channels downstream of the upstream inlet 24. Second and fourth subsets of bend lines 64 and 68 have axially overlapping sections 70, and the noted lateral cross-flow is provided at least at axially overlapping sections 70. In some embodiments, the flow is reversed through the filter media form 20 such that incoming dirty fluid 23 to be filtered flows along axial direction 28 into open channels 50 and passes laterally and/or transversely through the filter media wall segments of the filter media form 20 and then flows axially along axial direction 28 as clean filtered fluid 25 through open channels 60.

The second subset of bend lines 64 taper to respective termination points 72, FIGS. 9-11, providing at such termination points the minimum transverse channel height 38 of the second set of channels 52. The fourth subset of bend lines 68 taper to respective termination points 74 providing at such termination points the minimum transverse channel height 38 of the fourth set of channels 60. Termination points 72 of the second subset of bend lines 64 are axially upstream of termination points 74 of the fourth subset of bend lines 68. This provides the noted axially overlapping sections 70. Termination points 72 of second subset of bend lines 64 are at the upstream inlet 24 in one embodiment, and in other embodiments are axially downstream of the upstream inlet 24. Termination points 74 of fourth subset of bend lines 68 are at the downstream outlet 22 in one embodiment, and in other embodiments are axially upstream of the downstream outlet 22.

The first set of wall segments 46 are alternately sealed to each other at adhesive 48 at the downstream outlet 22 and define a first set of tetrahedron forms 50 having open downstream ends, and a second set of tetrahedron forms 52 interdigitated with the first set of tetrahedron forms 50 and having closed downstream ends. The second set of wall segments 54 are alternately sealed to each other at adhesive 56 at the upstream inlet 24 and define a third set of tetrahedron forms 58 having closed upstream ends, and a fourth set of tetrahedron forms 60 interdigitated with the third set of tetrahedron forms 58 and having open upstream ends. The first set of bend lines 30 includes the first subset of bend lines 62 defining the first set of tetrahedron forms 50, and the second subset of bend lines 64 defining the second set of tetrahedron forms 52. The second subset of bend lines 64 taper in the transverse direction 40 as they extend from the downstream outlet 22 axially towards the upstream inlet 24. The second set of bend lines 32 includes the third subset of bend lines 66 defining the third set of tetrahedron forms 58, and the fourth subset of bend lines 68 defining the fourth set of tetrahedron forms 60. The fourth subset of bend lines 68 taper in the transverse direction 40 as they extend from the upstream inlet 24 axially towards the downstream outlet 22.

First and second sets of tetrahedron forms 50 and 52, shown in FIGS. 7-11, face oppositely to third and fourth sets of tetrahedron forms 58 and 60. Each of the tetrahedron forms 50, 52, 58, 60 is elongated in the axial direction 28. Each of the tetrahedron forms has a cross-sectional area along a cross-sectional plane defined by the transverse and lateral directions 40 and 44. The cross-sectional areas of the first and second sets of tetrahedron forms 50 and 52 decrease as the first and second sets of tetrahedron forms 50 and 52 extend along axial direction 28 from the downstream outlet 22 toward the upstream inlet 24. The cross-sectional areas of third and fourth sets of tetrahedron forms 58 and 60 decrease as the third and fourth sets of tetrahedron forms 58 and 60 extend along axial direction 28 from the upstream inlet 24 toward the downstream outlet 22. In one embodiment, bend lines 26 are bent at a sharp pointed angle, as shown at 80 in FIG. 6. Alternatively, the bend lines may be rounded along a given radius, as shown by the dashed line at 82 in FIG. 6.

The filter media form 20 is further provided with a substantially flat sheet 84 extending laterally across the bend lines. In one embodiment, the sheet is composed (e.g., formed, made, etc.) of filter media material, which may be the same filter media material as the folded filter element including wall segments 34. Sheet 84 extends axially along the full axial length along axial direction 28 between the downstream outlet 22 and the upstream inlet 24, and extends laterally along the full lateral width along lateral direction 44 across. The adhesive 56 seals the channels to prevent bypass of dirty upstream air to clean downstream air without passing through and being filtered by a wall segment 34. In one embodiment, sheet 84 is rectiplanar along a plane defined by axial direction 28 and lateral direction 44. In another embodiment, sheet 84 is slightly corrugated, as shown in dashed line at 86, FIG. 9. In one implementation, sheet 84 is rolled with the filter media form 20 into a closed loop, and in various embodiments the closed loop has a shape selected from the group of circular (FIG. 12), racetrack (two curved ends joined by two straight or substantially straight portions) (FIG. 13), oval, oblong, and other closed-loop shapes. In other embodiments, a plurality of filter media layers 20 and sheets are stacked upon each other in a stacked panel arrangement, as shown in FIGS. 14-16. Spacer strips or embossments such as 88 may be used as needed for spacing and support between stacked elements.

In some embodiments, the filter media form 20 includes a substantially flat sheet 84 that is formed using a filter media having different properties, materials, and/or construction (e.g., different grade media) than the filter media used to form the channel 36 and bend lines 26 (i.e., the formed layer). In other words, the filter media form 20 includes layer specific air filtration media grades tailored to the layer geometry of the flat sheet 84 and the channel 36 and bend lines 26 to improve the function of the axial flow filtration of the filter media form 20. Deflection of the filter media form 20 during loading may be controlled through the use of asymmetric tetragonal (e.g., tetrahedral) geometry that utilizes a planar and a convex surface. Specifically, the flat sheet 84 layers are designed to deflect away from the planar surface(s) of the formed layer and into the concave surface of the adjacent formed layer. Accordingly, the formed layer of the filter media form 20 may be formed using a filter media grade that includes high stiffness properties, burst strength properties, and/or hotmelt adhesion and exhibits minimal initial and extended (e.g., twenty-four hour) spring back. The flat sheet 84 (e.g., flat layer) may be formed using a filter media grade that includes lower stiffness properties, is thinner than the formed layer, and has high hotmelt adhesion. The media selected for both the flat layer and the formed layer may include properties that result in high particle capture efficiency. By forming a filter media form 20 with a formed layer having a different media grade than the flat layer—which implement/include the properties discussed above—the filter media form 20 will have improved dust capacity and particle removal efficiency and minimize clean restriction compared to filter media form 20 formed using the same media grade for the formed layer and the flat layer.

FIGS. 17-19 show a further embodiment eliminating sheet 84. This further embodiment is like the embodiment of FIGS. 9-11 and use like reference numerals from above where appropriate to facilitate understanding (although the reference numerals used for the upstream inlet and downstream outlet are reversed). The filter element of FIGS. 17-19 has an upstream inlet 22 receiving incoming dirty fluid, and a downstream outlet 24 discharging clean filtered fluid. The wall segments are alternately sealed to each other at upstream inlet 22 as above, e.g. by adhesive or a section of filter media at 48, to define the noted first set of channels 50 having open upstream ends, and the noted second set of channels 52 interdigitated with the first set of channels and having closed upstream ends. The wall segments are alternately sealed to each other at the downstream outlet 24, e.g. by adhesive or a section of filter media at 56, to define the noted third set of channels 58 having closed downstream outlets, and the noted fourth set of channels 60 having open downstream outlets. The bend lines include the noted first subset of bend lines 62 defining the first set of channels 50, and the noted second subset of bend lines 64 defining the noted second set of channels 52, and the noted third subset of bend lines 66 defining the third set of channels 58, and the noted fourth subset of bend lines 68 defining the noted fourth set of channels 60.

Turning to FIG. 20, a filter media form 2020 which can be used as the filter media pack 110 of the filter element 100 is shown. The filter media form 2020 is similar to the filter media form 20 of FIGS. 5-19. A difference between the filter media form 2020 and the filter media form 20 is the filter media form 2020 includes a plurality of embossments 2088 along the channels 2036. Accordingly, like numbering is used to designate like parts between the filter media form 2020 and the filter media form 20. Generally, the plurality of embossments 2088 are configured to minimize undesirable filter media to filter media contact (e.g., blind-off area), thereby minimizing the initial pressure drop and increasing dust loading through the filter media form 2020.

The filter media form 2020 has an upstream inlet 2022 receiving incoming dirty fluid as shown at arrows 2080, and has a downstream outlet 2024 discharging clean filtered fluid as shown at arrows 2090. The filter media form 2020 is formed along a plurality of bend lines 2026. The bend lines extend axially along an axial direction 28 and include a first set of bend lines 2030 extending from the upstream inlet 2022 towards the downstream outlet 2024 and a second set of bend lines 2032 extending from the downstream outlet 2024 axially towards the upstream inlet 2022. The filter media form 2020 has a plurality of filter media wall segments 2034 extending in serpentine manner between the bend lines. The wall segments extend axially and define axial flow channels 2036 therebetween. The channels 2036 have a height along a transverse direction 40, which transverse direction 40 is substantially perpendicular to axial direction 28. The channels 2036 have a lateral width along a lateral direction 44, which lateral direction 44 is substantially perpendicular to axial direction 28 and substantially perpendicular to transverse direction 40. As shown in FIG. 20, the channels 2036 are wider and shorter than the channels of the filter media form 20 of FIG. 6. In some embodiments, the channels 2036 are more narrow and/or longer than the channels of the filter media form 20 of FIG. 6. At least some of the noted bend lines taper in the noted transverse direction as they extend axially in the noted axial direction, to be described. In particular embodiments, the filter media form 2020 may comprise tetrahedral filter media defined by a plurality of tetrahedron channels as described in U.S. Pat. No. 8,397,920.

The wall segments include a first set of wall segments 2046 alternately sealed to each other at the upstream inlet 2022—for example, by an adhesive or the like—to define a first set of channels 2050 having open upstream ends, and a second set of channels 2052 interdigitated with the first set of channels 2050 and having closed upstream ends. The wall segments include a second set of wall segments 2054 alternately sealed to each other at the downstream outlet 2024—for example, by an adhesive or the like—to define a third set of channels 2058 having closed downstream outlets, and a fourth set of channels 2060 interdigitated with the third set of channels 2058 and having open downstream outlets.

The first set of bend lines 2030 includes a first subset of bend lines 2062 defining the first set of channels 2050, and a second subset of bend lines 2064 defining the second set of channels 2052. The second subset of bend lines 2064 taper in transverse direction 40 as they extend from the upstream inlet 2022 axially towards the downstream outlet 2024. The second set of bend lines 2032 includes a third subset of bend lines 2066 defining the third set of channels 2058, and a fourth subset of bend lines 2068 defining the fourth set of channels 2060. The fourth subset of bend lines 2068 taper in the transverse direction 40 as they extend from the downstream outlet 2024 axially towards the upstream inlet 2022. The second set of channels 2052 have a decreasing transverse channel height along transverse direction 40 as the second set of channels 2052 extend axially along axial direction 28 towards the downstream outlet 2024. The tapering of the second subset of bend lines 2064 in the transverse direction 40 provides the decreasing transverse channel height of the second set of channels 2052. The fourth set of channels 2060 have a decreasing transverse channel height along transverse direction 40 as the fourth set of channels 2060 extend axially along axial direction 28 towards the upstream inlet 2022. The tapering of the fourth subset of bend lines 2068 in the transverse direction 40 provides the decreasing transverse channel height of the fourth set of channels 2060.

The second subset of bend lines 2064 taper to respective termination points 2072, providing at such termination points the minimum transverse channel height of the second set of channels 2052. The fourth subset of bend lines 2068 taper to respective termination points 2074 providing at such termination points the minimum transverse channel height of the fourth set of channels 2060. Termination points 2072 of second subset of bend lines 2064 are axially downstream of termination points 2074 of fourth subset of bend lines 2068. The termination points 2072 of second subset of bend lines 2064 are at the downstream outlet 2024 in one embodiment, and in other embodiments are axially upstream of the downstream outlet 2024. Termination points 2074 of fourth subset of bend lines 2068 are at the upstream inlet 2022 in one embodiment, and in other embodiments are axially downstream of the upstream inlet 2022. The termination points 2072 of second subset of bend lines 2064 being axially downstream of termination points 2074 of fourth subset of bend lines 2064 provides axially overlapping sections 2070. The noted lateral cross-flow is provided at least at axially overlapping sections 2070. In some embodiments, the axially overlapping sections 2070 of the filter media form 2020 are longer, resulting in more cross-flow, than the overlapping sections of other filter media, for example, the overlapping sections 70 of the filter media form 20.

A plurality of embossments 2088 are positioned between wall segments 2034 in the open channels 2036 to minimize the blind-off area (e.g., undesirable filter media to filter media contact) of the filter media form 2020. The plurality of embossments 2088 includes a first set of embossments 2084 disposed near the upstream inlet 2022 and a second set of embossments disposed near the downstream outlet 2024. The plurality of embossments 2088 may allow the formed sheet (e.g., filter media form 2020) to maintain proper spacing from a flat sheet. For example, the plurality of embossments 2088 may be positioned along a contact line (e.g., the line that represents the contact point of the flat sheet with the formed sheet). The plurality of embossments 2088 also serve to reduce the contact area between the formed sheet and the flat sheet thereby reducing material masking of the filter media form 2020 and to enable cross-flow across the valleys. In some embodiments, each of the embossments in the plurality of embossments 2088 has a height between 5 and 50 thousandths of an inch. In some arrangements, each of the embossments in the plurality of embossments 2088 are positioned at spots along the formed sheet where the formed sheet does not initially touch the flat sheet. In some arrangements, each of the embossments in the plurality of embossments 2088 are spaced apart by at least 50 thousandths of an inch.

The first set of embossments 2084 are disposed in the first set of channels 2050 between adjacent wall segments in the first set of wall segments 2046. Each embossment 2080 in the first set of embossments 2084 protrudes in the lateral direction 44 and the transverse direction 40 from the first set of channels 2050 to create a raised surface. Each embossment 2080 is substantially centered on the first subset of bend lines 2062 and extends upwards along the transverse direction 40 and extends along the lateral direction 44 to connect the wall segment 2046 along the second subset of bend lines 2064 with an adjacent wall segment 2046 along the second subset of bend lines 2064. The protrusion of the embossment 2080 along the transverse direction 40 reduces the contact area between the filter media form 2020 and a flat sheet media (e.g., flat sheet media 84) or other filter media. The extension of the embossments 2080 along the lateral direction 44 to connect the wall segment 2046 along the second subset of bend lines 2064 with an adjacent wall segment 2046 along the second subset of bend lines 2064 creates additional cross-flow due to the additional cross-flow passages. In some embodiments, one or more embossments 2080 in the first set of embossments 2084 protrude into the first set of channels 2050 to form a negative embossment (e.g., indention, dimple, divot, etc.).

The second set of embossments 2086 are disposed in the third set of channels 2058 between adjacent wall segments in the second set of wall segments 2054. Each embossment 2082 in the second set of embossments 2086 protrudes in the lateral direction 44 and transverse direction 40 from the third set of channels 2058 to create a raised surface. Each embossment 2082 is substantially centered on the third subset of bend lines 2066 and extends upward along the transverse direction 40 and extends along the lateral direction 44 to connect the wall segment 2054 along the fourth subset of bend lines 2068 with an adjacent wall segment 2054 along the fourth subset of bend lines 2068. The protrusion of the embossment 2082 along the transverse direction 40 reduces the contact area between the filter media form 2020 and a flat sheet media (e.g., flat sheet media 84) or other filter media. The extension of the embossments 2082 along the lateral direction 44 to connect the wall segment 2054 along the fourth subset of bend lines 2068 with an adjacent wall segment 2054 along the fourth subset of bend lines 2068 creates additional cross-flow due to the additional cross-flow passages. In some embodiments, one or more embossments 2082 in the second set of embossments 2086 protrudes into the third set of channels 2058 to form a negative embossment (e.g., indention, divot, dimple, etc.).

The plurality of embossments 2088 reduce contact area between tetrahedral media and the flat sheet media and allow for cross-flow between adjacent channels. In air filter implementations, this cross-flow allows for more even dust loading on the upstream side of the media. Further, because the plurality of embossments 2088 leave the filter media with more open areas and facilitate greater lateral cross-flow, there is a lower pressure drop on the upstream side (e.g., less restriction on the downstream side). In some embodiments, the plurality of embossments 2088 provide additional structural support between the filter media layer and flat sheet, resulting in less deformation and potential for collapse. Various fluids may be filtered, including air, air/fuel mixture or other gases, and including liquids such as fuel, lubricants or water.

Referring to FIG. 21, a front view (e.g., inlet side) of a filter media 2120 which can be used as the filter media pack 110 of the filter element 100 is shown. The filter media 2120 is similar to the filter media form 2020 of FIG. 20. A difference between the filter media 2120 and the filter media form 2020 is the filter media 2120 includes a plurality of embossments 2188 along the first subset of bend lines 2062 and the second subset of bend lines 2064 and includes dimple embossments. Accordingly, like numbering is used to designate like parts between the filter media 2120 and the filter media form 2020.

The plurality of embossments 2188 are positioned between wall segments 2034 in the open channels 2036 to minimize the blind-off area (e.g., undesirable filter media to filter media contact) of the filter media 2120. The plurality of embossments 2188 includes a first set of embossments

2184 disposed near the upstream inlet 2022 at the valleys of the first set of channels 2050 and a second set of embossments disposed near the crest of the second set of channels 2052. The first set of embossments 2184 are disposed in the first set of channels 2050 between adjacent wall segments in the first set of wall segments 2046. Each embossment 2180 in the first set of embossments 2184 protrudes in the lateral direction 44 and transverse direction 40 from the first set of channels 2050 to create a raised surface. Each embossment 2180 is substantially centered on the first subset of bend lines 2062 and extends upward along the transverse direction 40 and extends along the lateral direction 44 to connect the wall segment 2046 along the second subset of bend lines 2064 with an adjacent wall segment 2046 along the second subset of bend lines 2064. The protrusion of the embossment 2180 along the transverse direction 40 reduces the contact area between the filter media 2120 and a flat sheet media (e.g., flat sheet media 84) or other filter media. The extension of the embossments 2180 along the lateral direction 44 to connect the wall segment 2046 along the second subset of bend lines 2064 with an adjacent wall segment 2046 along the second subset of bend lines 2064 creates additional cross-flow due to the additional cross-flow passages. In some embodiments, one or more embossments 2180 in the first set of embossments 2184 protrudes into the first set of channels 2050 to form a negative embossment (e.g., indention, divot, etc.).

The second set of embossments 2186 are disposed along the second subset of bend lines 2064 at the peak. Each embossment 2182 in the second set of embossments 2186 protrudes downward (e.g., into the page) in the transverse direction 40 to create a depressed surface. As shown in the embodiment depicted in FIG. 21, the embossments 2182 may take the form of dimples and may be substantially circular in shape, although the embossments 2182 may possess noncircular shapes as well. Each embossment 2182 is substantially centered at the peak of the second subset of bend lines 2064 and extends downward from the peak along the transverse direction 40 and extends along the lateral direction 44 to connect the wall segment 2046 along the second subset of bend lines 2064 with an adjacent wall segment 2046 along the second subset of bend lines 2064. The protrusion of the embossment 2182 along the transverse direction 40 reduces the contact area between the filter media 2120 and a flat sheet media (e.g., flat sheet media 84) or other filter media. The extension of the embossments 2182 along the lateral direction 44 to connect the wall segment 2046 along second subset of bend lines 2064 with an adjacent wall segment 2046 along the second subset of bend lines 2064 creates additional cross-flow due to the additional cross-flow passages. In some embodiments, the second set of embossments 2186 positioned along a crest protrude in the same direction of the crest.

Generally, the plurality of embossments 2188 are configured to minimize undesirable filter media to filter media contact (e.g., blind-off area) thereby minimizing the initial pressure drop and increasing dust loading through the filter media 2120. Additionally, the plurality of embossments 2188 serve to provide additional structural strength during uneven loading conditions. The plurality of embossments 2188 may allow the formed sheet (e.g., filter media 2120) to maintain proper spacing from a flat sheet. For example, the plurality of embossments 2188 may be positioned along a contact line (e.g., the line that represents the contact point of the flat sheet with the formed sheet). The plurality of embossments 2188 also serve to reduce the contact area between the formed sheet and the flat sheet thereby reducing material masking of the filter media 2120 and to enable cross-flow across the valleys. In some embodiments, each embossment in the plurality of embossments 2188 has a height between 5 and 50 thousandths of an inch. In some arrangements, each embossment in the plurality of embossments 2188 are positioned at spots along the formed sheet where the formed sheet does not initially touch the flat sheet. In some arrangements, each embossment in the plurality of embossments 2188 are spaced apart by at least 50 thousandths of an inch.

Turning to FIGS. 22A and 22B, a filter media 2220, which can be used as the filter media pack 110 of the filter element 100, is shown. The filter media 2220 is similar to the filter media form 20 of FIGS. 5-19. A difference between the filter media 2220 and the filter media form 20 is the filter media 2220 implements a five-sided channel 2236 instead of a three-sided channel 36. Accordingly, like numbering is used to designate like parts between the filter media 2220 and the filter media form 20. Generally, the implementation of a five-sided channel 2236—or similarly curved cross-section—reduces blind-off area compared to a three-sided channel 36 by reducing the contact area between the formed sheet (e.g., wall segments 2234) and the flat sheet media 2284, thereby reducing the initial pressure drop at the upstream inlet 2222 and increasing the dust loading of the filter media 2220. The filter media 2220 is configured to implement volume asymmetry. In some embodiments, the filter media 2220 implements a seven-sided channel, a nine-sided channel, and other number of sided channels.

The filter media 2220 has an upstream inlet 2222 receiving incoming dirty fluid as shown at arrows 2280, and has a downstream outlet 2224 discharging clean filtered fluid as shown at arrows 2290. The filter media 2220 is formed along a plurality of bend lines 2226. The bend lines extend axially along an axial direction 28 and include a first set of bend lines 2230 extending from the upstream inlet 2222 towards the downstream outlet 2224 and a second set of bend lines 2232 extending from the downstream outlet 2224 axially towards the upstream inlet 2222. The filter media 2220 has a plurality of filter media wall segments 2234 extending in serpentine manner between the bend lines. The wall segments 2234 extend axially and define axial flow channels 2236 therebetween. The channels 2236 have a height along a transverse direction 40, which transverse direction 40 is substantially perpendicular to axial direction 28. The channels 2236 have a lateral width along a lateral direction 44, which lateral direction 44 is substantially perpendicular to axial direction 28 and substantially perpendicular to transverse direction 40. As shown in FIG. 22A, the channels 2236 are wider than the channels of the filter media form 20 of FIG. 6. At least some of the noted bend lines taper in the noted transverse direction 40 as they extend axially in the noted axial direction, to be described.

The wall segments 2234 include a first set of wall segments 2246 alternately sealed to each other at the upstream inlet 2222—for example, by an adhesive or the like—to define a first set of channels 2250 having open upstream ends, and a second set of channels 2252 interdigitated with the first set of channels 2250 and having closed upstream ends. The wall segments 2234 further include a second set of wall segments 2254 alternately sealed to each other at the downstream outlet 2224—for example, by an adhesive or the like—to define a third set of channels 2258 having closed downstream outlets, and a fourth set of channels 2260 interdigitated with the third set of channels 2258 and having open downstream outlets. In other words, the first set of channels 2250 and the second set of channels 2252, face oppositely to the third set of channels 2258 and the fourth set of channels 2260, respectively. Each of the channels is elongated in the axial direction 28 and has a cross-sectional area along a cross-sectional plane defined by the transverse and lateral directions 40 and 44. The cross-sectional areas of the first set of channels 2250 and the second set of channels 2252 decrease as the first set of channels 2250 and the second set of channels 2252 extend along axial direction 28 from the upstream inlet 2222 toward the downstream outlet 2224. In one embodiment, bend lines 2226 are bent at a sharp pointed angle, as shown in FIG. 22A with respect to the first set of bend lines 2230. In other embodiments, the bend lines are more rounded along a given radius, as shown in FIG. 22B with respect to the second set of bend lines 2232.

The first set of bend lines 2230 includes a first subset of bend lines 2262, a second subset of bend lines 2264, a third subset of bend lines 2266, and a fourth subset of bend lines 2268. The first subset of bend lines 2262, second subset of bend lines 2264, and third subset of bend lines 2266 define the first set of channels 2250. As shown in FIG. 22A, the first set of channels 2250 include a first angled surface 2202, formed by the first subset of bend lines 2262 and the second subset of bend lines 2264, and a second angled surface 2204, formed by the second subset of bend lines 2264 and the third subset of bend lines 2266. In some embodiments, and as shown in FIGS. 23A and 23B, the second angled surface 2204 is steeper (e.g., at a greater angle) than the first angled surface 2202. In other embodiments, the first angled surface 2202 is steeper (e.g., at a greater angle) than the second angled surface 2204.

The second subset of bend lines 2264, the third subset of bend lines 2266, and the fourth subset of bend lines 2268 define the second set of channels 2252. As shown in FIG. 22A, the second set of channels 2252 include the first angled surface 2202 and the second angled surface 2204 mirrored about the central axis (e.g., in the transverse direction 40) of the channel in the second set of channels 2252. The third subset of bend lines 2266 defines an upper channel 2256 in the second set of channels 2252. In some embodiments, and as shown in FIGS. 23A and 23B, the second angled surface 2204 is steeper (e.g., at a greater angle) than the first angled surface 2202. In other embodiments, the first angled surface 2202 is steeper (e.g., at a greater angle) than the second angled surface 2204.

The second subset of bend lines 2264, the third subset of bend lines 2266, and the fourth subset of bend lines 2268 taper in transverse direction 40 as they extend from the upstream inlet 2222 axially towards the downstream outlet 2224. The second set of channels 2252 have a decreasing transverse channel height along transverse direction 40 as the second set of channels 2252 extend axially along axial direction 28 towards the downstream outlet 2224. The tapering of the second subset of bend lines 2264 in the transverse direction 40 provides the decreasing transverse channel height of the second set of channels 2252. The second subset of bend lines 2264, the third subset of bend lines 2266, and the fourth subset of bend lines 2268 taper to respective termination points 2272, providing at such termination points the minimum transverse channel height of the second set of channels 2252. As shown in FIG. 22A, the taper of the third subset of bend lines 2266 is greater (e.g., slopes downward at a steeper angle) than the taper of the second subset of bend lines 2264 and fourth subset of bend line 2268, which include similar tapering. The termination points 2272 are axially downstream of termination points 2274. The termination points 2272 are at the downstream outlet 2224 in one embodiment, and in other embodiments are axially upstream of the downstream outlet 2224.

The second set of bend lines 2232 includes a fifth subset of bend lines 2292, a sixth subset of bend lines 2294, a seventh subset of bend lines 2296, and an eighth subset of bend lines 2298. The fifth subset of bend lines 2292, sixth subset of bend lines 2294, and seventh subset of bend lines 2296 define the third set of channels 2258. As shown in FIG. 22B, the third set of channels 2258 include a third angled surface 2206, formed by the fifth subset of bend lines 2292 and the sixth subset of bend lines 2294, and a fourth angled surface 2208, formed by the sixth subset of bend lines 2294 and the seventh subset of bend lines 2296. In some embodiments, and as shown in FIGS. 23A and 23B, the third angled surface 2206 is steeper (e.g., at a greater angle) than the fourth angled surface 2208. In other embodiments, the fourth angled surface 2208 is steeper (e.g., at a greater angle) than the third angled surface 2206.

The sixth subset of bend lines 2294, seventh subset of bend lines 2296, and eighth subset of bend lines 2298 define the fourth set of channels 2260. As shown in FIG. 22B, the fourth set of channels 2260 includes the third angled surface 2206 and the fourth angled surface 2208 mirrored about the central axis (e.g., in the transverse direction 40) of the channel in the fourth set of channels 2260. In some embodiments, and as shown in FIGS. 23A and 23B, the third angled surface 2206 is steeper (e.g., at a greater angle) than the fourth angled surface 2208. In other embodiments, the fourth angled surface 2208 is steeper (e.g., at a greater angle) than the third angled surface 2206.

The sixth subset of bend lines 2294, the seventh subset of bend lines 2296, and the eighth subset of bend lines 2298 taper in transverse direction 40 as they extend from the downstream outlet 2224 axially towards the upstream inlet 2222. The fourth set of channels 2260 have a decreasing transverse channel height along transverse direction 40 as the fourth set of channels 2260 extend axially along axial direction 28 towards the upstream inlet 2222. The tapering of the sixth subset of bend lines 2294 in the transverse direction 40 provides the decreasing transverse channel height of the fourth set of channels 2260. The sixth subset of bend lines 2294, the seventh subset of bend lines 2296, and the eighth subset of bend lines 2298 taper to respective termination points 2274, providing at such termination points the minimum transverse channel height of the fourth set of channels 2260. As shown in FIG. 22B, the taper of the seventh subset of bend lines 2296 is greater (e.g., slopes downward at a steeper angle) than the taper of the sixth subset of bend lines 2294 and eighth subset of bend line 2298, which include similar tapering. The termination points 2274 are axially upstream of termination points 2272. The termination points 2274 are at the downstream outlet 2224 in one embodiment, and in other embodiments are axially upstream of the downstream outlet 2224. In some embodiments, the termination points 2272 being axially downstream of termination points 2274 provides axially overlapping sections. In those embodiments, the lateral cross-flow is provided at least at axially overlapping sections 2270. In some embodiments, the axially overlapping sections 2270 of the filter media 2220 are longer, resulting in more cross-flow, than the overlapping sections of other filter media, for example, the overlapping sections 70 of the filter media form 20.

Incoming dirty fluid 2280 to be filtered flows along axial direction 28 into open channels 2250 at the upstream inlet 2222 and passes laterally and/or transversely through the filter media wall segments of the formed filter media 2220 and then flows axially along axial direction 28 as clean filtered fluid 2290 through open channels 2260 at the downstream outlet 2224. The third subset of bend lines 2266 provides lateral cross-flow thereacross along lateral direction 44 between respective channels downstream of the upstream inlet 2222. In some embodiments, the second subset of bend lines 2264 and/or the fourth subset of bend lines 2268 provides lateral cross-flow with the third subset of bend lines 2266 thereacross along lateral direction 44 between respective channels downstream of the upstream inlet 2222.

The seventh subset of bend lines 2296 provides lateral cross-flow thereacross along lateral direction 44 between respective channels upstream of the downstream outlet 2224. In some embodiments, the sixth subset of bend lines 2294 and/or the eighth subset of bend lines 2298 provides lateral cross-flow with the seventh subset of bend lines 2296 thereacross along lateral direction 44 between respective channels upstream of the downstream outlet 2224. The third subset of bend lines 2266 and the seventh subset of bend lines 2296 may have axially overlapping sections, and the noted lateral cross-flow is provided at least at axially overlapping sections. In some embodiments, the flow is reversed through the filter media 2220 such that incoming dirty fluid 2280 to be filtered flows along axial direction 28 into open channels 2260 and passes laterally and/or transversely through the filter media wall segments of the formed filter media 2220 and then flows axially along axial direction 28 as clean filtered fluid 2290 through open channels 2250.

In some embodiments, the first set of wall segments 2246 are alternately sealed to each other with an adhesive at the upstream inlet 2222 define a first set of polyhedron channels 2250 having open upstream ends, and a second set of polyhedron channels 2252 interdigitated with the first set of polyhedron channels 2250 and having closed upstream ends. The second set of wall segments 2254 are alternately sealed to each other with an adhesive at the downstream outlet 2224 define a third set of polyhedron channels 2258 having closed downstream outlets, and a fourth set of polyhedron channels 2260 interdigitated with the third set of polyhedron channels 2258 and having open downstream outlets. The first set of bend lines 2230 includes a first subset of bend lines 2262, a second subset of bend lines 2264, a third subset of bend lines 2266, and a fourth subset of bend lines 2268. The first subset of bend lines 2262, second subset of bend lines 2264, and third subset of bend lines 2266 define the first set of channels 2250. The second subset of bend lines 2264, the third subset of bend lines 2266, and the fourth subset of bend lines 2268 taper in transverse direction 40 as they extend from the upstream inlet 2222 axially towards the downstream outlet 2224. The second set of channels 2252 have a decreasing transverse channel height along transverse direction 40 as the second set of channels 2252 extend axially along axial direction 28 towards the downstream outlet 2224.

The filter media 2220 is further provided with a substantially flat sheet 2284 extending laterally across the bend lines. In one embodiment, the sheet is formed of filter media material, which may be the same filter media material as the formed filter element including wall segments 2234. The sheet 2284 extends axially along the full axial length along axial direction 28 between the upstream inlet and the downstream outlet 2224, and extends laterally along the full lateral width along lateral direction 44 across and sealing the channels to prevent bypass of dirty upstream air to clean downstream air without passing through and being filtered by a wall segment 2234. In one embodiment, the sheet 2284 is rectiplanar along a plane defined by axial direction 28 and lateral direction 44. In another embodiment, sheet 2284 is slightly corrugated. In one implementation, the sheet 2284 is rolled with the filter media 2220 into a closed loop, and in various embodiments the closed loop has a shape selected from the group of circular, such as in FIG. 12, racetrack (two curved ends joined by two straight or substantially straight portions), such as in FIG. 13, oval, oblong, and other closed-loop shapes. In other embodiments, a plurality of formed filter media layers and sheets are stacked upon each other in a stacked panel arrangement, such as in FIGS. 14-16. Spacer strips or embossments such as 88 may be used as needed for spacing and support between stacked elements.

Turning to FIGS. 23A and 23B, a filter media 2320, which can be used as the filter media pack 110 of the filter element 100, is shown. The filter media 2320 is similar to the filter media 2220 of FIGS. 22A and 22B. A difference between the filter media 2320 and the filter media 2220 is the filter media 2320 is more compact, extending along the axial direction 28 at a distance less than the filter media 2220. Accordingly, like numbering is used to designate like parts between the filter media 2320 and the filter media 2220. Generally, the implementation of a five-sided channel 2236—or similarly approximated curved cross-section—reduces blind-off area compared to a three-sided channel 36. In some embodiments, the reduction of blind-off is a result of reducing the contact area between the formed sheet (e.g., wall segments 2234) and the flat sheet media 2284, thereby reducing the initial pressure drop at the upstream inlet 2222 and increasing the dust loading of the filter media 2220. In some embodiments, the reduced initial pressure drop is a result of the larger flow area of the polyhedron channels (e.g., the fourth set of polyhedron channels 2260) compared to the sealed polyhedron channels (e.g., the second set of polyhedron channel 2252). The filter media 2220 is configured to implement volume asymmetry.

In some embodiments, the filter media may include two corrugated layers in place of having a formed layer and a flat layer of filter media. Having a first set of wall segments stacked upon a second set of wall segments allows for the filter media to be more effectively packaged within a given volume, reduces the amount of media masking, and allows for improved air flow within the filter media pack, compared to formed and flat layer filter media, such as the filter media form 20 of FIG. 6.

Turning to FIGS. 24A-24C, a filter media pack 2400 that includes multiple straight corrugated filter media layers 2420 is shown. The filter media 2400 is similar to the filter media form 20 of FIGS. 5-19. A difference between the filter media 2400 and the filter media form 20 is the filter media 2400 includes multiple straight corrugated filter media layers and does not include a flat layer of filter media, such as the substantially flat sheet 84 extending laterally across the bend lines of the filter media form 20. Accordingly, like numbering is used to designate like parts between the filter media pack 2400 and the filter media form 20.

Referring to FIG. 24A, the filter media pack 2400 includes a pair of straight corrugated filter media layers positioned on top one another. Specifically, the filter media pack 2400 includes a first straight corrugated filter media layer 2420 positioned above and aligned with a second straight corrugated filter media layer 2421. While the first straight corrugated filter media layer 2420 is shown as being identical to the second straight corrugated filter media layer 2421, in some embodiments the first straight corrugated filter media layer 2420 is different from the second straight corrugated filter media layer 2421. In some embodiments, the first straight corrugated filter media layer 2420 is offset (e.g., not aligned with) the second straight corrugated filter media layer 2421. A first spacer 2492 is positioned between the first straight corrugated filter media layer 2420 and the second straight corrugated filter media layer 2421 near the upstream inlet 2422. In some embodiments, a third spacer is positioned between the first straight corrugated filter media layer 2420 and the second straight corrugated filter media layer 2421 near the downstream outlet 2424. In one embodiment, the first spacer 2492 is formed of filter media material, which may be the same filter media material as the formed filter element including wall segments 2434. The first spacer 2492 may extend laterally along the full lateral length along lateral direction 44. The first spacer 2492 are configured to impede nesting of the filter media pack 2400 and/or the first straight corrugated filter media layer 2420 and the second straight corrugated filter media layer 2421.

As shown in FIGS. 24B and 24C, the straight corrugated filter media layer 2420 has an upstream inlet 2422 receiving incoming dirty fluid as shown at arrows 2480, and has a downstream outlet 2424 discharging clean filtered fluid as shown at arrows 2490. The filter media layer 2420 is formed along a plurality of bend lines 2426. The bend lines extend axially along an axial direction 28 and include a first set of bend lines 2430 extending from the upstream inlet 2422 axially towards the downstream outlet 2424 and a second set of bend lines 2432 disposed below the first set of bend lines 2430 and extending from the upstream inlet 2422 axially towards the downstream outlet 2424. A second spacer 2494 is disposed between the first set of bend lines 2430 and the second set of bend lines 2432 near the upstream inlet 2422. In some embodiments, a fourth spacer is disposed between the first set of bend lines 2430 and the second set of bend lines 2432 near the downstream outlet 2424. In one embodiment, the second spacer 2494 is formed of filter media material, which may be the same filter media material as the formed filter element including wall segments 2434. The second spacer 2494 may extend laterally along the full lateral length along lateral direction 44. The second spacer 2494 are configured to impede nesting of the filter media pack 2400 and/or the first set of wall segments 2446 and the second set of wall segments 2454. In some embodiments, the second spacer 2494 are tacked to the peaks of the first subset of bend lines 2462 and the third subset of bend lines 2466.

The filter media layer 2420 has a plurality of filter media wall segments 2434 extending in a substantially straight manner between the bend lines 2426. The wall segments 2434 extend axially and define axial flow channels 2436 therebetween. The channels 2436 have a height along a transverse direction 40, which transverse direction 40 is substantially perpendicular to axial direction 28. The channels 2436 have a lateral width along a lateral direction 44, which lateral direction 44 is substantially perpendicular to axial direction 28 and substantially perpendicular to transverse direction 40. At least some of the noted bend lines taper in the noted transverse direction as they extend axially in the noted axial direction, to be described. In particular embodiments, the filter media layer 2420 may comprise tetrahedral filter media defined by a plurality of tetrahedron channels or similar filter media defined by a plurality of channels, as described in U.S. Pat. No. 8,397,920.

The wall segments 2434 include a first set of wall segments 2446 that may be alternately sealed to each other at the upstream inlet 2422—for example, by an adhesive or the like—to define a first set of channels 2450 having open upstream ends, and a second set of channels 2452 interdigitated with the first set of channels 2450 and having closed upstream ends. The wall segments 2434 include a second set of wall segments 2454 alternately sealed to each other at the downstream outlet 2424—for example, by an adhesive or the like—to define a third set of channels 2458 having closed downstream outlets, and a fourth set of channels 2460 interdigitated with the third set of channels 2458 and having open downstream outlets. As shown in FIG. 24A, the third set of channels 2458 of the second set of wall segments 2454 are disposed below, and aligned with, the first set of channels 2450 of the first set of wall segments 2446. Additionally, the fourth set of channels 2460 of the second set of wall segments 2454 are disposed below, and aligned with, the second set of channels 2452 of the first set of wall segments 2446. As shown in FIG. 24C, the fourth set of channels 2460 and the second set of channels 2452 form a substantially square combined channel.

The first set of bend lines 2430 includes a first subset of bend lines 2462 defining the first set of channels 2450, and a second subset of bend lines 2464 defining the second set of channels 2452. The second subset of bend lines 2464 do not taper in transverse direction 40 and are substantially straight as they extend from the upstream inlet 2422 axially towards the downstream outlet 2424. The second set of bend lines 2432 includes a third subset of bend lines 2466 defining the third set of channels 2458 and a fourth subset of bend lines 2468 defining the fourth set of channels 2460. The fourth subset of bend lines 2468 do not taper in transverse direction 40 and are substantially straight in the transverse direction 40 as they extend from the upstream inlet 2422 axially towards the downstream outlet 2424. The second set of channels 2452 have a substantially consistent transverse channel height along transverse direction 40 as the second set of channels 2452 extend axially along axial direction 28 towards the downstream outlet 2424. The fourth set of channels 2460 have a substantially consistent transverse channel height along transverse direction 40 as the fourth set of channels 2460 extend axially along axial direction 28 towards the downstream outlet 2424.

In some embodiments, the first set of wall segments 2446 are alternately sealed to each other with an adhesive at the upstream inlet 2422 and the downstream outlet 2424 to define a first set of tetrahedron channels 2450 having open ends and a second set of tetrahedron channels 2452 interdigitated with the first set of tetrahedron channels 2450 and having closed ends. The second set of wall segments 2454 are alternately sealed to each other with an adhesive at the upstream inlet 2422 and the downstream outlet 2424 to define a third set of tetrahedron channels 2458 having closed ends and a fourth set of tetrahedron channels 2460 interdigitated with the third set of tetrahedron channels 2458 and having open ends.

Turning to FIGS. 25A-25C, a filter media pack 2500 that includes angled corrugated filter media layers 2520 is shown. The filter media 2500 is similar to the filter media 2400 of FIGS. 24A-24C. A difference between the filter media 2500 and the filter media 2400 is the filter media 2500 includes angled corrugated filter media layers. Accordingly, like numbering is used to designate like parts between the filter media pack 2500 and the filter media 2400.

Referring to FIG. 25A, the filter media pack 2500 includes a pair of angled corrugated filter media layers positioned on top one another. Specifically, the filter media pack 2500 includes a first angled corrugated filter media layer 2520 positioned above and aligned at the edge with a second angled corrugated filter media layer 2521. While the first angled corrugated filter media layer 2520 is shown as being aligned with to the second angled corrugated filter media layer 2521, in some embodiments, the first angled corrugated filter media layer 2520 is offset (e.g., not aligned with) the second angled corrugated filter media layer 2521.

As shown in FIGS. 25B and 25C, the angled corrugated filter media layer 2520 has an upstream inlet 2522 receiving incoming dirty fluid as shown at arrows 2580, and has a downstream outlet 2524 discharging clean filtered fluid as shown at arrows 2590. The filter media layer 2520 is formed along a plurality of bend lines 2526. The bend lines extend axially along an axial direction 28 and include a first set of bend lines 2530 extending from the upstream inlet 2522 axially towards the downstream outlet 2524 and a second set of bend lines 2532 disposed below the first set of bend lines 2530 and extending from the upstream inlet 2522 axially towards the downstream outlet 2524.

The filter media layer 2520 has a plurality of filter media wall segments 2534 extending in a substantially angled manner between the bend lines 2526. The wall segments 2534 extend substantially axially and define axial flow channels 2536 therebetween. The channels 2536 have a height along a transverse direction 40, which transverse direction 40 is substantially perpendicular to axial direction 28. The channels 2536 have a lateral width along a lateral direction 44, which lateral direction 44 is substantially perpendicular to axial direction 28 and substantially perpendicular to transverse direction 40. The channels 2536 are angled along a first diagonal direction 2570. In particular embodiments, the filter media layer 2520 may comprise tetrahedral filter media defined by a plurality of tetrahedron channels or similar filter media defined by a plurality of channels, as described in U.S. Pat. No. 8,397,920.

The wall segments 2534 include a first set of wall segments 2546 that are angled about the axial direction 28. In some embodiments, the first wall segments 2546 are angled with respect to, and opposite of, a second set of wall segments 2554 that are disposed below the first set of wall segments 2546 in the transverse direction 40. As shown in FIG. 25B, the first set of wall segments 2546 are angled along a second diagonal direction 2572. The first set of wall segments 2546 may be alternately sealed to each other at the upstream inlet 2522—for example, by an adhesive or the like—to define a first set of channels 2550 having open upstream ends, and a second set of channels 2552 interdigitated with the first set of channels 2550 and having closed upstream ends. The wall segments 2534 include a second set of wall segments 2554 that are angled about the first diagonal direction 2570. In some embodiments, the second set of wall segments 2554 are angled with respect to the first set of wall segments 2546 that are substantially straight and disposed above the second set of wall segments 2554 in the transverse direction 40. The second set of wall segments 2554 may be alternately sealed to each other at the downstream outlet 2524—for example, by an adhesive or the like—to define a third set of channels 2558 having closed downstream outlets, and a fourth set of channels 2560 interdigitated with the third set of channels 2558 and having open downstream outlets. As shown in FIG. 25A, the third set of channels 2558 of the second set of wall segments 2554 are disposed below, and aligned with, the first set of channels 2550 of the first set of wall segments 2546. Additionally, the fourth set of channels 2560 of the second set of wall segments 2554 are disposed below, and aligned with, the second set of channels 2552 of the first set of wall segments 2546. As shown in FIG. 25C, the fourth set of channels 2560 and the second set of channels 2552 form a substantially square combined channel.

The first set of bend lines 2530 includes a first subset of bend lines 2562 defining the first set of channels 2550, and a second subset of bend lines 2564 defining the second set of channels 2552. The second subset of bend lines 2564 do not taper in transverse direction 40 and, as shown in FIG. 25B, are angled along the second diagonal direction 2572 as they extend from the upstream inlet 2522 axially towards the downstream outlet 2524. The second set of bend lines 2532 includes a third subset of bend lines 2566 defining the third set of channels 2558, and a fourth subset of bend lines 2568 defining the fourth set of channels 2560. The fourth subset of bend lines 2568 do not taper in transverse direction 40 and, as shown in FIG. 25B, are angled along the first diagonal direction 2570 in the transverse direction 40 as they extend from the upstream inlet 2522 axially towards the downstream outlet 2524. The second set of channels 2552 have a substantially consistent transverse channel height along transverse direction 40 as the second set of channels 2552 extend axially along axial direction 28 towards the downstream outlet 2524. The fourth set of channels 2560 have a substantially consistent transverse channel height along transverse direction 40 as the fourth set of channels 2560 extend axially along axial direction 28 towards the downstream outlet 2524.

In some embodiments, the first set of wall segments 2546 are alternately sealed to each other with an adhesive at the upstream inlet 2522 and the downstream outlet 2524 to define a first set of tetrahedron channels 2550 having open ends and a second set of tetrahedron channels 2552 interdigitated with the first set of tetrahedron channels 2550 and having closed ends. The second set of wall segments 2554 are alternately sealed to each other with an adhesive at the upstream inlet 2522 and the downstream outlet 2524 to define a third set of tetrahedron channels 2558 having closed ends and a fourth set of tetrahedron channels 2560 interdigitated with the third set of tetrahedron channels 2558 and having open ends.

Turning to FIGS. 26A-26B, a filter media pack 2600 that includes v-shaped corrugated filter media layers 2620 is shown. The filter media 2600 is similar to the filter media 2500 of FIGS. 25A-25C. A difference between the filter media 2600 and the filter media 2500 is the filter media 2600 includes v-shaped corrugated filter media layers. Accordingly, like numbering is used to designate like parts between the filter media pack 2600 and the filter media 2500.

Referring to FIG. 26A, the filter media pack 2600 includes a pair of v-shaped corrugated filter media layers positioned on top of one another. Specifically, the filter media pack 2600 includes a first v-shaped corrugated filter media layer 2620 positioned above and aligned at the edge with a second v-shaped corrugated filter media layer 2621. While the first v-shaped corrugated filter media layer 2620 is shown as being aligned with to the second v-shaped corrugated filter media layer 2621, in some embodiments, the first v-shaped corrugated filter media layer 2620 is offset (e.g., not aligned with) the second v-shaped corrugated filter media layer 2621. The term "v-shaped" refers to the "v" shape that an angled bend line forms when the bend line pivots along a neutral axis 2602 to be angled in the opposite direction, thereby forming a "v" with the base of the "v" being positioned along the neutral axis.

As shown in FIG. 26B, the v-shaped corrugated filter media layer 2620 has an upstream inlet 2622 receiving incoming dirty fluid as shown at arrows 2680, and has a downstream outlet 2624 discharging clean filtered fluid as shown at arrows 2690. The filter media layer 2620 is formed along a plurality of bend lines 2626. The plurality of bend lines 2626 extend along a first diagonal direction 2670 or a second diagonal direction 2672 from the upstream inlet 2622 toward the neutral axis 2602 and then extend along the second diagonal direction 2672 or first diagonal direction 2670, respectively, from the neutral axis 2602 toward the downstream outlet 2624. The plurality of bend lines 2626 include a first set of bend lines 2630 extending from the upstream inlet 2622 axially towards the downstream outlet 2624 and a second set of bend lines 2632 disposed below the first set of bend lines 2630 and extending from the upstream inlet 2622 axially towards the downstream outlet 2624. As shown in FIG. 26B, the first set of bend lines 2630 extend in the axial direction 28 along the second diagonal direction 2672 from the upstream inlet 2622 toward the neutral axis 2602 and extend in the axial direction 28 along the first diagonal direction 2670 from the neutral axis 2602 toward the downstream outlet 2624. Conversely, the second set of bend lines 2632 extend in the axial direction 28 along the first diagonal direction 2670 from the upstream inlet 2622 toward the neutral axis 2602 and extend in the axial direction 28 along the second diagonal direction 2672 from the neutral axis 2602 toward the downstream outlet 2624.

The filter media layer 2620 has a plurality of filter media wall segments 2634 extending in a substantially angled manner between the bend lines 2626 along either the first diagonal direction 2670 or the second diagonal direction 2672 between the upstream inlet 2622 toward the neutral axis 2602 and then along the second diagonal direction 2672 or first diagonal direction 2670, respectively, between the neutral axis 2602 and the downstream outlet 2624. The wall segments 2634 define axial flow channels 2636 therebetween. The channels 2636 have a height along a transverse direction 40, which transverse direction 40 is substantially perpendicular to axial direction 28. The channels 2636 have a lateral width along a lateral direction 44, which lateral direction 44 is substantially perpendicular to axial direction 28 and substantially perpendicular to transverse direction 40. The channels 2636 are angled along the first diagonal direction 2670 or the second diagonal direction 2672 between the upstream inlet 2622 toward the neutral axis 2602 and then along the second diagonal direction 2672 or first diagonal direction 2670, respectively, between the neutral axis 2602 and the downstream outlet 2624. In particular embodiments, the filter media layer 2620 may comprise tetrahedral filter media defined by a plurality of tetrahedron channels or similar filter media defined by a plurality of channels, as described in U.S. Pat. No. 8,397,920.

The wall segments 2634 include a first set of wall segments 2646 that extend in the axial direction 28 along the second diagonal direction 2672 from the upstream inlet 2622 toward the neutral axis 2602 and extend in the axial direction 28 along the first diagonal direction 2670 from the neutral axis 2602 toward the downstream outlet 2624. In some embodiments, the first wall segments 2646 are angled with respect to, and opposite of, a second set of wall segments 2654 that are disposed below the first set of wall segments 2646 in the transverse direction 40. The first set of wall segments 2646 may be alternately sealed to each other at the upstream inlet 2622—for example, by an adhesive or the like—to define a first set of channels 2650 having open upstream ends, and a second set of channels 2652 interdigitated with the first set of channels 2650 and having closed upstream ends. The wall segments 2634 include a second set of wall segments 2654 that extend in the axial direction 28 along the first diagonal direction 2670 from the upstream inlet 2622 toward the neutral axis 2602 and extend in the axial direction 28 along the second diagonal direction 2672 from the neutral axis 2602 toward the downstream outlet 2624. In some embodiments, the second set of wall segments 2654 are angled with respect to the first set of wall segments 2646 that are substantially straight and disposed above the second set of wall segments 2654 in the transverse direction 40. The second set of wall segments 2654 may be alternately sealed to each other at the downstream outlet 2624—for example, by an adhesive or the like—to define a third set of channels 2658 having closed downstream outlets, and a fourth set of channels 2660 interdigitated with the third set of channels 2658 and having open downstream outlets. As shown in FIG. 26A, the third set of channels 2658 of the second set of wall segments 2654 are disposed below, and aligned with, the first set of channels 2650 of the first set of wall segments 2646. Additionally, the fourth set of channels 2660 of the second set of wall segments 2654 are disposed below, and aligned with, the second set of channels 2652 of the first set of wall segments 2646. As shown in FIG. 26A, the fourth set of channels 2660 and the second set of channels 2652 form a substantially square combined channel.

The first set of bend lines 2630 includes a first subset of bend lines 2662 defining the first set of channels 2650, and a second subset of bend lines 2664 defining the second set of channels 2652. The first subset of bend lines 2662 extend in the axial direction 28 along the second diagonal direction 2672 from the upstream inlet 2622 toward the neutral axis 2602 and extend in the axial direction 28 along the first diagonal direction 2670 from the neutral axis 2602 toward the downstream outlet 2624. Similarly, the second subset of bend lines 2664 do not taper in transverse direction 40 and extend in the axial direction 28 along the second diagonal direction 2672 from the upstream inlet 2622 toward the neutral axis 2602 and extend in the axial direction 28 along the first diagonal direction 2670 from the neutral axis 2602 toward the downstream outlet 2624.

The second set of bend lines 2632 includes a third subset of bend lines 2666 defining the third set of channels 2658 and a fourth subset of bend lines 2668 defining the fourth set of channels 2660. The third subset of bend lines 2666 extend in the axial direction 28 along the first diagonal direction 2670 from the upstream inlet 2622 toward the neutral axis 2602 and extend in the axial direction 28 along the second diagonal direction 2672 from the neutral axis 2602 toward the downstream outlet 2624. The fourth subset of bend lines 2668 do not taper in transverse direction 40 and extend in the axial direction 28 along the first diagonal direction 2670 from the upstream inlet 2622 toward the neutral axis 2602 and extend in the axial direction 28 along the second diagonal direction 2672 from the neutral axis 2602 toward the downstream outlet 2624. The second set of channels 2652 have a substantially consistent transverse channel height along transverse direction 40 as the second set of channels 2652 extend axially along axial direction 28 towards the downstream outlet 2624. The fourth set of channels 2660 have a substantially consistent transverse channel height along transverse direction 40 as the fourth set of channels 2660 extend axially along axial direction 28 towards the downstream outlet 2624.

In some embodiments, the first set of wall segments 2646 are alternately sealed to each other with an adhesive at the upstream inlet 2622 and the downstream outlet 2624 to define a first set of tetrahedron channels 2650 having open ends and a second set of tetrahedron channels 2652 interdigitated with the first set of tetrahedron channels 2650 and having closed ends. The second set of wall segments 2654 are alternately sealed to each other with an adhesive at the upstream inlet 2622 and the downstream outlet 2624 to define a third set of tetrahedron channels 2658 having closed ends and a fourth set of tetrahedron channels 2660 interdigitated with the third set of tetrahedron channels 2658 and having open ends.

FIG. 27 shows an arched straight corrugated filter media layer 2720. The arched straight corrugated filter media layer 2720 is similar to the straight corrugated filter media layer 2420 of FIGS. 24A-24C. A difference between the arched straight corrugated filter media layer 2720 and the straight corrugated filter media layer 2420, is the arched straight corrugated filter media layer 2720 includes an arched (e.g., curved) first set of channels 2750 and third set of channels 2758. Further, a difference between the arched straight corrugated filter media layer 2720 and the straight corrugated filter media layer 2420 is the arched straight corrugated filter media layer 2720 includes an arched (e.g., curved) first subset of bend lines 2762 and third set subset of bend lines 2766. Accordingly, like numbering is used to designate like parts between the arched straight corrugated filter media layer 2720 and the straight corrugated filter media layer 2420.

FIG. 28 shows an arched straight corrugated filter media layer 2820. The arched straight corrugated filter media layer 2820 is similar to the straight corrugated filter media layer 2420 of FIGS. 24A-24C. A difference between the arched straight corrugated filter media layer 2820 and the straight corrugated filter media layer 2420, is the arched straight corrugated filter media layer 2820 includes an arched (e.g., curved) second set of channels 2852 and fourth set of channels 2860. Further, a difference between the arched straight corrugated filter media layer 2820 and the straight corrugated filter media layer 2420, is the arched straight corrugated filter media layer 2820 includes an arched (e.g., curved) second subset of bend lines 2864 and fourth set subset of bend lines 2868. Accordingly, like numbering is used to designate like parts between the arched straight corrugated filter media layer 2820 and the straight corrugated filter media layer 2420.

Turning to FIG. 29, a perspective view of a multiple form filter media layer 2920 is shown, according to an example embodiment. The filter media layer 2920 is similar to the filter media form 20 of FIGS. 5-19. A difference between the filter media layer 2920 and the filter media form 20 is the filter media layer 2920 includes an inverted filter media layer form approximately half way along the axial direction 28 of the filter media layer 2920. Accordingly, like numbering is used to designate like parts between the filter media layer 2920 and the filter media form 20. In some embodiments, the multiple form filter media layer 2920 is configured to provide symmetric upstream and downstream volume, thereby providing greater upstream volume under flow and deflection. Additionally, the multiple form filter media layer 2920 provides increased support of a flat sheet of media along the media depth and can reduce flow restriction by reducing blind-off area.

The filter media layer 2920 has an upstream inlet 2922, a downstream outlet 2924 with a rectangular outlet face, and a neutral axis 3002. Each filter media layer 2920 has an upstream section 3072 and a downstream section 3074 separated by a neutral axis 3002. While the neutral axis 3002 is shown as substantially halfway between the upstream inlet 2922 and the downstream outlet 2924, in some embodiments, the neutral axis 3002 is disposed closer to the upstream inlet 2922 or the downstream outlet 2924. The neutral axis 3002 with respect to the filter media layer 2920 represents the location along the lateral direction 44 where the filter media form 20 of FIG. 6 is split and rotated one-hundred and eighty degrees about the transverse direction 40. As shown in FIGS. 30A-30C, the filter media pack 100 that includes the filter media form 20 is cut along the neutral axis 3002 to form a first section 3050 and a second section 3052. The second section 3052 is rotated about the transverse axis (e.g., transverse direction 40) one-hundred and eighty degrees. In other words, the second section 3052 is flipped 180° from the top to bottom. The second section 3052 is reconnected to the first section 3050 to form the filter media pack 3010 that includes the filter media layer 2920. As shown in FIG. 29, the center section disposed adjacent the neutral axis 3002 has approximately half the height as the end height of the filter media layer 2920. In some embodiments, the second section 3052 is reconnected to the first section 3050 such that the filter media ends are flush. In other embodiments, the second section 3052 is reconnected to the first section 3050 such that the second section 3052 is offset from the first section 3050 in the transverse direction 40 and/or lateral direction 44. In those embodiments, and as shown in FIGS. 31A and 31B, a filter media layer 3120 may be reconnected such that the center section 3102 is approximately the same height as the end height of the filter media layer 3120. The filter media layer 3120 provides contact points to a flat sheet that is disposed above the filter media layer 3120 along the first set of contact lines 3122 and contact points to a flat sheet that is disposed below the filter media layer 3120 along the second set of contact lines 3124.

The filter media layer 2920 has an upstream inlet 2922 receiving incoming dirty fluid as shown at arrow 2980, and has a downstream outlet 2924 discharging clean filtered fluid as shown at arrow 2990. The filter media layer 2920 is formed along a plurality of bend lines 2926. The bend lines extend axially along an axial direction 28 and include a first set of bend lines 2930 extending from the upstream inlet 2922 towards the downstream outlet 2924 and a second set of bend lines 2932 extending from the downstream outlet 2924 axially towards the upstream inlet 2922. The filter media layer 2920 has a plurality of filter media wall segments 2934 extending in serpentine manner between the bend lines 2926. The wall segments 2934 extend axially and define axial flow channels 2936 therebetween, with a center section 2970 having a multiple form configuration. The channels 36 have a height along a transverse direction 40 and a lateral width along a lateral direction 44.

The wall segments 2934 include a first set of wall segments 2946, which may be alternately sealed to each other at the upstream inlet 2922 by adhesive or the like, to define a first set of channels 2950 having open upstream ends. A second set of channels 2952 are interdigitated with the first set of channels 2950 and having closed upstream ends. The wall segments 2934 include a second set of wall segments 2954, which may alternately sealed to each other at the downstream outlet 2924 by adhesive or the like, to define a third set of channels 2958 having closed downstream outlets. A fourth set of channels 2960 are interdigitated with the third set of channels 2958 and having open downstream outlets. The first set of bend lines 2930 includes a first subset of bend lines 2962 defining the first set of channels 2950 and a second subset of bend lines 2964 defining the second set of channels 2952. The second subset of bend lines 2964 taper in transverse direction 40 as they extend from the upstream inlet 2922 axially towards the neutral axis 3002 and, in some embodiments, as they extend axially towards the downstream outlet 2924. The first subset of bend lines 2962 taper in transverse direction 40 as they extend from the upstream inlet 2922 axially towards the neutral axis 3002 and, in some embodiments, as they extend axially towards the downstream outlet 2924. The second set of channels 2952 have a decreasing transverse channel height along transverse direction 40 as the second set of channels 2952 extend axially along axial direction 28 towards the neutral axis 3002. The tapering of the second subset of bend lines 2964 in the transverse direction 40 provides the decreasing transverse channel height of the second set of channels 2952.

The second set of bend lines 2932 includes a third subset of bend lines 2966 defining the third set of channels 2958 and a fourth subset of bend lines 2968 defining the fourth set of channels 2960. The fourth subset of bend lines 2968 taper in the transverse direction 40 as they extend from the downstream outlet 2924 axially towards the neutral axis 3002 and, in some embodiments, as they extend axially towards the upstream inlet 2922. The third subset of bend lines 2966 taper in the transverse direction 40 as they extend from the downstream outlet 2924 axially towards the neutral axis 3002 and, in some embodiments, as they extend axially towards the upstream inlet 2922. The fourth set of channels 2960 have a decreasing transverse channel height along transverse direction 40 as the fourth set of channels 2960 extend axially along axial direction 28 towards the upstream inlet 2922. The tapering of the fourth subset of bend lines 2968 in the transverse direction 40 provides the decreasing transverse channel height of the fourth set of channels 2960.

In some embodiments, the first subset of bend lines 2962 taper upward in the transverse direction 40 as the first subset of bend lines 2962 extend axially in the axial direction 28 from the upstream inlet 2922 toward the neutral axis 3002 (e.g., the upstream section 3072). The first subset of bend lines 2962 are substantially straight (e.g., minimal taper in the transverse direction 40) while the first subset of bend lines 2962 extend from the neutral axis 3002 toward the downstream outlet 2924 (e.g., downstream section 3074). The second subset of bend lines 2964 taper downward in the transverse direction 40 as the second subset of bend lines 2964 extend axially in the axial direction 28 from the upstream inlet 2922 toward the neutral axis 3002 (e.g., the upstream section 3072). The second subset of bend lines 2964 are substantially straight (e.g., minimal taper in the transverse direction 40) while the second subset of bend lines 2964 extend from the neutral axis 3002 toward the downstream outlet 2924 (e.g., downstream section 3074). Conversely, the third subset of bend lines 2966 taper downward in the transverse direction 40 as the third subset of bend lines 2966 extend axially in the axial direction 28 from the downstream outlet 2924 toward the neutral axis 3002 (e.g., the downstream section 3074). The third subset of bend lines 2966 are substantially straight (e.g., minimal taper in the transverse direction 40) while the third subset of bend lines 2966 extend from the neutral axis 3002 toward the upstream inlet 2622 (e.g., upstream section 3072). The fourth subset of bend lines 2968 taper upward in the transverse direction 40 as the fourth subset of bend lines 2968 extend axially in the axial direction 28 from the downstream outlet 2924 toward the neutral axis 3002 (e.g., the downstream section 3074). The fourth subset of bend lines 2968 are substantially straight (e.g., minimal taper in the transverse direction 40) while the fourth subset of bend lines 2968 extend from the neutral axis 3002 toward the upstream inlet 2622 (e.g., upstream section 3072).

In some embodiments, incoming dirty fluid 2980 to be filtered flows along axial direction 28 into open channels 2950 at the upstream inlet 2922 and passes laterally and/or transversely through the filter media wall segments of the formed filter media layer 2920 and then flows axially along axial direction 28 as clean filtered fluid 2990 through open channels 2960 at the downstream outlet 2924. Second subset of bend lines 2964 provides lateral cross-flow thereacross along lateral direction 44 between respective channels downstream of the upstream inlet 2922. Fourth subset of bend lines 2968 provides lateral cross-flow thereacross along lateral direction 44 between respective channels upstream of the downstream outlet 2924. Second and fourth subsets of bend lines 2964 and 2968 have axially and laterally overlapping sections 2970 (which in some embodiments is the center section), and the noted lateral cross-flow is provided at least at axially and laterally overlapping sections 2970. The overlapping section 2970 form the center section with multiple forms. In some embodiments, the flow is reversed through the filter media layer 2920 such that incoming dirty fluid 2980 to be filtered flows along axial direction 28 into open channels 2960 and passes laterally and/or transversely through the filter media wall segments of the formed filter media layer 2920 and then flows axially along axial direction 28 as clean filtered fluid 2990 through open channels 2950.

The second subset of bend lines 2964 taper to a termination points at the neutral axis 3002, providing at such termination points the minimum transverse channel height of the second set of channels 2952. The fourth subset of bend lines 2968 taper to respective termination points at the neutral axis providing at such termination points the minimum transverse channel height of the fourth set of channels 2960. Termination points of second subset of bend lines 2964 are axially downstream of and laterally space from termination points of fourth subset of bend lines 2968. This provides the noted axially overlapping sections 2970 and the center section.

Turning to FIG. 32, a top view of a flat (e.g., unformed) multiple form filter media layer 3220 is shown, according to an example embodiment. The filter media layer 3220 is similar to the filter media layer 2920 of FIG. 29. A difference between the filter media layer 3220 and the filter media layer 2920 is the filter media layer 3220 offsets an upstream section 3272 from a downstream section 3274 about a neutral axis 3202 to form a plurality of bend lines 3226. Accordingly, like numbering is used to designate like parts between the filter media layer 3220 and the filter media layer 2920. In some embodiments, the multiple form filter media layer 3220 is configured to provide symmetric upstream and downstream volume, thereby providing greater upstream volume under flow and deflection. Additionally, the multiple form filter media layer 3220 provides increased support of a flat sheet of media along the media depth and can reduce flow restriction by reducing blind-off area.

In some embodiments, the filter media layer 3220 is folded such that the upstream section 3272 includes plurality of bend lines 3226 on the upstream end 3272. The plurality of bend lines 3226 on the upstream end 3272 include a first set of bend lines extending from the upstream inlet axially towards the neutral axis 3202 the first set of bend lines first including a subset of bend lines extending from the upstream inlet axially along the axial direction 28 towards a first termination point adjacent the neutral axis 3202 and a second subset of bend lines extending from the upstream inlet axially along the axial direction 28 towards a third termination point along the neutral axis. The second subset of bend lines taper in the transverse direction 40 as the second subset of bend lines extend axially in the axial direction 28. A second set of bend lines extend from the neutral axis 3202 axially towards the upstream inlet. The second set of bend lines include a third subset of bend lines extend from the neutral axis 3202 axially along the axial direction 28 towards a second termination point adjacent the upstream inlet and a fourth subset of bend lines extend from the neutral axis 3202 axially along the axial direction 28 towards the upstream inlet. The fourth subset of bend lines tapering in a transverse direction 40 as the fourth subset of bend lines extend axially in the axial direction 28. A plurality of wall segments extend in a serpentine manner between the plurality of bend lines defining a laterally extending serpentine span. In other words, the serpentine span includes a plurality of repeating spans along the lateral direction 44. Each span in the serpentine span includes a first wall segment, a second wall segment laterally adjacent the first wall segment, a bend line in the second subset of bend lines joining thereto, a third wall segment laterally adjacent the second wall segment, and a fourth wall segment laterally adjacent the third wall segment, a bend line in the fourth subset of bend lines joining thereto. The second channel is interdigitated with the first channel. An external surface of the third wall defines a third channel and an internal surface of the third wall segment and an internal surface of the fourth wall segment define a fourth channel. The fourth channel is interdigitated with the third channel.

Additionally, the filter media layer 3220 is folded such that the downstream section 3274 includes a second plurality of bend lines 3227 on the downstream section 3274. The second plurality of bend lines 3227 on the downstream section 3274 include a third set of bend lines extending from the downstream outlet axially towards the neutral axis. The third set of bend lines includes a fifth subset of bend lines extend from the downstream outlet axially along the axial direction towards a fourth termination point along the neutral axis and a sixth subset of bend lines extending from the downstream outlet axially along the axial direction towards the first termination point. The sixth subset of bend lines taper in a transverse direction 40 as the sixth subset of bend lines extend axially in the axial direction 28. A fourth set of bend lines extend from the downstream outlet axially towards the neutral axis. The fourth set of bend lines include a seventh subset of bend lines extending from the downstream outlet axially along the axial direction 28 towards the third termination point along the neutral axis 3202 and an eighth subset of bend lines extending from the downstream outlet axially along the axial direction 28 towards the second termination point. The eighth subset of bend lines tapering in a transverse direction 40 as the eighth subset of bend lines extend axially in the axial direction 28. A second plurality of wall segments extend in a serpentine manner between the second plurality of bend lines, the second plurality of wall segments extending axially and defining axial channels therebetween, the second plurality of wall segments defining a laterally extending a second serpentine span. As used herein, the term "axial channels" refers to flow paths, flow channels, air flow paths, air flow channels, air flow volume, and similar flow structures. Each span in the second serpentine span includes a fifth wall segment, a sixth wall segment laterally adjacent the fifth wall segment and a bend line in the sixth subset of bend lines joining thereto, a seventh wall segment laterally adjacent the sixth wall segment, and an eighth wall segment laterally adjacent the seventh wall segment, a bend line in the eighth subset of bend lines joining thereto. An internal surface of the fifth wall segment defines a fifth channel, an external surface of the fifth wall segment and an external surface of the sixth wall segment defines a sixth channel, the sixth channel interdigitated with the fifth channel. An internal surface of the seventh wall segment defines a seventh channel and internal surface of the seventh wall segment and an internal surface of the eighth wall segment define an eighth channel. The eighth channel interdigitated with the seventh channel.

In those embodiments, a wall segment in each span of the first serpentine span is connected along the neutral axis to the sixth wall segment in each span of the second serpentine span, the second wall segment in each span of the first serpentine span is connected along the neutral axis to the seventh wall segment in each span of the second serpentine span, and the third wall segment in each span of the first serpentine span is connected along the neutral axis to the eighth wall segment in each span of the second serpentine span. Further, the first channel in each span of the first serpentine span is adjacent along the neutral axis to the sixth channel in each span of the second serpentine span, the second channel in each span of the first serpentine span is adjacent along the neutral axis to the seventh channel in each span of the second serpentine span, and the third channel in each span of the first serpentine span is adjacent along the neutral axis to the eighth channel in each span of the second serpentine span.

Turning to FIG. 33, a top view of a flat (e.g., unformed) multiple form filter media layer 3320 is shown, according to an example embodiment. The filter media layer 3320 is similar to the filter media layer 2920 of FIG. 29. A difference between the filter media layer 3320 and the filter media layer 2920 is the filter media layer 3320 offsets an upstream section 3372 from a downstream section 3374 about a neutral axis 3302 to form a plurality of bend lines 3326. Accordingly, like numbering is used to designate like parts between the filter media layer 3320 and the filter media layer 2920. In some embodiments, the multiple form filter media layer 3320 is configured to provide symmetric upstream and downstream volume, thereby providing greater upstream volume under flow and deflection. Additionally, the multiple form filter media layer 3320 provides increased support of a flat sheet of media along the media depth and can reduce flow restriction by reducing blind-off area.

FIG. 34 depicts a front view of a triangular multiple form filter media layer 3420, according to an example embodiment. The triangular filter media layer 3420 is similar to the filter media layer 3120 of FIG. 31. A difference between the filter media layer 3420 and the filter media layer 3120 is the triangular filter media layer 3420 includes a plurality of bend lines 3426 that are folded—or in some embodiments, pleated—to form triangular wall segments 3434 that form a plurality of channels 3436. Accordingly, like numbering is used to designate like parts between the triangular multiple form triangular filter media layer 3420 and the filter media layer 3120. Incoming dirty fluid 3480 enters the upstream side plurality of channels 3436 to be filtered. In some embodiments, the triangular filter media layer 3420 is configured to provide symmetric upstream and downstream volume, thereby providing greater upstream volume under flow and deflection. Additionally, the triangular filter media layer 3420 provides increased support of a flat sheet of media along the media depth and can reduce flow restriction by reducing blind-off area. In some embodiments, the triangular filter media layer 3420 includes a formed sheet with two-sided support along a majority of the flat media depth while being configured to facilitate cross-flow.

FIG. 35 depicts a front view of a rounded multiple form filter media layer 3520, according to an example embodiment. The rounded filter media layer 3520 is similar to the filter media layer 3420 of FIG. 34. A difference between the filter media layer 3520 and the filter media layer 3420 is the rounded filter media layer 3520 includes a plurality of bend lines 3526 that are folded to form rounded wall segments 3534 that form a plurality of channels 3536. Accordingly, like numbering is used to designate like parts between the rounded multiple form rounded filter media layer 3520 and the filter media layer 3420. Incoming dirty fluid 3580 enters the upstream side plurality of channels 3536 to be filtered. In some embodiments, the rounded filter media layer 3520 is configured to provide symmetric upstream and down-stream volume, thereby providing greater upstream volume under flow and deflection. Additionally, the rounded filter media layer 3520 provides increased support of a flat sheet of media along the media depth and can reduce flow restriction by reducing blind-off area. In some embodiments, the rounded filter media layer 3520 includes a formed sheet with two-sided support along a majority of the flat media depth while being configured to facilitate cross-flow. In some embodiments, the rounded filter media layer may be applied to the inlet, the outlet, or both the inlet and the outlet to increase flow area.

FIG. 36 depicts a front view of a flat-triangle multiple form filter media layer 3620, according to an example embodiment. The flat-triangle filter media layer 3620 is similar to the filter media layer 3420 of FIG. 34. A difference between the filter media layer 3620 and the filter media layer 3420 is the flat-triangle filter media layer 3620 includes a plurality of bend lines 3626 that are folded to form flat-triangle wall segments 3634 that form a plurality of channels 3636. Accordingly, like numbering is used to designate like parts between the flat-triangle multiple form flat-triangle filter media layer 3620 and the filter media layer 3420. Incoming dirty fluid 3680 enters the upstream side plurality of channels 3636 to be filtered. In some embodiments, the flat-triangle filter media layer 3620 is configured to provide symmetric upstream and downstream volume, thereby providing greater upstream volume under flow and deflection. Additionally, the flat-triangle filter media layer 3620 provides increased support of a flat sheet of media along the media depth and can reduce flow restriction by reducing blind-off area. In some embodiments, the flat-triangle filter media layer 3620 includes a formed sheet with two-sided support along a majority of the flat media depth while being configured to facilitate cross-flow. In some embodiments, the flat-triangle multiple form filter media layer 3620 is implemented in a filter media layer with negative open fin wall segments offset from adjacent positive open fin wall segments of FIG. 47 and/or a filter element that includes a filter media pack having filter media layers with rounded triangular channels as shown in FIG. 48A.

FIG. 37 depicts a front view of a flat-rectangular multiple form filter media layer 3720, according to an example embodiment. The flat-rectangular filter media layer 3720 is similar to the filter media layer 3420 of FIG. 34. A difference between the filter media layer 3720 and the filter media layer 3420, is the flat-rectangular filter media layer 3720 includes a plurality of bend lines 3726 that are folded to form flat-rectangular wall segments 3734 that form a plurality of channels 3736. Accordingly, like numbering is used to designate like parts between the flat-rectangular multiple form flat-rectangular filter media layer 3720 and the filter media layer 3420. Incoming dirty fluid 3780 enters the upstream side plurality of channels 3736 to be filtered. In some embodiments, the flat-rectangular filter media layer 3720 is configured to provide symmetric upstream and downstream volume, thereby providing greater upstream volume under flow and deflection. Additionally, the flat-rectangular filter media layer 3720 provides increased support of a flat sheet of media along the media depth and can reduce flow restriction by reducing blind-off area. In some embodiments, the flat-rectangular filter media layer 3720 includes a formed sheet with two-sided support along a majority of the flat media depth while being configured to facilitate cross-flow. In some embodiments, the flat-rectangular multiple form filter media layer is implemented in a filter media layer of a filter media pack that includes filter media with negative and positive adjacent fin wall segments as shown in FIG. 43A, as a negative and positive adjacent fin wall segments of the filter media layer as shown in FIG. 44A, as a flat filter media sheet with a plurality of bend lines as shown in FIG. 45, and/or a filter media layer with negative fin wall segments offset from adjacent fin wall segments as shown in FIG. 46A.

In some embodiments, the filter media of FIGS. 34-37 includes edge treatments on the ends of the tetrahedral media such that the sealant is molten and close to solidifying. In some embodiments the edges of the media layers may be additionally formed or pressed while the sealant is molten or close to solidifying. The sealant is reduced such that the amount of masking along the edge of the filter media is minimized. In those embodiments, the edge of the filter media 3420 of FIG. 34 is substantially uncompressed but treated with the edge treatment; the edge of the filter media 3520 of FIG. 35 is more compressed than the filter media 3420, the edge of the filter media 3620 of FIG. 36 is more compressed than the filter media 3520; and the edge of the filter media 3720 of FIG. 37 is more compressed than the filter media 3620. As the edge of the filter media is more compressed, the pressure loss as flow enters and exits the filter media is reduced (e.g., restriction is reduced).

Turning to FIGS. 38A-38B, a filter media 3820 which can be used as the filter media pack 110 of the filter element 100 is shown. The filter media 3820 is similar to the filter media form 20 of FIGS. 5-19. A difference between the filter media 3820 and the filter media form 20 is the filter media 3820 includes a repeating rhombus pyramid structure along the axial direction 28 such that the pattern repeats at each repeat axis 3802 to form a plurality of repeating sections 3804. Accordingly, like numbering is used to designate like parts between the filter media 3820 and the filter media form 20. Generally, the repeating pattern reduces blind-off area, supports the media across the axial length and lateral width of the filter media, allows for support upstream and downstream as the media may be two-sided, and allows for rollers to be implemented for many different media widths by utilizing a repeating pattern. In some embodiments, the repeating pattern is asymmetrical. In other embodiments, the repeating pattern is symmetrical.

The filter media 3820 has an upstream inlet 3822 receiving incoming dirty fluid as shown at arrows 3880, and has a downstream outlet 3824 discharging clean filtered fluid as shown at arrows 3890. The filter media 3820 has a rhombus pyramid pattern that repeats at multiple repeat axes 3802 along the axial direction 28. As shown in FIG. 38A, the rhombus pyramid pattern repeats four times. In other embodiments, the rhombus pyramid pattern repeats two times, or as many times as needed for a particular filter depth (rolled in the direction 28). The filter media 3820 is folded (formed) along a plurality of bend lines 3826. The bend lines 3826 extend axially along an axial direction 28 and include a first set of bend lines 3830 extending from the upstream inlet 3822 towards the repeat axis 3802 and a second set of bend lines 3832 extending from the repeat axis 3802 axially towards the upstream inlet 3822. As will be appreciated, the bend lines 3826 extend from repeat axis 3802 toward the next repeat axis 3802 until the final repeated section, which the bend lines 3826 extends from the repeat axis 3802 toward the downstream outlet 3824. The filter media 3820 has a plurality of filter media wall segments 3834 extending in serpentine manner between the bend lines 3826 between the section boundaries (e.g., upstream inlet 3822 to the repeating axis 3802, repeating axis 3802 to the repeating axis 3802, and repeating axis 3802 to the downstream outlet 3824). The wall segments 3834 extend axially and define axial flow channels 3836 therebetween. The channels 3836 have a height along a transverse direction 40 and a lateral width along a lateral direction 44. As shown in FIG. 38, the channels 3836 are wider and shorter than the channels of the filter media form 20 of FIG. 6. At least some of the noted bend lines taper in the noted transverse direction as they extend axially in the noted axial direction, to be described. In particular embodiments, the filter media 3820 may comprise tetrahedral filter media defined by a plurality of tetrahedron channels as described in U.S. Pat. No. 8,397,920.

The wall segments 3834 include a first set of wall segments 3846 that may be alternately sealed to each other at the upstream inlet 3822—for example, by an adhesive or the like—to define a first set of channels 3850 having open upstream ends, and a second set of channels 3852 interdigitated with the first set of channels 3850. The second set of channels 3852 may be closed at the upstream ends. The wall segments 3834 include a second set of wall segments 3854, which may be alternately sealed to each other at the repeating axis 3802 or downstream outlet 3824—for example, by an adhesive or the like—to define a third set of channels 3858 having closed downstream outlets and a fourth set of channels 3860 interdigitated with the third set of channels 3858 and having open downstream outlets. In some embodiments, the second set of wall segments 3854 disposed between the upstream inlet 3822 and a repeating axis 3802 are open to facilitate flow through the filter media 3820 and increase filter capacity along the filter media 3820.

The first set of bend lines 3830 includes a first subset of bend lines 3862 defining the first set of channels 3850, and a second subset of bend lines 3864 defining the second set of channels 3852. The second subset of bend lines 3864 taper in transverse direction 40 as they extend from the upstream inlet 3822 axially towards the repeating axis 3802 (or the downstream outlet 3824 at the last repeating section 3804). The second set of bend lines 3832 includes a third subset of bend lines 3866 defining the third set of channels 3858, and a fourth subset of bend lines 3868 defining the fourth set of channels 3860. The fourth subset of bend lines 3868 taper in the transverse direction 40 as they extend from the repeating axis 3802 (or the downstream outlet 3824 at the last repeating section 3804) axially towards the upstream inlet 3822. The second set of channels 3852 have a decreasing transverse channel height along transverse direction 40 as the second set of channels 3852 extend axially along axial direction 28 towards the repeating axis 3802 (or the downstream outlet 3824 at the last repeating section 3804). The tapering of the second subset of bend lines 3864 in the transverse direction 40 provides the decreasing transverse channel height of the second set of channels 3852. The fourth set of channels 3860 have a decreasing transverse channel height along transverse direction 40 as the fourth set of channels 3860 extend axially along axial direction 28 towards the upstream inlet 3822. The tapering of the fourth subset of bend lines 3868 in the transverse direction 40 provides the decreasing transverse channel height of the fourth set of channels 3860.

The second subset of bend lines 3864 taper to respective termination points 3872, providing at such termination points the minimum transverse channel height of the second set of channels 3852. In some embodiments, the second subset of bend lines 3864 extend along the axial direction 28 towards the respective termination points 3872 and the first subset of bend lines 3862 extend along a diagonal direction (e.g., substantially along the axial direction 28 and angled toward the lateral direction 44) towards the respective termination points 3872. The fourth subset of bend lines 3868 taper to respective termination points 3874 providing at such termination points the minimum transverse channel height of the fourth set of channels 3860. Termination points 3872 of second subset of bend lines 3864 are axially downstream of termination points 3874 of fourth subset of bend lines 3868. The termination points 3872 of second subset of bend lines 3864 are at the repeating axis 3802 (or the downstream outlet 3824 at the last repeating section 3804) in one embodiment, and in other embodiments are axially upstream of the repeating axis 3802 (or the downstream outlet 3824 at the last repeating section 3804). Termination points 3874 of the fourth subset of bend lines 3868 are at the upstream inlet 3822 in one embodiment, and in other embodiments are axially downstream of the upstream inlet 3822. The termination points 3872 of second subset of bend lines 3864 being axially downstream of termination points 3874 of fourth subset of bend lines 3868 provides axially overlapping sections. The noted lateral cross-flow is provided at least at axially overlapping sections. In some embodiments, the axially overlapping sections of the filter media 3820 are longer, resulting in more cross-flow, than the overlapping sections of other filter media, for example, the overlapping sections 70 of the filter media form 20.

Turning to FIGS. 39A-39B, a filter media 3920 which can be used as the filter media form 20 of the filter element 100 is shown. The filter media 3920 is similar to the filter media 3820 of FIGS. 38A&38B. A difference between the filter media 3920 and the filter media 3820 is the filter media 3920 includes a repeating offset rhombus pyramid structure along the axial direction 28 such that the pattern repeats at each repeat axis 3902 to form a plurality of repeating sections 3904. Accordingly, like numbering is used to designate like parts between the filter media 3920 and the filter media 3820. Generally, the repeating pattern reduces any blind-off area, supports the media across the axial length and lateral width of the filter media, allows for support upstream and downstream as the media may be two-sided, and allows for rollers to be implemented to generate a wide variety of different media widths by utilizing a repeating pattern. Incoming dirty fluid 3980 enters the upstream side plurality of channels 3936 to be filtered. In some embodiments, the filter media 3920 is configured to provide symmetric upstream and downstream volume, thereby providing greater upstream volume under flow and deflection. Additionally, the filter media 3920 provides increased support of a flat sheet of media along the media depth and can reduce flow restriction by reducing blind-off area. In some embodiments, the filter media 3920 includes a formed sheet with two-sided support along a majority of the flat media depth while being configured to facilitate cross-flow. The roller 3950 of FIG. 39B, along with a mating roller is fed flat filter media to form the filter media 3920.

Turning to FIG. 40, a filter media pack 4000 that include a plurality of filter media layers 4020 which can be used as the filter media form 20 of the filter element 100 is shown. The filter media 4020 is similar to the filter media 3820. A difference between the filter media 4020 and the filter media 3820 is the filter media 4020 includes a two-sided repeating wave pattern along the axial direction 28 such that the pattern repeats at each repeat axis 4002 to form a plurality of repeating sections 4004. Accordingly, like numbering is used to designate like parts between the filter media 4020 and the filter media 3820. The filter media layer 4020 has the pattern on both sides of the filter media. The two-sided pattern of the filter media layer 4020 may be formed by a roller pair, similar to the roller pairs 4200, 4250 of FIGS. 42A&42B, respectively. The two sided pattern allows for point contact on the up and down stream sides. Generally, the repeating pattern reduces blind-off area, supports the media across the axial length and lateral width of the filter media, allows for support upstream and downstream as the media may be two-sided, and allows for rollers to be implemented to generate a wide variety of different media widths by utilizing a repeating pattern. In some embodiments, the filter media 4020 is configured to provide symmetric upstream and downstream volume, thereby providing greater upstream volume under flow and deflection. Additionally, the filter media 4020 provides increased support of a flat sheet of media along the media depth and can reduce flow restriction by reducing blind-off area. In some embodiments, the filter media 4020 includes a formed sheet with two-sided support along a majority of the flat media depth while being configured to facilitate cross-flow.

Turning to FIG. 41, a filter media pack 4100 that includes a plurality of filter media layers 4120 which can be used as the filter media form 20 of the filter element 100 is shown. The filter media 4120 is similar to the filter media 3820. A difference between the filter media 4120 and the filter media 3820 is the filter media 4120 includes a two-sided repeating dune (e.g., mound) pattern along the axial direction 28 such that the pattern repeats at each repeat axis 4102 to form a plurality of repeating sections 4104. Accordingly, like numbering is used to designate like parts between the filter media 4120 and the filter media 3820. The filter media layer 4120 has the pattern on both sides of the filter media. The two-sided pattern of the filter media layer 4120 may be formed by a roller pair, similar to the roller pairs 4200, 4250 of FIGS. 42A&42B, respectively. The two sided pattern allows for point contact on the up and down stream sides. Generally, the repeating pattern reduces blind-off area, supports the media across the axial length and lateral width of the filter media, allows for support upstream and downstream as the media may be two-sided, and allows for rollers to be implemented. In some embodiments, the filter media 4120 is configured to provide symmetric upstream and downstream volume, thereby providing greater upstream volume under flow and deflection. Additionally, the filter media 4120 provides increased support of a flat sheet of media along the media depth and can reduce flow restriction by reducing blind-off area. In some embodiments, the filter media 4120 includes a formed sheet with two-sided support along a majority of the flat media depth while being configured to facilitate cross-flow.

Turning to FIG. 42A, a filter media roller 4200 that includes a repeating filter media layer pattern 4220 to generate a two-sided filter media layer is shown. A plurality of filter media layers generated by the filter media roller can be used as the filter media form 20 of the filter element 100. The filter media formed by the filter media roller 4200 is similar to the filter media 3820. A difference between the filter media formed by rollers shown in 4220 and the filter media 3820 is the filter media 4220 includes a two-sided repeating pattern along the axial direction 28 such that the pattern repeats at each repeat axis 4202 to form a plurality of repeating sections 4204. Accordingly, like numbering is used to designate like parts between the filter media 4220 and the filter media 3820. The filter media is fed between the pair of filter media rollers 4200 to form the filter media. The filter media formed by the filter media roller 4200 has a pattern on both sides of the filter media thereby allowing points of contact on the up and down stream sides. Generally, the repeating pattern reduces blind-off area, supports the media across the axial length and lateral width of the filter media, allows for support upstream and downstream as the media may be two-sided, and allows for rollers to be implemented. In some embodiments, the filter media 4220 is configured to provide symmetric upstream and downstream volume, thereby providing greater upstream volume under flow and deflection. Additionally, the filter media formed by the filter media roller 4200 provides increased support of a flat sheet of media along the media depth and can reduce flow restriction by reducing blind-off area. In some embodiments, the filter media formed by the filter media roller 4200 includes a formed sheet with two-sided support along a majority of the flat media depth while being configured to facilitate cross-flow.

Turning to FIG. 42B, a filter media roller 4250 that includes a repeating filter media layer pattern 4270 to generate two-sided filter media layer is shown. A plurality of filter media layers generated by the filter media roller can be used as the filter media form 20 of the filter element 100. The filter media formed by the filter media roller 4250 is similar to the filter media 3820. A difference between the filter media 4270 and the filter media 3820 is the filter media 4270 includes a two-sided repeating pattern along the axial direction 28 such that the pattern repeats at each repeat axis 4252 to form a plurality of repeating sections 4254. Accordingly, like numbering is used to designate like parts between the filter media 4270 and the filter media 3820. The filter media is fed between the pair of filter media rollers 4250 to form the filter media. The filter media formed by the filter media roller 4250 has a pattern on both sides of the filter media, thereby allowing points of contact on the up and down stream sides. Generally, the repeating pattern reduces blind-off area, supports the media across the axial length and lateral width of the filter media, allows for support upstream and downstream as the media may be two-sided, and allows for rollers to be implemented. In some embodiments, the filter media 4270 is configured to provide symmetric upstream and downstream volume, thereby providing greater upstream volume under flow and deflection. Additionally, the filter media formed by the filter media roller 4250 provides increased support of a flat sheet of media along the media depth and can reduce flow restriction by reducing blind-off area. In some embodiments, the filter media formed by the filter media roller 4250 includes a formed sheet with two-sided support along a majority of the flat media depth while being configured to facilitate cross-flow.

Turning to FIGS. 43A-43B, a filter media pack having filter media 4310 that includes plurality of filter media layers 4320. The filter media 4310 is similar to the filter media form 20 of FIGS. 5-19. A difference between the filter media 4310 and the filter media form 20 is the filter media 4320 includes a plurality of fin wall segments 4334 that form positive (e.g., ascending along the transverse direction 40) and negative (e.g., descending along the transverse direction 40) fins adjacent one another. Accordingly, like numbering is used to designate like parts between the filter media 4310 and the filter media form 20. Generally, the negative and positive adjacent fin wall segments 4334 reduce inlet and outlet losses thereby reducing restriction across the filter media layer 4320, remove the need for adhesive as stand-offs are made of media, reduce adhesive for sealing the ends of the filter media layer 4320, and beneficial tapering along the depth of the filter media layer 4320, compared to conventional filter media.

The filter media layer 4320 has an upstream inlet 4322 receiving incoming dirty fluid as shown at arrows 4380, and has a downstream outlet 4324 discharging clean filtered fluid as shown at arrows 4390. The filter media layer 4320 has positive fin wall segments 4346 adjacent negative fin wall segments 4354 that extend in opposite directions toward one another along the axial direction. A portion 4400 of a positive fin wall segment 4346 adjacent to the negative fin wall segment 4354 is shown in FIGS. 44A-44C. The filter media layer 4320 is folded along a plurality of bend lines 4326. The bend lines 4326 extend axially along an axial direction 28 and include a first set of bend lines 4330 extending from the upstream inlet 4322 towards the down-stream outlet 4324 and a second set of bend lines 4332 extending from the downstream outlet 4324 axially towards the upstream inlet 4322. The filter media layer 4320 has a plurality of filter media fin wall segments 4334 extending in serpentine manner between the bend lines 4326 between the upstream inlet 4322 and the downstream outlet 4324. The fin wall segments 4334 extend axially and define axial flow channels 4336 therebetween. The channels 4336 have a height along a transverse direction 40 and a lateral width along a lateral direction 44. The channels 4336 are substan-tially rectangular in shape at the outer portions and extend toward a substantially closed termination point 4472 as they extend along the axial direction 28. At least some of the noted bend lines taper in the noted transverse direction as they extend axially in the noted axial direction, to be described.

The fin wall segments 4334 include a first set of fin wall segments 4346 that define a first set of channels 4350 and a second set of channels 4352 interdigitated with the first set of channels 4350. In some embodiments, the second set of channels 4352 are closed and the channels that extend from the upstream inlet 4322 to the downstream outlet 4324 are the first set of channels 4350. The fin wall segments 4334 include a second set of fin wall segments 4354 to define a third set of channels 4358 and a fourth set of channels 4360 interdigitated with the third set of channels 4358. In some embodiments, the fourth set of channels 4360 are closed and the channels that extend from the downstream outlet 4324 toward the upstream inlet 4322 are the third set of channels 4358. As shown in FIG. 43B, the first channel 4350 tapers in the transverse direction 40 until it is substantially closed (e.g., forming a pocket) at the downstream outlet 4324 along the termination line 4472. Similarly, the third channel 4358 tapers in the transverse direction 40 until it is substantially closed (e.g., forming a pocket) at the upstream inlet 4322 along the termination line 4474.

The first set of bend lines 4330 includes a first subset of bend lines 4362 defining the first set of channels 4350 and a second subset of bend lines 4364 defining the second set of channels 4352. The second subset of bend lines 4364 taper in transverse direction 40 as they extend from the upstream inlet 4322 axially towards the downstream outlet 4324. The second set of bend lines 4332 includes a third subset of bend lines 4366 defining the third set of channels 4358, and a fourth subset of bend lines 4368 defining the fourth set of channels 4360. The fourth subset of bend lines 4368 taper in the transverse direction 40 as they extend from the downstream outlet 4324 axially towards the upstream inlet 4322. The second set of channels 4352 have a decreasing transverse channel height along transverse direction 40 as the second set of channels 4352 extend axially along axial direction 28 towards the downstream outlet. The tapering of the second subset of bend lines 4364 in the transverse direction 40 provides the decreasing transverse channel height of the second set of channels 4352. The fourth set of channels 4360 have a decreasing transverse channel height along transverse direction 40 as the fourth set of channels 4360 extend axially along axial direction 28 towards the upstream inlet 4322. The tapering of the fourth subset of bend lines 4368 in the transverse direction 40 provides the decreasing transverse channel height of the fourth set of channels 4360.

The second subset of bend lines 4364 taper to respective termination points 4372, providing at such termination points the minimum transverse channel height of the second set of channels 4352. The fourth subset of bend lines 4368 taper to respective termination points 4374 providing at such termination points the minimum transverse channel height of the fourth set of channels 4360. Termination points 4372 of second subset of bend lines 4364 are axially downstream of termination points 4374 of fourth subset of bend lines 4368. The termination points 4372 of second subset of bend lines 4364 are at the downstream outlet 4324 in one embodi-ment, and in other embodiments are axially upstream of the downstream outlet. Termination points 4374 of fourth subset of bend lines 4368 are at the upstream inlet 4322 in one embodiment, and in other embodiments are axially down-stream of the upstream inlet 4322. In some embodiments, the termination points 4372 of second subset of bend lines 4364 being axially downstream of termination points 4374 of fourth subset of bend lines 4368 provides axially over-lapping sections. The noted lateral cross-flow is provided at least at axially overlapping sections. In some embodiments, the axially overlapping sections of the filter media layer 4320 are longer, resulting in more cross-flow, than the overlapping sections of other filter media, for example, the overlapping sections 70 of the filter media form 20.

FIG. 45 is top perspective view of the flat (e.g., unformed) sheet 4500 that can be folded to form the standoff back-to-back media layer 4320 of FIG. 43A. The sheet 4500 may be folded along the plurality of bend lines 4326 to form the filter media layer 4320.

Turning to FIGS. 46A-46B, a filter media 4620 which can be used as the filter media pack 110 of the filter element 100 is shown. The filter media 4620 is similar to the filter media 4320 of FIGS. 43A-44C. A difference between the filter media 4620 and the filter media 4320 is the filter media 4620 the plurality of fin wall segments 4634 that form positive (e.g., ascending along the transverse direction 4440) and negative (e.g., descending along the transverse direction 4440) fins are offset from one another. Accordingly, like numbering is used to designate like parts between the filter media 4620 and the filter media 4320. Generally, the nega-tive and positive offset fin wall segments 4634 reduce inlet and outlet losses thereby reducing restriction across the filter media 4620, remove the need for adhesive as stand-offs are made of media, reduce adhesive for sealing the ends of the filter media 4620, and beneficial tapering along the depth of the filter media 4620, compared to conventional filter media.

The filter media 4620 has an upstream inlet 4622 receiv-ing incoming dirty fluid as shown at arrows 4680, and has a downstream outlet 4624 discharging clean filtered fluid as shown at arrows 4690. The filter media 4620 has positive fin wall segments 4646 offset from negative fin wall segments 4654 that extend in opposite directions toward one another along the axial direction. The filter media 4620 is folded along a plurality of bend lines 4626. The bend lines 4626 extend axially along an axial direction 28 and include a first set of bend lines 4630 extending from the upstream inlet 4622 towards the downstream outlet 4624 and a second set of bend lines 4632 extending from the downstream outlet 4624 axially towards the upstream inlet 4622. The filter media 4620 has a plurality of filter media fin wall segments 4634 extending in an offset serpentine manner between the bend lines 4626 between the upstream inlet 4622 and the downstream outlet 4624. The fin wall segments 4634 extend axially and define axial flow channels 4636 therebetween. The channels 4636 have a height along a transverse direction 40 and a lateral width along a lateral direction 4544. The channels 4636 are substantially rectangular in shape at the outer portions and extend toward a substantially closed termination point 4572 as they extend along the axial direction 28. At least some of the noted bend lines taper in the noted transverse direction as they extend axially in the noted axial direction, to be described.

The fin wall segments 4634 include a first set of fin wall segments 4646 that define a first set of channels 4650 and a second set of channels 4652 interdigitated with the first set of channels 4650. In some embodiments, the second set of channels 4652 are closed and the channels that extend from the upstream inlet 4622 to the downstream outlet 4624 are the first set of channels 4650. The fin wall segments 4634 include a second set of fin wall segments 4654 to define a third set of channels 4658 and a fourth set of channels 4660 interdigitated with the third set of channels 4658. In some embodiments, the fourth set of channels 4660 are closed and the channels that extend from the downstream outlet 4624 toward the upstream inlet 4622 are the third set of channels 4658. In some embodiments, the first channel 4650 tapers in the transverse direction 40 until it is substantially closed (e.g., forming a pocket) at the downstream outlet 4624 along the termination line 4572. Similarly, the third channel 4658 tapers in the transverse direction 40 until it is substantially closed (e.g., forming a pocket) at the upstream inlet 4622 along the termination line 4574. As shown in FIG. 46A, the second set of fin wall segments 4654 are coplanar 4502 (e.g., the perpendicular bar 4502 shows coplanar relationship).

The first set of bend lines 4630 includes a first subset of bend lines 4662 defining the first set of channels 4650 and a second subset of bend lines 4664 defining the second set of channels 4652. The second subset of bend lines 4664 taper in transverse direction 40 as they extend from the upstream inlet 4622 axially towards the downstream outlet 4624. The second set of bend lines 4632 includes a third subset of bend lines 4666 defining the third set of channels 4658, and a fourth subset of bend lines 4668 defining the fourth set of channels 4660. The fourth subset of bend lines 4668 taper in the transverse direction 40 as they extend from the downstream outlet 4624 axially towards the upstream inlet 4622. The second set of channels 4652 have a decreasing transverse channel height along transverse direction 40 as the second set of channels 4652 extend axially along axial direction 28 towards the downstream outlet. The tapering of the second subset of bend lines 4664 in the transverse direction 40 provides the decreasing transverse channel height of the second set of channels 4652. The fourth set of channels 4660 have a decreasing transverse channel height along transverse direction 40 as the fourth set of channels 4660 extend axially along axial direction 28 towards the upstream inlet 4622. The tapering of the fourth subset of bend lines 4668 in the transverse direction 40 provides the decreasing transverse channel height of the fourth set of channels 4660.

The second subset of bend lines 4664 taper to respective termination points 4672, providing at such termination points the minimum transverse channel height of the second set of channels 4652. The fourth subset of bend lines 4668 taper to respective termination points 4674 providing at such termination points the minimum transverse channel height of the fourth set of channels 4660. Termination points 4672 of second subset of bend lines 4664 are not axially downstream of termination points 4674 of fourth subset of bend lines 4668 as the wall segments 4634 are offset. The termination points 4672 of second subset of bend lines 4664 are at the downstream outlet 4624 in one embodiment, and in other embodiments are axially upstream of the downstream outlet. Termination points 4674 of fourth subset of bend lines 4668 are at the upstream inlet 4622 in one embodiment, and in other embodiments are axially downstream of the upstream inlet 4622. In some embodiments, the termination points 4672 of second subset of bend lines 4664 being axially downstream of termination points 4674 of fourth subset of bend lines 4668 provides axially overlapping sections. The noted lateral cross-flow is provided at least at axially overlapping sections. In those embodiments, the noted lateral cross-flow is provided at least at axially overlapping sections. In some embodiments, the axially overlapping sections of the filter media 4620 are longer, resulting in more cross-flow, than the overlapping sections of other filter media, for example, the overlapping sections 70 of the filter media form 20.

Turning to FIG. 47, a filter media 4720 which can be used as the filter media pack 110 of the filter element 100 is shown. The filter media 4720 is similar to the filter media 4620 of FIGS. 46A-46B. A difference between the filter media 4720 and the filter media 4620 is the filter media 4720 the plurality of fin wall segments 4734 that form positive (e.g., ascending in the transverse direction 40 along the axial direction 28) fins are opened. Accordingly, like numbering is used to designate like parts between the filter media 4720 and the filter media 4620. Generally, the negative and positive offset fin wall segments 4734 reduce inlet and outlet losses thereby reducing restriction across the filter media 4720, remove the need for adhesive as stand-offs are made of media, reduce adhesive for sealing the ends of the filter media 4720, and beneficial tapering along the depth of the filter media 4720, compared to conventional filter media. Additionally, the open positive fins are easier to fold and fit within a housing or confined space compared to the closed fins of the filter media 4620.

The filter media 4720 has an upstream inlet 4722 receiving incoming dirty fluid as shown at arrows 4780, and has a downstream outlet 4724 discharging clean filtered fluid as shown at arrows 4790. The filter media 4720 has positive fin wall segments 4746 offset from negative fin wall segments 4754 that extend in opposite directions toward one another along the axial direction. The filter media 4720 is folded along a plurality of bend lines 4726. The bend lines 4726 extend axially along an axial direction 28 and include a first set of bend lines 4730 extending from the upstream inlet 4722 towards the downstream outlet 4724 and a second set of bend lines 4732 extending from the downstream outlet 4724 axially towards the upstream inlet 4722. The filter media 4720 has a plurality of filter media fin wall segments 4734 extending in an offset serpentine manner between the bend lines 4726 between the upstream inlet 4722 and the downstream outlet 4724. The fin wall segments 4734 extend axially and define axial flow channels 4736 therebetween. In other words, the plurality of fin wall segments 4734 are tetrahedral forms that are staggered in an alternating positive and negative pattern along the formed media in the lateral direction 44. The channels 4736 have a height along a transverse direction 40 and a lateral width along a lateral direction 4844. The channels 4736 are substantially rectangular/slightly trapezoidal in cross-section at the outer portions and extend toward a substantially closed termination point 4872 as they extend along the axial direction 28. At least some of the noted bend lines taper in the noted transverse direction as they extend axially in the noted axial direction, to be described.

The fin wall segments 4734 include a first set of fin wall segments 4746 that define a first set of channels 4750 and a second set of channels 4752 interdigitated with the first set of channels 4750. The second set of channels 4752 are open along the internal portion of the second subset of bend lines 4764. The fin wall segments 4734 include a second set of fin wall segments 4754 to define a third set of channels 4758 and a fourth set of channels 4760 interdigitated with the third set of channels 4758. The fourth set of channels 4760 are open along the internal portion of the fourth subset of bend lines 4768. In some embodiments, the first channel 4750 tapers in the transverse direction 40 until it is substantially closed (e.g., forming a pocket) at the downstream outlet 4724 along the termination line 4872. Similarly, the third channel 4758 tapers in the transverse direction 40 until it is substantially closed (e.g., forming a pocket) at the upstream inlet 4722 along the termination line 4874. As shown in FIG. 47, the second set of fin wall segments 4754 are coplanar.

The first set of bend lines 4730 includes a first subset of bend lines 4762 defining the first set of channels 4750 and a second subset of bend lines 4764 defining the second set of channels 4752. The second subset of bend lines 4764 taper in transverse direction 40 as they extend from the upstream inlet 4722 axially towards the downstream outlet 4724. The second set of bend lines 4732 includes a third subset of bend lines 4766 defining the third set of channels 4758, and a fourth subset of bend lines 4768 defining the fourth set of channels 4760. The fourth subset of bend lines 4768 taper in the transverse direction 40 as they extend from the downstream outlet 4724 axially towards the upstream inlet 4722. The second set of channels 4752 have a decreasing transverse channel height along transverse direction 40 as the second set of channels 4752 extend axially along axial direction 28 towards the downstream outlet. The tapering of the second subset of bend lines 4764 in the transverse direction 40 provides the decreasing transverse channel height of the second set of channels 4752. The fourth set of channels 4760 have a decreasing transverse channel height along transverse direction 40 as the fourth set of channels 4760 extend axially along axial direction 28 towards the upstream inlet 4722. The tapering of the fourth subset of bend lines 4768 in the transverse direction 40 provides the decreasing transverse channel height of the fourth set of channels 4760.

The second subset of bend lines 4764 taper to respective termination points 4772, providing at such termination points the minimum transverse channel height of the second set of channels 4752. The fourth subset of bend lines 4768 taper to respective termination points 4774 providing at such termination points the minimum transverse channel height of the fourth set of channels 4760. Termination points 4772 of second subset of bend lines 4764 are not axially downstream of termination points 4774 of fourth subset of bend lines 4768 as the wall segments 4734 are offset. The termination points 4772 of second subset of bend lines 4764 are at the downstream outlet 4724 in one embodiment, and in other embodiments are axially upstream of the downstream outlet. Termination points 4774 of fourth subset of bend lines 4768 are at the upstream inlet 4722 in one embodiment, and in other embodiments are axially downstream of the upstream inlet 4722. In some embodiments, the termination points 4772 of second subset of bend lines 4764 being axially downstream of termination points 4774 of fourth subset of bend lines 4768 provides axially overlapping sections. In those embodiments, the noted lateral cross-flow is provided at least at axially overlapping sections. In some embodiments, the axially overlapping sections of the filter media 4720 are longer, resulting in more cross-flow, than the overlapping sections of other filter media, for example, the overlapping sections 70 of the filter media form 20.

FIG. 48A is a filter element 4800 that includes a filter media pack 4810 having filter media layers 4820 with rounded triangular channels 4836, according to an example embodiment. The filter media pack 4810 is shown in FIG. 48B and the filter media layer 4820 is shown in FIG. 48C. The filter media 4810 of the filter media pack 4800 is similar to the filter media 4720 of FIG. 47. A difference between the filter media 4810 and the filter media 4720 is the filter media 4810 includes perpendicular fins that are formed as rounded triangles. Accordingly, like numbering is used to designate like parts between the filter media 4810 and the filter media 4720. Generally, incoming dirty fluid 4880 enters the upstream inlet 4822 of the plurality of channels 4836 to be filtered. The plurality of channels 4836 are formed by a plurality of wall segments 4834 folded along a plurality of bend lines 4826. The triangular shape of the filter media 4810 provides improved stability compared to other shaped filter media and occupies less media space/area. In other words, the filter media 4810 provides dust capacity similar to filter media that occupies more space and has a larger media area. In some embodiments, the filter element 4800 provides axially overlapping sections, such that the noted lateral cross-flow is provided at least at axially overlapping sections.

FIG. 49 shows a graphical representation 4900 of flow rate 4902 and the initial restriction 4904 for a first filter media 4910 and a second filter media 4920. The first filter media 4910 may be similar to the filter media form 20 of FIGS. 5-19 and the second filter media 4920 may be substantially similar to the filter media 4810 of FIGS. 48A-C. As shown in the graph 4900, the second filter media 4920 had a forty-percent lower restriction than the first filter media 4910.

Referring to FIG. 50, a perspective view of an inlet side of a layered filter media pack 5000 with a substantially flat planar flow face that includes a filter media 5010 is shown, according to an example embodiment. A perspective view of the outlet side of the layered filter media pack 5000 of FIG. 50 is shown in FIG. 51. The filter media 5010 is similar to the filter media form 20 of FIGS. 5-11. A difference between the filter media 5010 and the filter media form 20 is the filter media 5010 includes multi-peak channels 5036 at the upstream inlet side 5022. The downstream outlet 5024 "v"-shaped channels of the filter media 5010 is similar to the filter media form 20. Accordingly, like numbering is used to designate like parts between the filter media 5010 and the filter media form 20.

As shown in FIGS. 50 and 51, the filter media pack 5000 has an upstream inlet 5022 with a rectangular inlet face, a downstream outlet 5024 with a rectangular outlet face, sealed side walls 5004, and the filter media 5010 that includes multiple filter media layers 5020. Each filter media layer 5020 in the filter media 5010 of the filter media pack 5000 has an upstream section 5170 and a downstream section 5172 separated by a neutral axis 5102. While the neutral axis 5102 is shown as substantially halfway between the upstream inlet 5022 and the downstream outlet 5024, in some embodiments, the neutral axis 5102 is disposed closer to the upstream inlet 5022 or the downstream outlet 5024. The filter media pack 5000 is configured to provide intermittent support in the middle portion (e.g., along the axial direction 28) to adjacent sheets. In some embodiments, the blind-off area along the edge length is reduced by up to seventy-five percent. In some embodiments, the support to adjacent sheets are along the edges that are subject to pressure drop, as a result of the differential pressure at that location. The differential pressure is described in greater detail below in FIGS. 55-60.

The upstream section 5170 includes the origination of a first set of wall segments 5046 and a first set of bend lines 5030 that form a first set of channels 5050 and a second set of channels 5052. The first set of wall segments 5046 and the first set of bend lines 5030 that form a first set of channels 5050 and second set of channels 5052 taper in the transverse direction 40 (e.g., decrease in height) as they extend from the upstream inlet 5022 toward the downstream outlet 5024 in the axial direction 28. As shown in FIG. 50, the first set of channels 5050 and the second set of channels 5052 each form an elongated "w"-shaped (e.g., with an extra center portion) or tri-peak flow channels. As described in greater detail below, each channel in the tri-peak flow channels of the upstream inlet 5022 has an of angled portions that extends the length of the filter media in the transverse direction 40 and the lateral direction 44 and a pair of triangle portions that extend downward along a portion of the flow channel. The downstream section 5172 includes the origination of a second set of wall segments 5054 and a second set of bend lines 5032 that form a third set of channels 5058 and a fourth set of channels 5060. The second set of wall segments 5054 and the second set of bend lines 5032 that form the third set of channels 5058 and the fourth set of channels 5060 taper in the transverse direction 40 (e.g., decrease in height) as they extend from the downstream outlet 5024 toward the upstream inlet 5022 in the axial direction 28.

As shown in FIG. 51, the third set of channels 5058 and the fourth set of channels 5060 each form a v-shaped channel, substantially similar to the third set of channels 58 and the fourth set of channels 60 of the filter media form 20 of FIGS. 5-19. As shown in the portion 5100 of the filter media 5010 in FIG. 52, in some embodiments, each channel in the first set of channels 5050 tapers as it extends along the axial direction 28 toward the downstream outlet 5024 and terminates adjacent a pair of channels in the fourth set of channels 5060. In other words, each channel in the first set of channels 5050 corresponds to two channels in the fourth set of channels 5060. Similarly, each channel in the second set of channels 5052 tapers as it extends along the axial direction 28 toward the downstream outlet 5024 and terminates adjacent a pair of channels in the third set of channels 5058. In other words, each channel in the second set of channels 5052 corresponds to two channels in the third set of channels 5058.

Each filter media layer 5020 in the filter media 5010 is folded along a plurality of bend lines 5026. The plurality of bend lines 5026 extend axially along an axial direction 28 and include a first set of bend lines 5030 extending from the upstream inlet 5022 towards the downstream outlet 5024 and a second set of bend lines 5032 extending from the downstream outlet 5024 axially towards the upstream inlet 5022.

The filter media 5020 has a plurality of filter media wall segments 5034 extending in serpentine manner between the bend lines. The wall segments 5034 extend axially and define axial flow channels 5036 therebetween. The channels 5036 have a height along a transverse direction 40, which transverse direction 40 is substantially perpendicular to axial direction 28. The channels 5036 have a lateral width along a lateral direction 44, which lateral direction 44 is substantially perpendicular to axial direction 28 and substantially perpendicular to transverse direction 40. As shown in FIG. 52, a first set of channels 5050 of the first set of wall segments 5046 have a length that is approximately twice the lateral width along the lateral direction 44 compared to the lateral width of a fourth set of channels 5060 of the second set of wall segments 5054. At least some of the noted bend lines taper in the noted transverse direction 40 as they extend axially in the noted axial direction, to be described.

The wall segments 5034 include a first set of wall segments 5046 alternately sealed to each other at the upstream inlet 5022 with an adhesive 5059—for example, by a glue or the like—to define a first set of channels 5050 having open upstream ends, and a second set of channels 5052 interdigitated with the first set of channels 5050 and having closed upstream ends. As shown in FIG. 50, the inlet flow area is sealed such that approximately ⅝ths of the total area is open and receives dirty fluid 5080. The wall segments 5034 further include a second set of wall segments 5054 alternately sealed to each other at the downstream outlet 5024 with an adhesive 5056—for example, by a glue or the like—to define a third set of channels 5058 having closed downstream outlets, and a fourth set of channels 5060 interdigitated with the third set of channels 5058 and having open downstream outlets. In some embodiments, the first set of channels 5050 and the second set of channels 5052, face oppositely to the third set of channels 5058 and the fourth set of channels 5060, respectively. As shown in FIG. 51, the outlet flow area is sealed such that approximately ½ of the total area is open and expels clean fluid 5090.

The first set of channels 5050 and the second set of channels 5052 are elongated in the axial direction 28 and have a cross-sectional area along a cross-sectional plane defined by the transverse and lateral directions 40 and 44. The cross-sectional areas of the first set of channels 5050 and the second set of channels 5052 decrease as the first set of channels 5050 and the second set of channels 5052 extend along axial direction 28 from the upstream inlet 5022 toward the downstream outlet 5024. Similarly, the third set of channels 5058 and the fourth set of channels 5060 are elongated in the axial direction 28 and have a cross-sectional area along a cross-sectional plane defined by the transverse and lateral directions 40 and 44. The cross-sectional areas of the third set of channels 5058 and the fourth set of channels 5060 decrease as the third set of channels 5058 and the fourth set of channels 5060 extend along axial direction 28 from the downstream outlet 5024 toward the upstream inlet 5022. As shown in FIG. 52, the width 5202 of a channel in the first set of channels 5050 is approximately twice the width 5204 of a channel in the fourth set of channels 5060 such that for every channel in the first set of channels 5050 there are two channels in the fourth set of channels 5060. Similarly, for every channel in the second set of channels 5052 there are two channels in the third set of channels 5058.

Referring to FIGS. 53A-53C, the first set of channels 5050 include a first subset of channels 5080, a second subset of channels 5082, and a third subset of channels 5084. The first subset of channels 5080 forms a channel having a check-mark shape (e.g., an uneven v-shaped channel) that extends in the transverse direction 40 along a height 5312 and a width 5302 along the lateral direction 44. The first subset of channels 5080 extends from the bottom of the filter media layer 5020 to the top of the filter media layer 5020 at a diagonal angle to the height 5312 and then downward at a diagonal angle along the transverse direction 40 to a height 5314 that is approximately ⅓ the length of the height 5312. The second subset of channels 5082 forms a channel having a v-shape that extends in the transverse direction 40 along a height 5316 and a width 5304 along the lateral direction 44. The second subset of channels 5082 extends from the upper portion of the filter media layer 5020 to the top of the filter media layer 5020 at a diagonal angle along a height 5314 and then downward at a diagonal angle along the transverse direction 40 to a height 5314 that is approximately ⅓ the length of the height 5312. The third subset of channels 5084 forms a channel having a half v-shape that extends in the transverse direction 40 along a height 5316 and a width 5306 along the lateral direction 44. The third subset of channels 5084 extends from the top of the filter media layer 5020 downward at a diagonal angle along the transverse direction 40 to a height 5316 that is approximately ⅓ the length of the height 5312. The second set of channels 5052 include a fourth subset of channels 5086, a fifth subset of channels 5088, and a sixth subset of channel 5091. The fourth subset of channels 5086, the fifth subset of channels 5088, and the sixth subset of channel 5091 are interdigitated with the first subset of channels 5080, the second subset of channels 5082, and the third subset of channels 5084, respectively.

The first set of bend lines 5030 includes a first subset of bend lines 5061, a second subset of bend lines 5062, a third subset of bend lines 5063, a fourth subset of bend lines 5064, a fifth subset of bend lines 5065, and a sixth subset of bend lines 5067. The first subset of bend lines 5061, the second subset of bend lines 5062, and the third subset of bend lines 5063 form the first subset of channels 5080. The third subset of bend lines 5063, fourth subset of bend lines 5064, and fifth subset of bend lines 5065 form the second subset of channels 5082. The fifth subset of bend lines 5065 and sixth subset of bend lines 5067 form the third subset of channels 5084. Similarly, the first subset of bend lines 5061, the second subset of bend lines 5062, and the third subset of bend lines 5063 form the fourth subset of channels 5086. The third subset of bend lines 5063, fourth subset of bend lines 5064, and fifth subset of bend lines 5065 form the fifth subset of channels 5088. The fifth subset of bend lines 5065 and sixth subset of bend lines 5067 form the sixth subset of channel 5091. The second subset of bend lines 5062, third subset of bend lines 5063, fourth subset of bend lines 5064, fifth subset of bend lines 5065, and sixth subset of bend lines 5067 taper in transverse direction 40 as they extend from the upstream inlet 5022 axially towards the downstream outlet 5024. Accordingly, the first set of channels 5050 and the second set of channels 5052 have a decreasing transverse channel height along transverse direction 40 as the first set of channel 5050 and the second set of channels 5052 extend axially along axial direction 28 towards the downstream outlet 5024. The taper of the first set of channel 5050 and the second set of channels 5052 along the axial direction are shown along various locations along the axial direction 28 in FIGS. 55-60.

As shown in FIG. 52, the sixth subset of bend lines 5067 and the fifth subset of bend lines 5065 extend in the axial direction 28 from the upstream inlet 5022 toward the downstream outlet 5024 and terminate at a termination point 5070 adjacent to the seventh subset of bend line 5066 of a first fourth set of channels 5060

The sixth subset of bend lines 5067 and the fifth subset of bend lines 5065 angle toward the termination point 5070 at the neutral axis 5102. The fourth subset of bend lines 5064 extends in the axial direction 28 from the upstream inlet 5022 toward the downstream outlet 5024 and terminates at a termination point 5072 adjacent to the eighth subset of bend lines 5068. The first subset of bend lines 5061, second subset of bend lines 5062, and third subset of bend lines 5063 extend in the axial direction 28 from the upstream inlet 5022 toward the downstream outlet 5024 and terminate at a termination point 5070 adjacent to the seventh subset of bend line 5066 of a second fourth set of channels 5060. The first subset of bend lines 5061, second subset of bend lines 5062, and third subset of bend lines 5063 angle toward the termination point 5070 at the neutral axis 5102.

The second set of bend lines 5032 includes a seventh subset of bend lines 5066 defining the third set of channels 5058 and a eighth subset of bend lines 5068 defining the fourth set of channels 5060. Each channel in the third set of channel 5058 is v-shaped with a height 5412 in the transverse direction 40 and a width 5402 in the lateral direction 44. The eighth subset of bend lines 5068 taper in the transverse direction 40 as they extend from the downstream outlet 5024 axially towards the upstream inlet 5022. The tapering of the eighth subset of bend lines 5068 in the transverse direction 40 provides the decreasing transverse channel height 38 of the fourth set of channels 5060

Incoming dirty fluid 5080 to be filtered flows along axial direction 28 into open channels 5050 at the upstream inlet 5022 and passes laterally and/or transversely through the filter media wall segments of the filter media 5020 and then flows axially along axial direction 28 as clean filtered fluid 5090 through open channels 5060 at the downstream outlet 5024. The fourth subset of bend lines 5064 provides lateral cross-flow thereacross along lateral direction 44 between respective channels downstream of the upstream inlet 5022. The eighth subset of bend lines 5068 provides lateral cross-flow thereacross along lateral direction 44 between respective channels upstream of the downstream outlet 5024. Third and sixth subsets of bend lines 5063 and 5068 have axially overlapping sections, and the noted lateral cross-flow is provided at least at axially overlapping sections. In some embodiments, the flow is reversed through the filter media 5020 such that incoming dirty fluid to be filtered flows along axial direction 28 into open channels 5060 and passes laterally and/or transversely through the filter media wall segments of the filter media 5020 and then flows axially along axial direction 28 as clean filtered fluid through open channels 5050.

Referring to FIG. 55, a cross-sectional view 5500 of the filter media pack 5000 is shown. The cross-section is taken along the axial direction 28 substantially toward the upstream inlet 5022. The differential pressure occurs across the media surface, for example, at the location 5502. Turning to FIG. 56, a cross-sectional view 5600 of the filter media pack 5000 is shown. The cross-section is taken along the axial direction 28 substantially toward the upstream inlet 5022 and downstream of the cross-sectional view 5500. The differential pressure occurs across the media surface, for example, at location 5602.

Turning to FIG. 57, a cross-sectional view 5700 of the filter media pack 5000 is shown. The cross-section is taken along the axial direction 28 substantially toward the neutral axis 5102 and downstream of the cross-sectional view 5600. The differential pressure occurs across the media surface, for example, at location 5702.

FIG. 58 shows a cross-sectional view 5800 of the filter media pack 5000. The cross-section is taken along the axial direction 28 substantially toward the neutral axis 5102 along the downstream section 5172 and downstream of the cross-sectional view 5700. The differential pressure occurs across the media surface, for example, at location 5802.

Turning to FIG. 59, a cross-sectional view 5900 of the filter media pack 5000 is shown. The cross-section is taken along the axial direction 28 substantially toward the downstream outlet 5024 and downstream of the cross-sectional view 5800. The differential pressure occurs across the media surface, for example, at location 5902.

In FIG. 60, a cross-sectional view 6000 of the filter media pack 5000 is shown. The cross-section is taken along the axial direction 28 substantially toward the downstream outlet 5024 and downstream of the cross-sectional view 5900. The differential pressure occurs across the media surface, for example, at location 6002.

Turning to FIGS. 61-65B, various implementations and embodiments of pleated filter media that may be formed into complex shapes without the use of pleat tip spacing devices are shown. Current methods for forming pleated filter media into cylindrical, oval, racetrack, or arched configurations often employ the use of pleat tip spacing devices arranged and sized on pleat tips so as to fan filtration pack into a curved configuration. Pleat tip spacing devices may include, for example, dimples, eyes, lips, and footballs. All of these traditional methods for spacing and flaring pleats add resistance to fluid flow across the pleat pack due the features creating partial blockage of fluid entry into the channels between pleats. Various embodiments of pleated filter media described herein may be formed into complex shapes without the use of pleat tip spacing devices.

As shown in FIGS. 61 and 62, the pleated filter media 6012 includes a first set of protrusions 6014*a* formed in a linear array on a surface of the pleated filter media 6012. Each of the first set of protrusions 6014*a* is tapered and increases in thickness from a first end thereof proximate to a first bend line X to a second bend line Y1. Furthermore, a second set of protrusions 6014*b* are formed in a linear array on the surface of the pleated filter media 6012 parallel to the first set of protrusions 6014*a* on an opposite side of the first bend line X. The second set of protrusions 6014*b* are also tapered and increase in thickness from the first bend line X to a third bend line Y2 opposite the second bend line Y1.

A plurality of the first set of protrusions 6014*a* and the second set of protrusions 6014*b* are formed along the length of the pleated filter media 6012 in a repeating pattern. The protrusions 6014*a/b* may be formed, in some implementations, using a mold, die or stamp, for example, embossed in the pleated filter media 6012. The pleated filter media 6012 is formed in to a pleated filter media by bending the pleated filter media 6012 along the first bend line X to move the first set of protrusions 6014*a* towards the second set of protrusions 6014*b*, and then bent in the opposite direction along the second bend line Y1 and the third bend line Y2, and the pattern repeated to obtain a pleated filter media.

In this manner, any shaped pleated filter media can be formed without the use of a pleat tip spacing device. For example, FIG. 63 shows a top view of a pleated filter media 6010 formed using the pleated filter media 6012 of FIGS. 61 and 62. The first set of protrusions 6014*a* and the second set of protrusions 6014*b* abut against each other and serve as spacers, while their tapered profile causes the pleats of the pleated filter media to be angled or fan out. A first linear end of the pleated filter media 6012 is coupled to an opposite end thereof such that the pleated filter media 6010 has a circular cross-section and defines a central channel 6018 therewithin.

FIG. 64A is a front view, and FIG. 64B is a front perspective view of another pleated filter media 6110, according to another embodiment. The pleated filter media 6110 may be formed and similar to the pleated filter media 6012 of FIGS. 61 and 62. The pleated filter media 6110 is formed in a race track shape using a pleated filter media having protrusions 6014 (e.g., first set of protrusions 6014*a* and the second set of protrusions 6014*b*) defined therein. In this implementation, a first portion 6114 of the pleated filter media used to form the pleated filter media 6110 includes the tapered protrusions 6014 that are used to form curved end portions of the pleated filter media 6110, and a second portion 6116 of the pleated filter media includes flat protrusions (i.e., having a uniform height) which are used to form linear portions of the pleated filter media 6110.

FIG. 65A is a front view and FIG. 65B is a front perspective view of yet another pleated filter media 6510, according to yet another embodiment. The pleated filter media 6212 may be formed and similar to the pleated filter media 6012 of FIGS. 61 and 62. The pleated filter media 6510 is formed in a triangular shape. A first portion 6514 of the pleated filter media 6510 that includes the tapered protrusions are used to form curved end portions of the pleated filter media 6510, and the second portion 6516 of the pleated filter media 6510 is used to form linear portions of the pleated filter media 6510.

It is within the scope of the present embodiments that concepts, structures, and other features of an embodiment of the filter media, described herein, can be implemented on another embodiment of the filter media, described herein. By way of example, even though the filter media layer 3420 of FIG. 34 is explicitly described as similar to the filter media layer 3120 of FIGS. 31A-31B, the concepts and one or more features of the design of the filter media layer 3420 may be implemented into the filter media of FIGS. 5-8, 20-29, etc. In other words, the filter media of an embodiment of a figure is similar to the other embodiments of the filter media embodiments described in other figures to implement on or more features, structures, elements, etc.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
a filter element, comprising:
  a filter media comprising a plurality of filter media layers stacked on top of each other along a transverse direction to form the filter media, the filter media having an inlet surface at an inlet portion of the filter media, and an outlet surface at an outlet portion of the filter media, the outlet portion disposed axially away from the inlet portion in an axial direction, the axial direction substantially perpendicular to the inlet surface and the outlet surface, the transverse direction substantially perpendicular to the axial direction,
  each filter media layer in the plurality of filter media layers is folded along a plurality of bend lines between the inlet portion and the outlet portion, and each filter media layer in the plurality of filter media layers comprises a plurality of wall segments extending in serpentine manner between the plurality of bend lines, the plurality of wall segments extending axially and defining axial channels therebetween;
a seal member disposed around:
  the inlet portion of the filter media, adjacent the inlet surface, or
  the outlet portion of the filter media, adjacent the outlet surface; and a support rib extending in the axial direction from the inlet portion toward the outlet portion, the support rib configured to maintain the filter element structure.

2. The filter assembly of claim 1, wherein the seal member comprises a plurality of seal ribs extending in the transverse direction, the plurality of seal ribs extending over the outlet surface, the plurality of seal ribs configured to impede movement of the axial channels along the outlet surface.

3. The filter assembly of claim 1, further comprising a liner element extending from the seal member axially toward the outlet surface, the liner element configured to constrain movement of the axial channels.

4. The filter assembly of claim 3, wherein the liner element defines a first sidewall portion, a second sidewall portion disposed away from the first sidewall portion in a lateral direction, a first wall portion extending from the first sidewall portion in the lateral direction toward the second sidewall portion, a second wall portion disposed away from the first wall portion in the transverse direction and extending from the first sidewall portion in the lateral direction toward the second sidewall portion, the lateral direction being substantially perpendicular to the axial direction and the transverse direction being substantially perpendicular to the axial direction and the lateral direction.

5. The filter assembly of claim 4, wherein the support rib is a first support rib disposed along the first sidewall portion, further comprising a second support rib disposed along the first wall portion, the second support rib extending in the axial direction from the inlet portion toward the outlet portion, and the second support rib configured to maintain the filter element structure.

6. The filter assembly of claim 1, wherein the plurality of filter media layers stacked on top of each other to form the filter media comprises a second plurality of filter media layers stacked upon a first plurality of filter media layers, wherein the support rib is disposed between the first plurality of filter media layers and the second plurality of filter media layers, the support rib extending in the axial direction from the inlet portion toward the outlet portion, the support rib configured to maintain the filter element structure and constrain movement of pockets in the plurality of filter media layers.

7. The filter assembly of claim 1, wherein the support rib is disposed between the filter media and liner element, the support rib extending in the axial direction from the inlet portion toward the outlet portion, the support rib configured to impede filter element collapse and constrain channel movement of the plurality of filter media layers.

8. The filter assembly of claim 2, further comprising a second filter media that is stacked on top of the filter media, the seal member being disposed around the filter media and the second filter media, wherein the plurality of seal ribs are stacked upon one another with a cross seal member disposed therebetween.

9. The filter assembly of claim 1, wherein:
the support rib comprises:
  a base portion adjacent the inlet portion; and
  a beam portion extending from the base portion toward the outlet portion.

10. The filter assembly of claim 1, wherein the filter element is a rectangular filter element.

11. The filter assembly of claim 1, further comprising a second filter media comprising a plurality of second filter media layers stacked on top of each other along the transverse direction to form the second filter media, the second filter media having a second inlet surface at a second inlet portion of the second filter media, and a second outlet portion of the second filter media, and a second outlet surface at a second outlet portion of the second filter media, the second outlet portion disposed axially away from the second inlet portion in the axial direction, wherein each second filter media layer in the plurality of second filter media layers is folded along a plurality of second bend lines between the second inlet portion and the second outlet portion, and each second filter media layer in the plurality of second filter media layers comprises a plurality of second wall segments extending in serpentine manner between the plurality of second bend lines, the plurality of second wall segments extending axially and defining second axial channels therebetween;

wherein the filter media and the second filter media are positioned side-by-side, with a plurality of support ribs disposed therebetween.

12. The filter assembly of claim 1, wherein the seal member is an outlet seal member, further comprising an inlet seal member that is disposed around the inlet surface and is configured to form a seal with an inlet side of a filter housing.

13. The filter assembly of claim 3, wherein the seal member is an outlet seal member, further comprising an inlet seal member that is disposed around the inlet surface, wherein the liner element is disposed between the inlet seal member and the outlet seal member, and wherein the liner element extends around outer surfaces of the filter media, excluding the inlet surface and the outlet surface, of the filter media.

14. The filter assembly of claim 11, wherein the seal member is an outlet seal member, further comprising an inlet seal member that is disposed around the inlet surface, wherein the inlet seal member and the outlet seal member are extended to accommodate the filter media and the second filter media.

15. The filter assembly of claim 1, wherein the support rib comprises a base portion and a beam portion that extends from the base portion toward the outlet portion, wherein a width of the base portion increases moving away from the beam portion.

\* \* \* \* \*